US 11,516,417 B2

(12) United States Patent
Oike et al.

(10) Patent No.: US 11,516,417 B2
(45) Date of Patent: Nov. 29, 2022

(54) SIGNAL PROCESSING DEVICE AND SOLID-STATE IMAGING DEVICE

(71) Applicant: Sony Semiconductor Solutions Corporation, Kanagawa (JP)

(72) Inventors: Yusuke Oike, Kanagawa (JP); Mamoru Sato, Kanagawa (JP); Yukio Tagawa, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 294 days.

(21) Appl. No.: 16/500,550

(22) PCT Filed: Mar. 28, 2018

(86) PCT No.: PCT/JP2018/012714
§ 371 (c)(1),
(2) Date: Oct. 3, 2019

(87) PCT Pub. No.: WO2018/190127
PCT Pub. Date: Oct. 18, 2018

(65) Prior Publication Data
US 2020/0106975 A1    Apr. 2, 2020

(30) Foreign Application Priority Data

Apr. 11, 2017 (JP) .............................. JP2017-078184

(51) Int. Cl.
*H04N 5/363*     (2011.01)
*H04N 5/3745*    (2011.01)
*H04N 5/378*     (2011.01)

(52) U.S. Cl.
CPC ............ *H04N 5/363* (2013.01); *H04N 5/378* (2013.01); *H04N 5/37455* (2013.01); *H04N 5/37457* (2013.01)

(58) Field of Classification Search
CPC ............... H04N 5/363; H04N 5/37455; H04N 5/37457; H04N 5/378; H04N 5/374; H04N 5/3741
See application file for complete search history.

(56) References Cited

U.S. PATENT DOCUMENTS

2006/0262209 A1* 11/2006 Kishi .................. H04N 5/3532
                                                             348/297
2007/0177043 A1    8/2007 Kok
(Continued)

FOREIGN PATENT DOCUMENTS

CN    101296330 A    10/2008
CN    102625054 A    8/2012
(Continued)

OTHER PUBLICATIONS

International Preliminary Report on Patentability dated Oct. 24, 2019 in connection with International Application No. PCT/JP2018/012714.
(Continued)

*Primary Examiner* — Lin Ye
*Assistant Examiner* — Tuan H Le
(74) *Attorney, Agent, or Firm* — Wolf, Greenfield & Sacks, P.C.

(57) ABSTRACT

There is provided an imaging device, comprising differential amplifier circuitry comprising a first amplification transistor and a second amplification transistor; and a plurality of pixels including a first pixel and a second pixel, wherein the first pixel includes a first photoelectric converter, a first reset transistor, and the first amplification transistor, and wherein the second pixel includes a second photoelectric converter, a second reset transistor, and the second amplification transistor, wherein the first reset transistor is coupled to a first reset voltage, and wherein the second reset transistor is coupled to a second reset voltage different than the first reset voltage.

12 Claims, 37 Drawing Sheets

(56) References Cited

U.S. PATENT DOCUMENTS

| | | | |
|---|---|---|---|
| 2008/0079825 A1* | 4/2008 | Matsuda | H04N 5/357 348/241 |
| 2008/0218608 A1* | 9/2008 | Rossi | H01L 27/14643 348/E9.037 |
| 2008/0258047 A1* | 10/2008 | Sakakibara | H04N 5/37452 250/214 C |
| 2013/0107093 A1* | 5/2013 | Aoki | H04N 5/379 348/302 |
| 2015/0229304 A1 | 8/2015 | Suzuki | |
| 2016/0360137 A1 | 12/2016 | Sakuragi | |
| 2017/0223317 A1 | 8/2017 | Matsumoto | |
| 2018/0197910 A1* | 7/2018 | Lee | H01L 27/14605 |
| 2018/0220090 A1* | 8/2018 | Herault | H04N 5/35572 |

FOREIGN PATENT DOCUMENTS

| | | |
|---|---|---|
| CN | 103581576 A | 2/2014 |
| EP | 2 963 918 A1 | 1/2016 |
| JP | 2005-311487 A | 11/2005 |
| JP | 2008-271280 A | 11/2008 |
| JP | 2016201649 A | 12/2016 |
| WO | WO-2014132822 A | 9/2014 |

OTHER PUBLICATIONS

International Search Report and Written Opinion dated May 28, 2018 in connection with International Application No. PCT/JP2018/012714.

Communication pursuant to Article 94(3) EPC dated Aug. 26, 2020 in connection with European Application No. 18718235.7.

Outstanding Master's Theses, Feb. 15, 2009,Yiping Zou, The research on image noise suppression of CMOS image sensor, Full text.

\* cited by examiner

[FIG. 1]
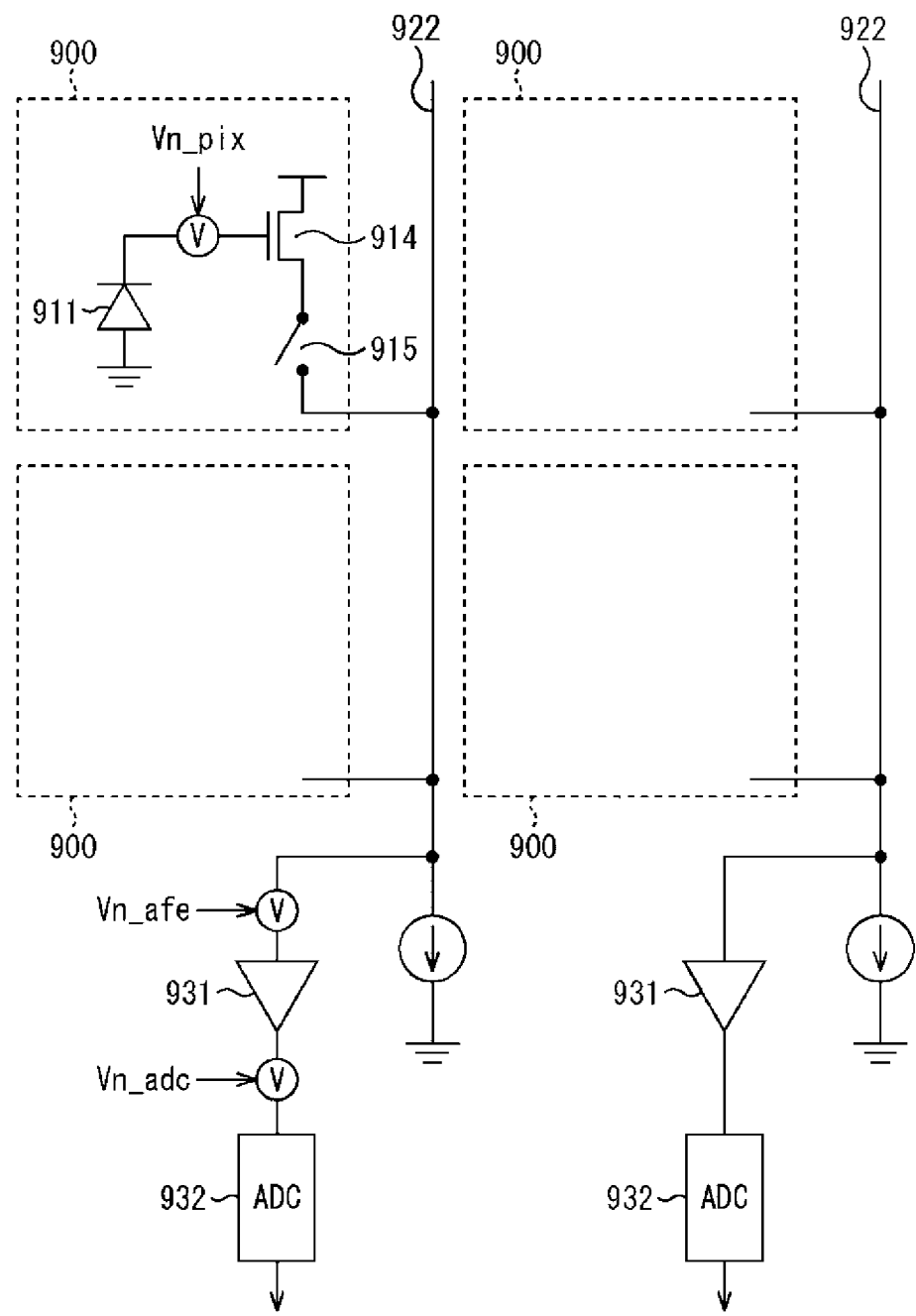

[FIG. 2]
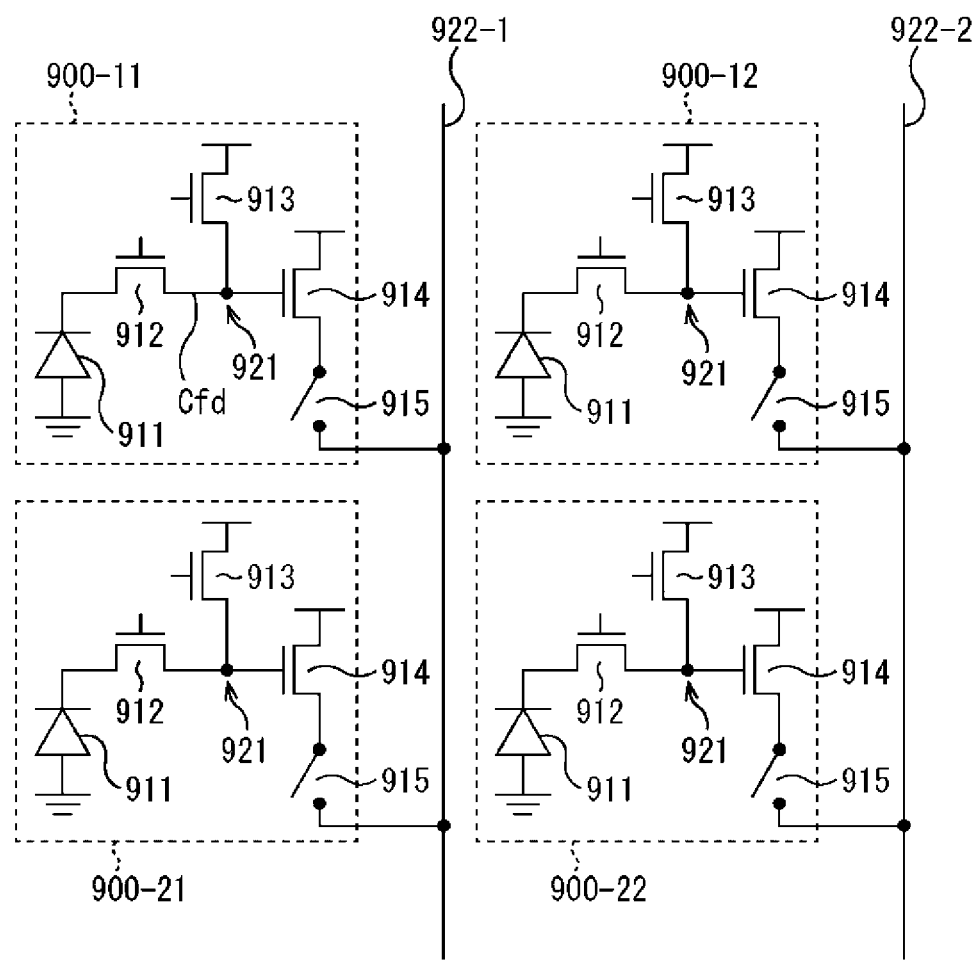

[FIG. 3]
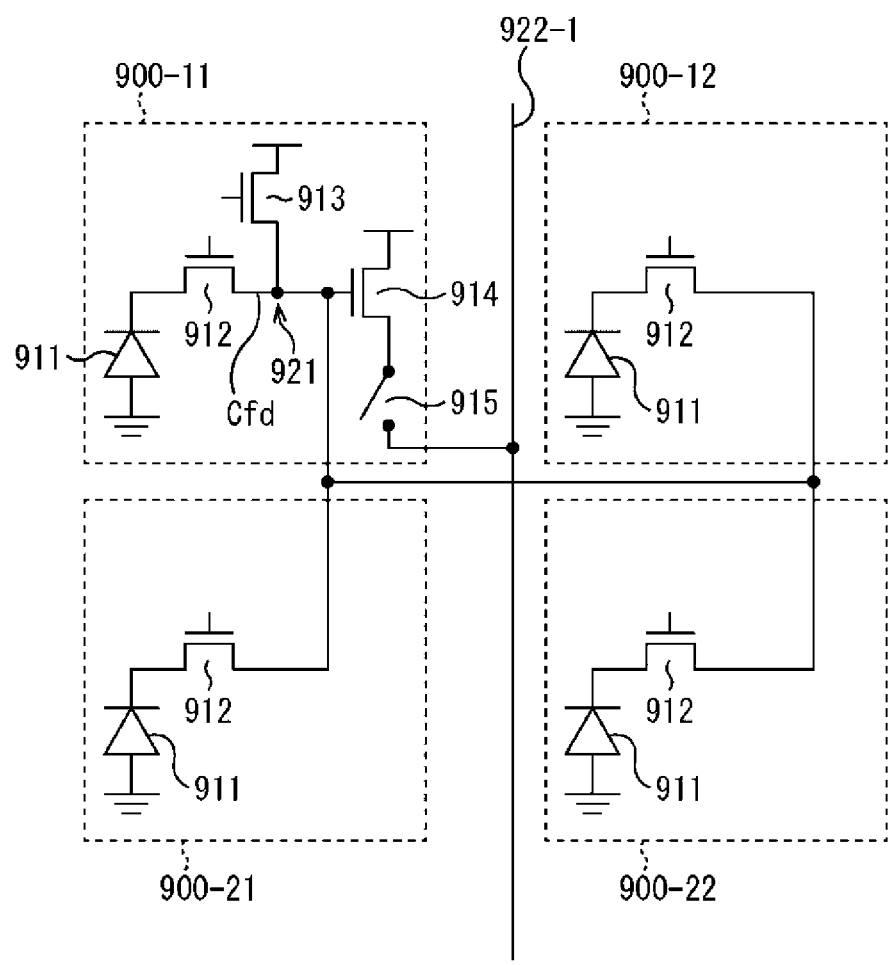

[FIG. 4]
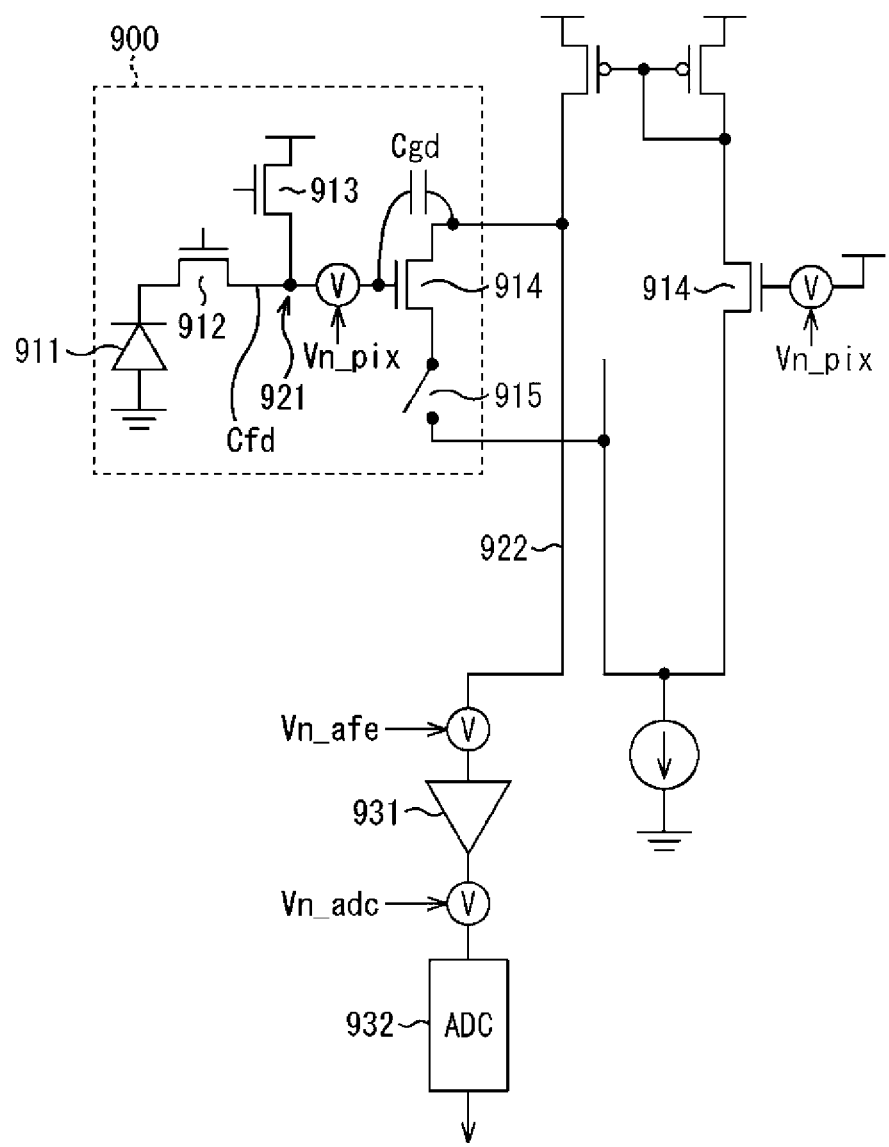

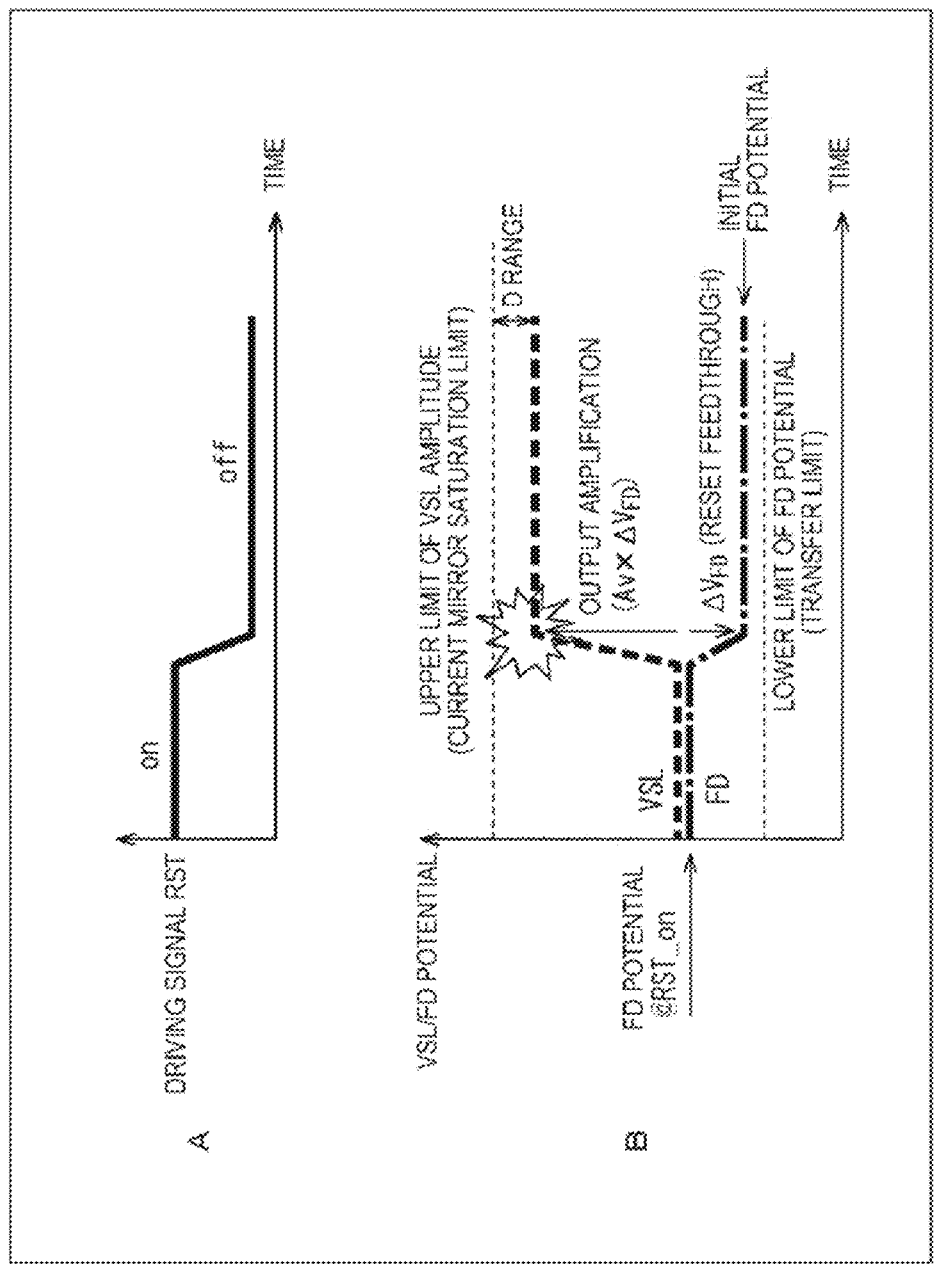
[FIG. 3]

[FIG. 6]
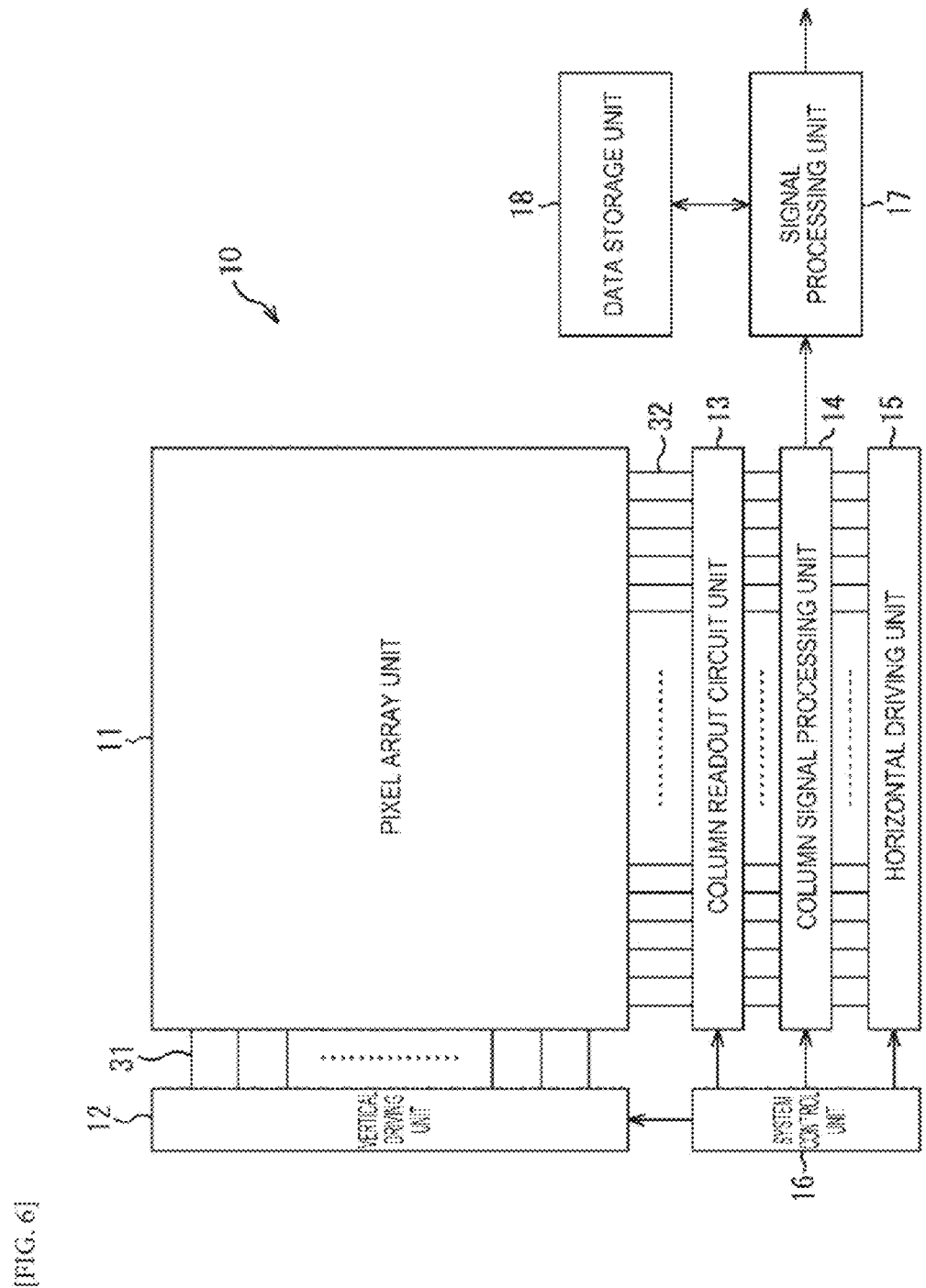

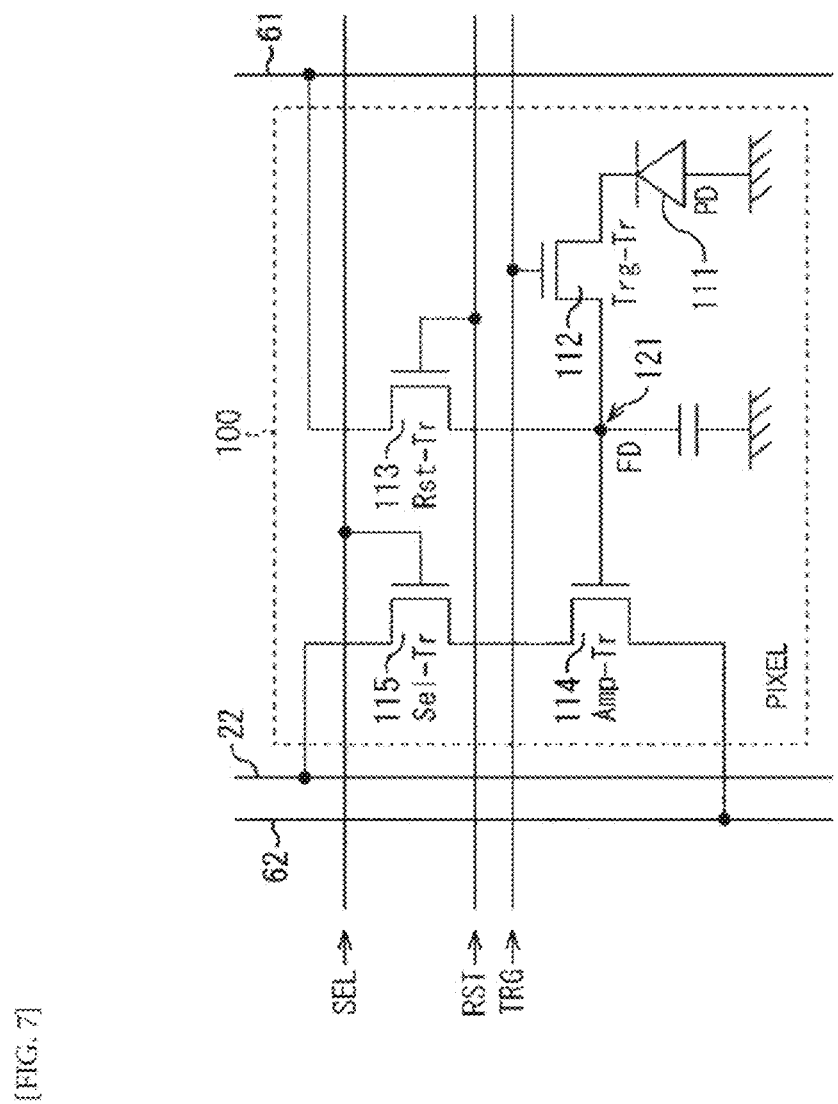
[FIG. 7]

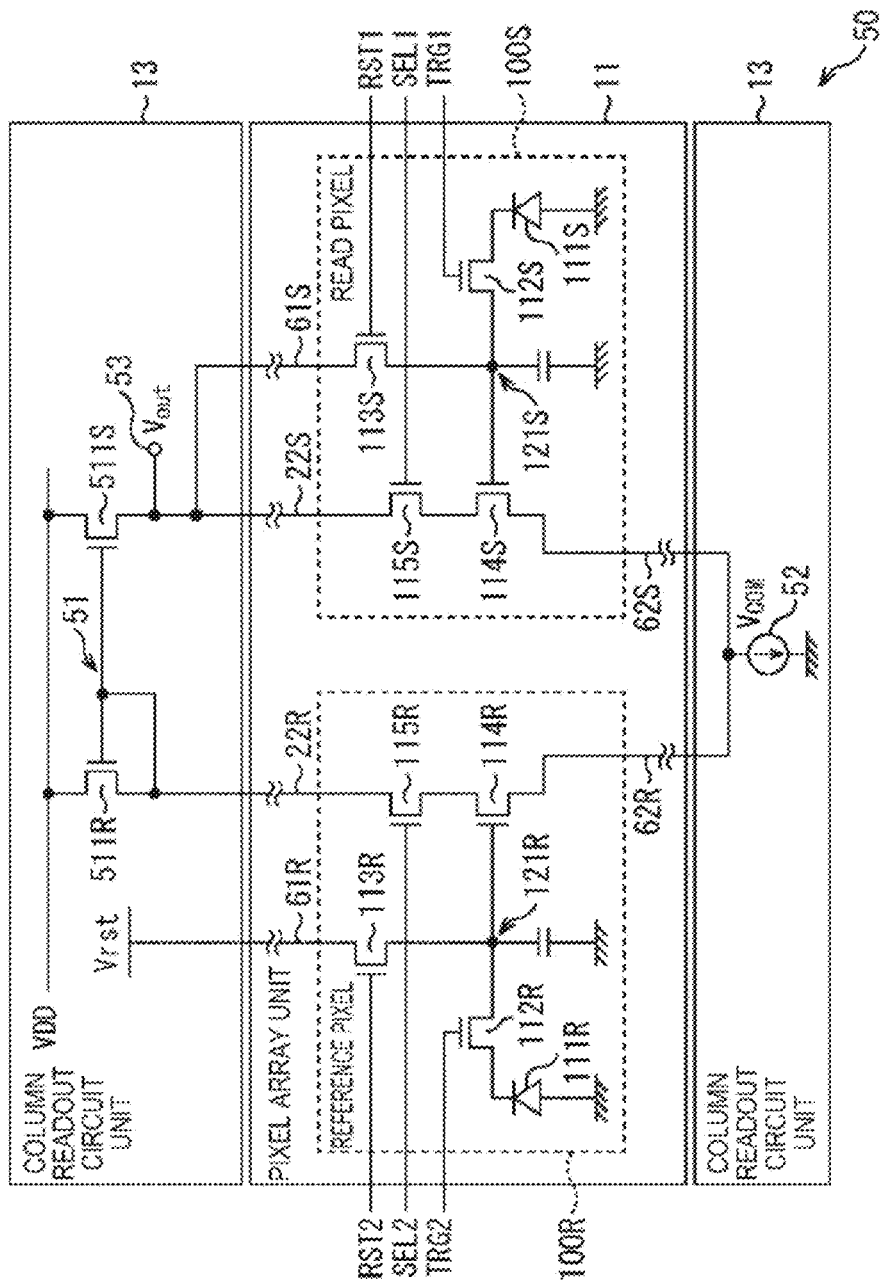
[FIG. 8]

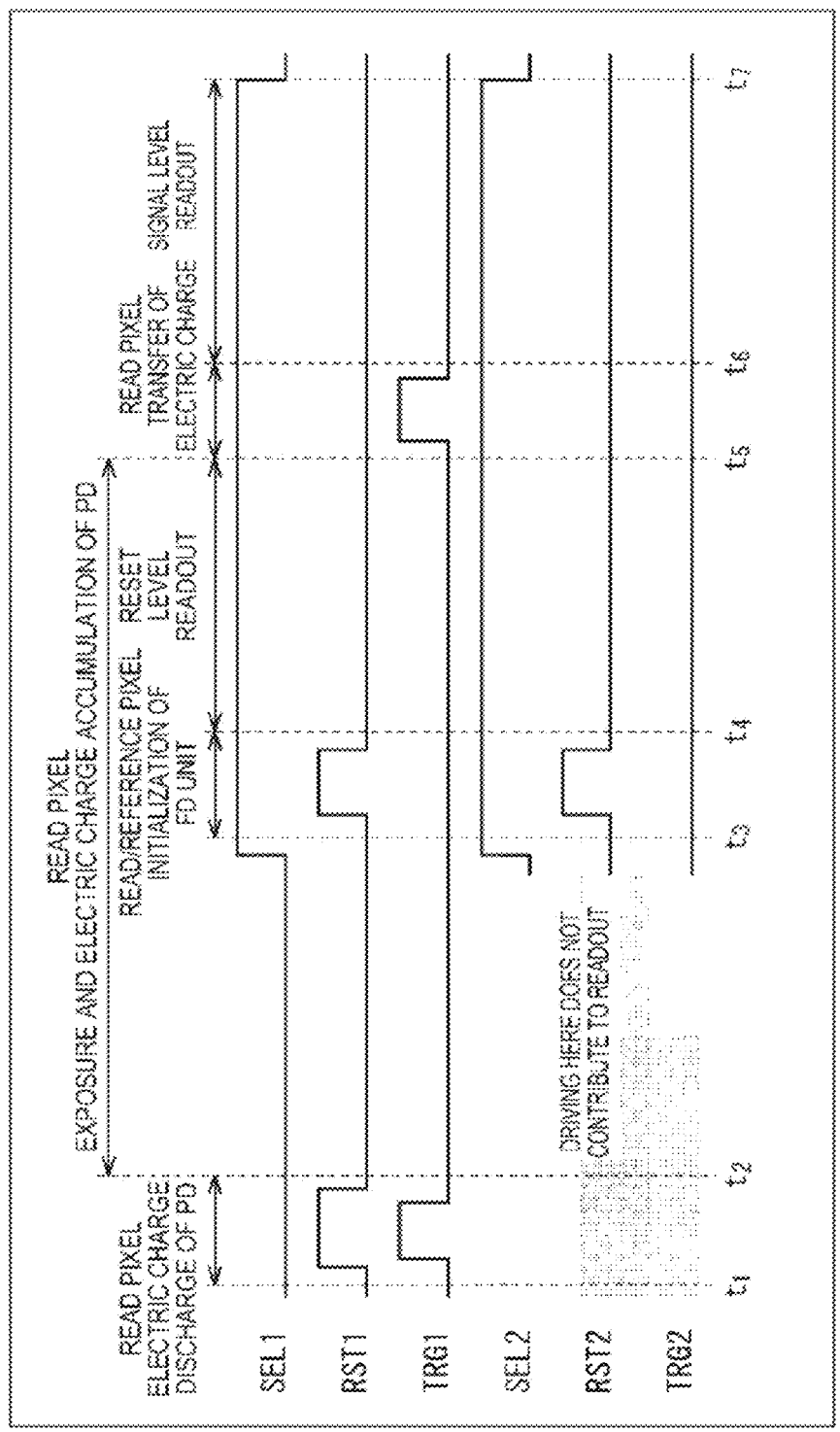
[FIG. 9]

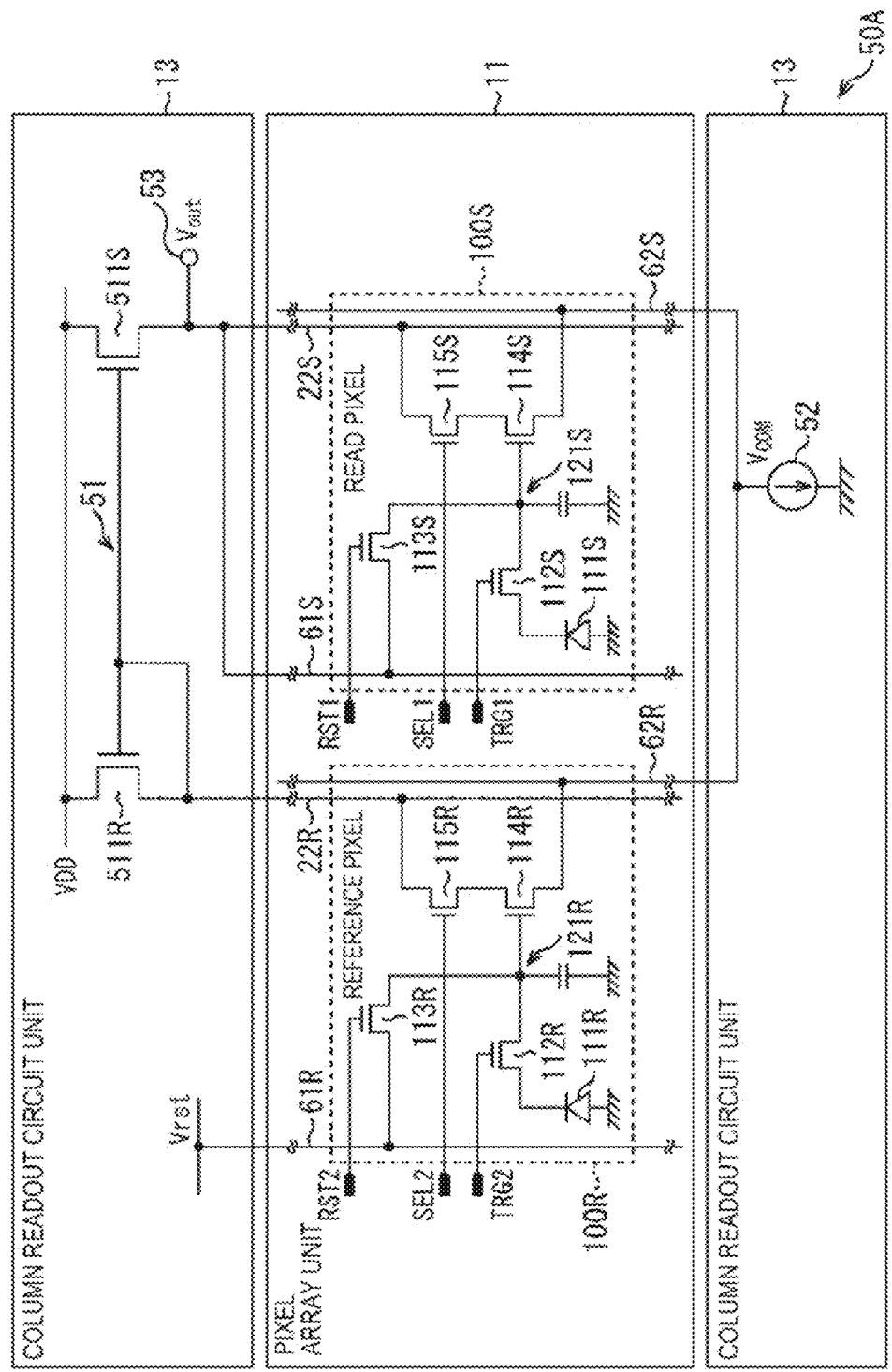
[FIG. 10]

[FIG. 11]
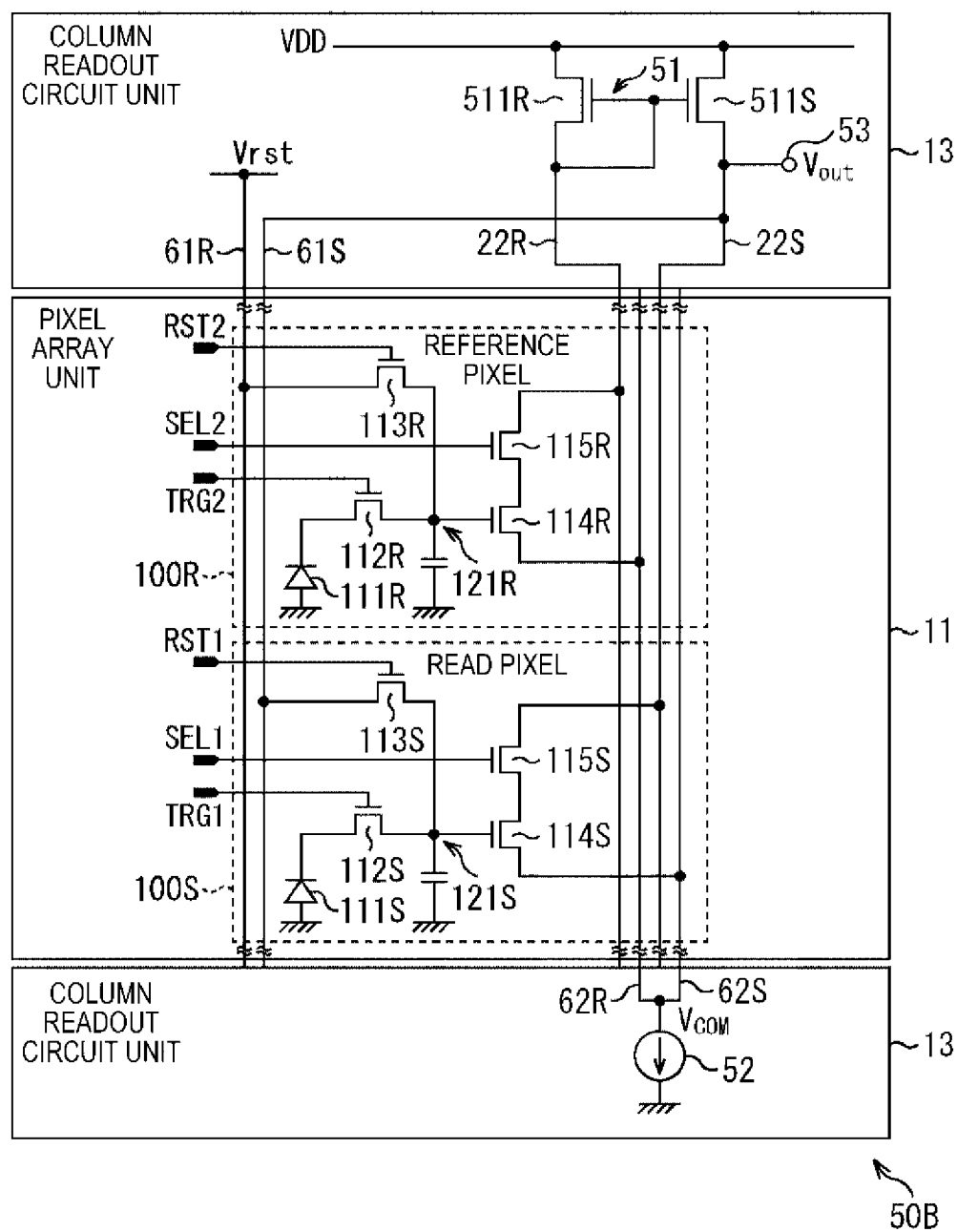

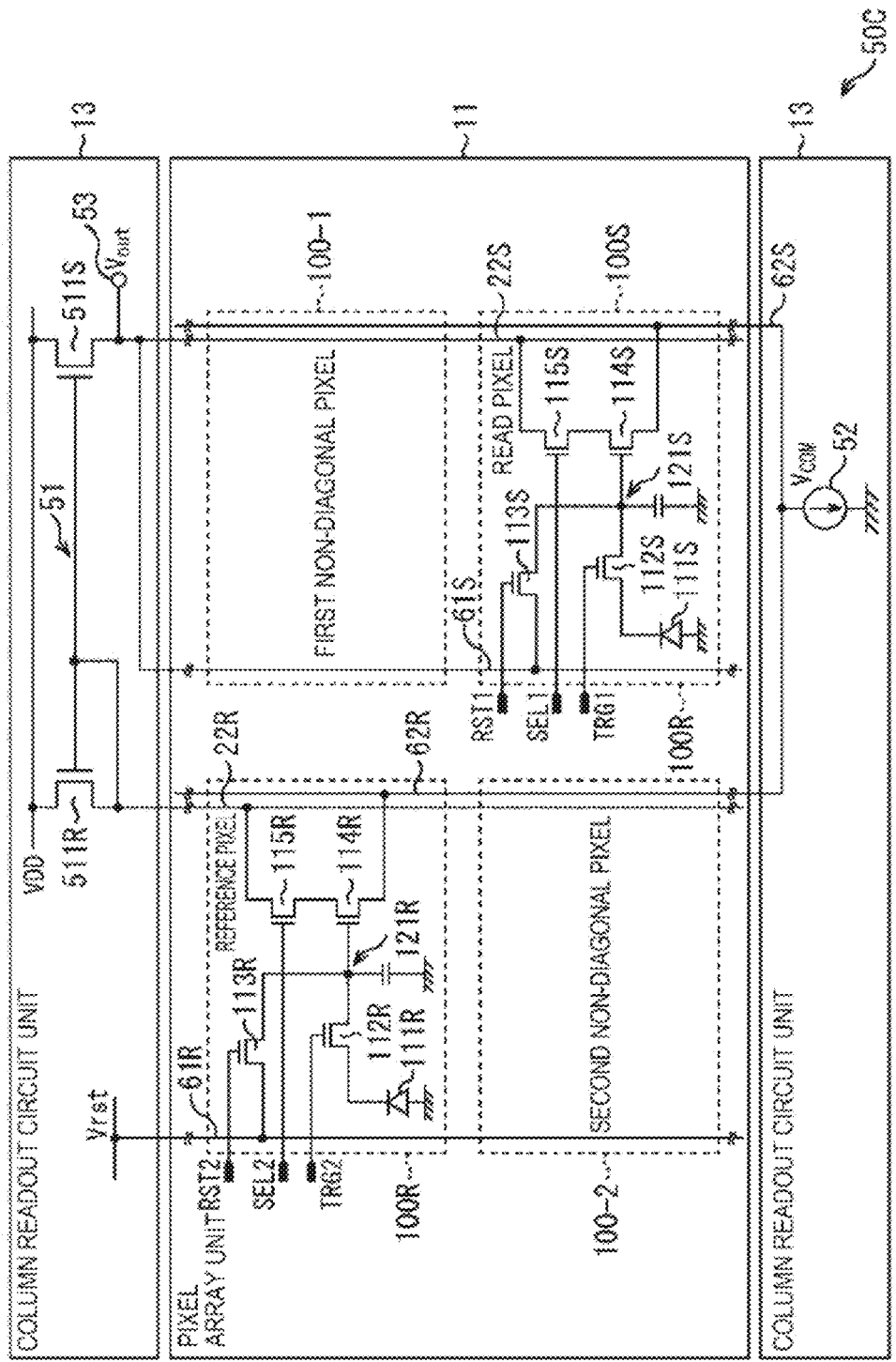
[FIG. 13]

[FIG. 13]
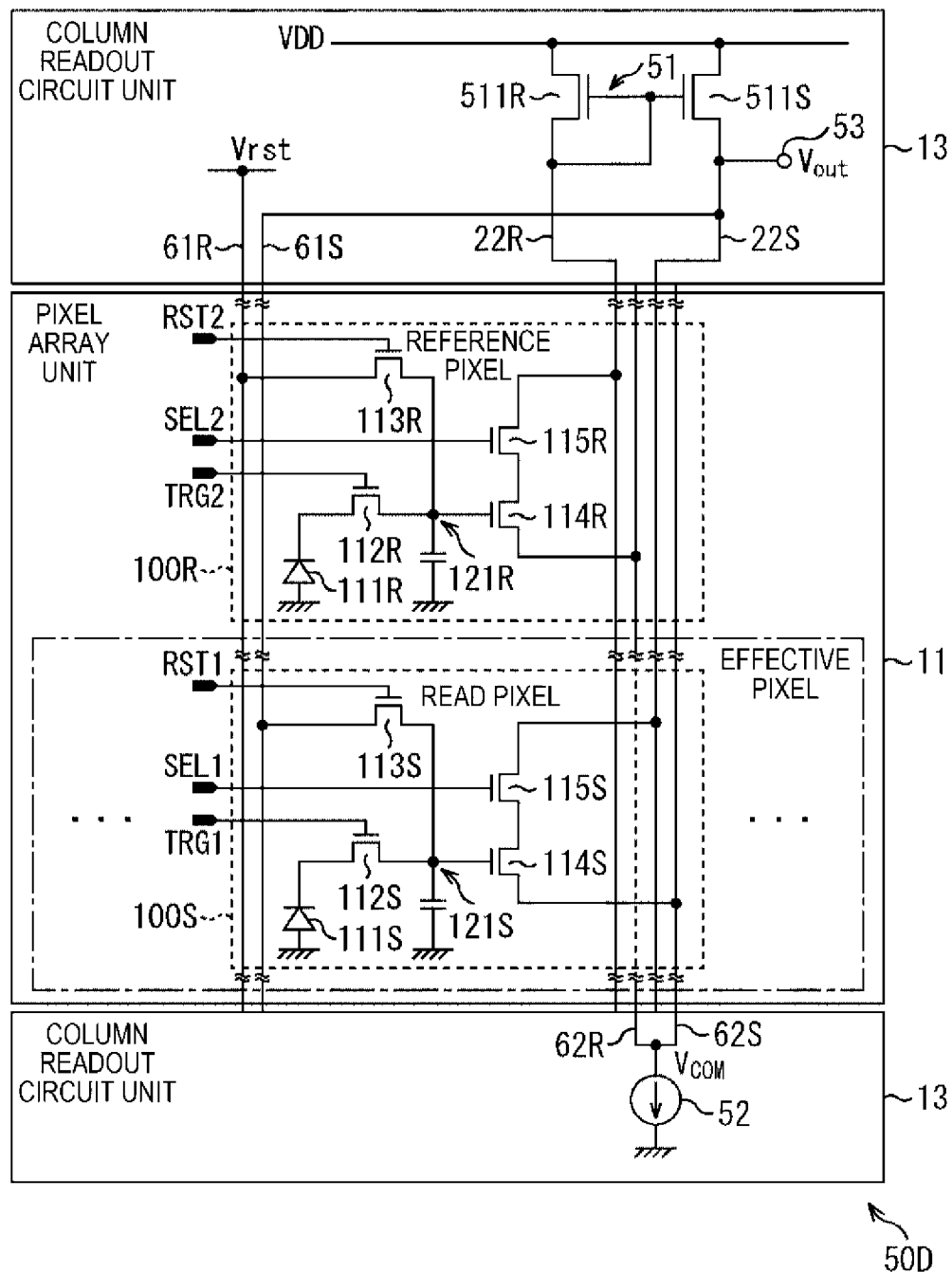

[FIG. 14]
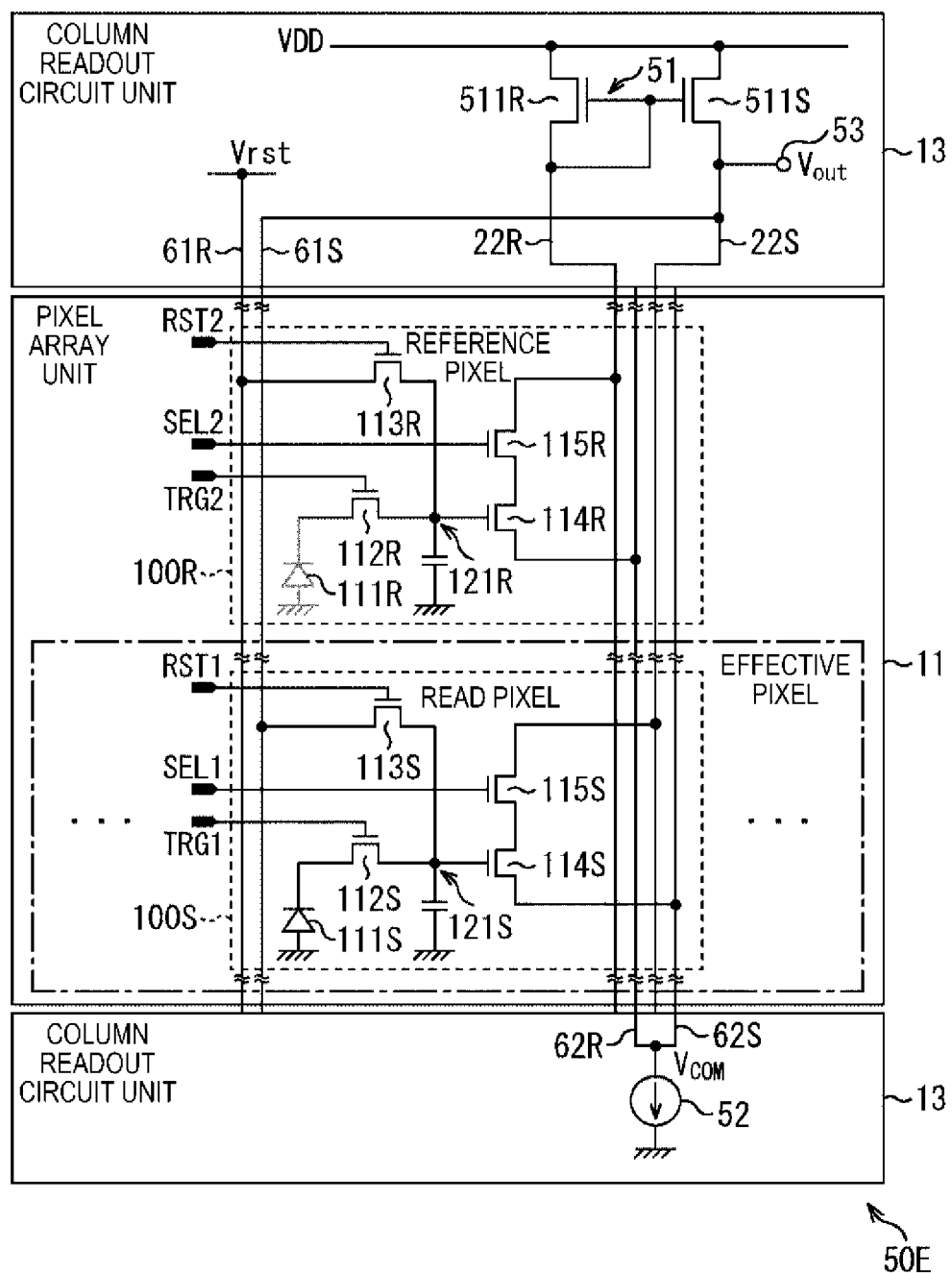

[FIG. 15]
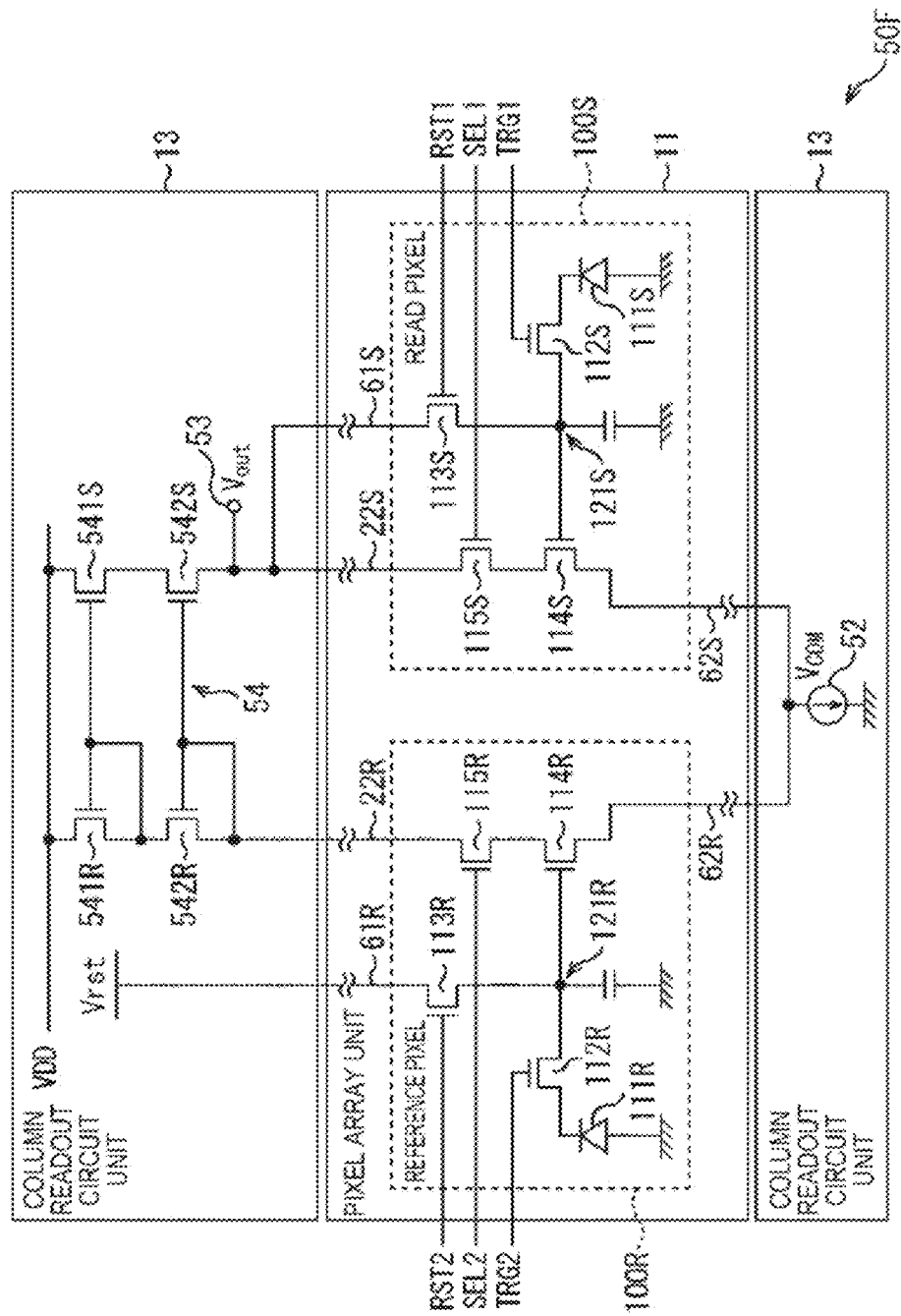

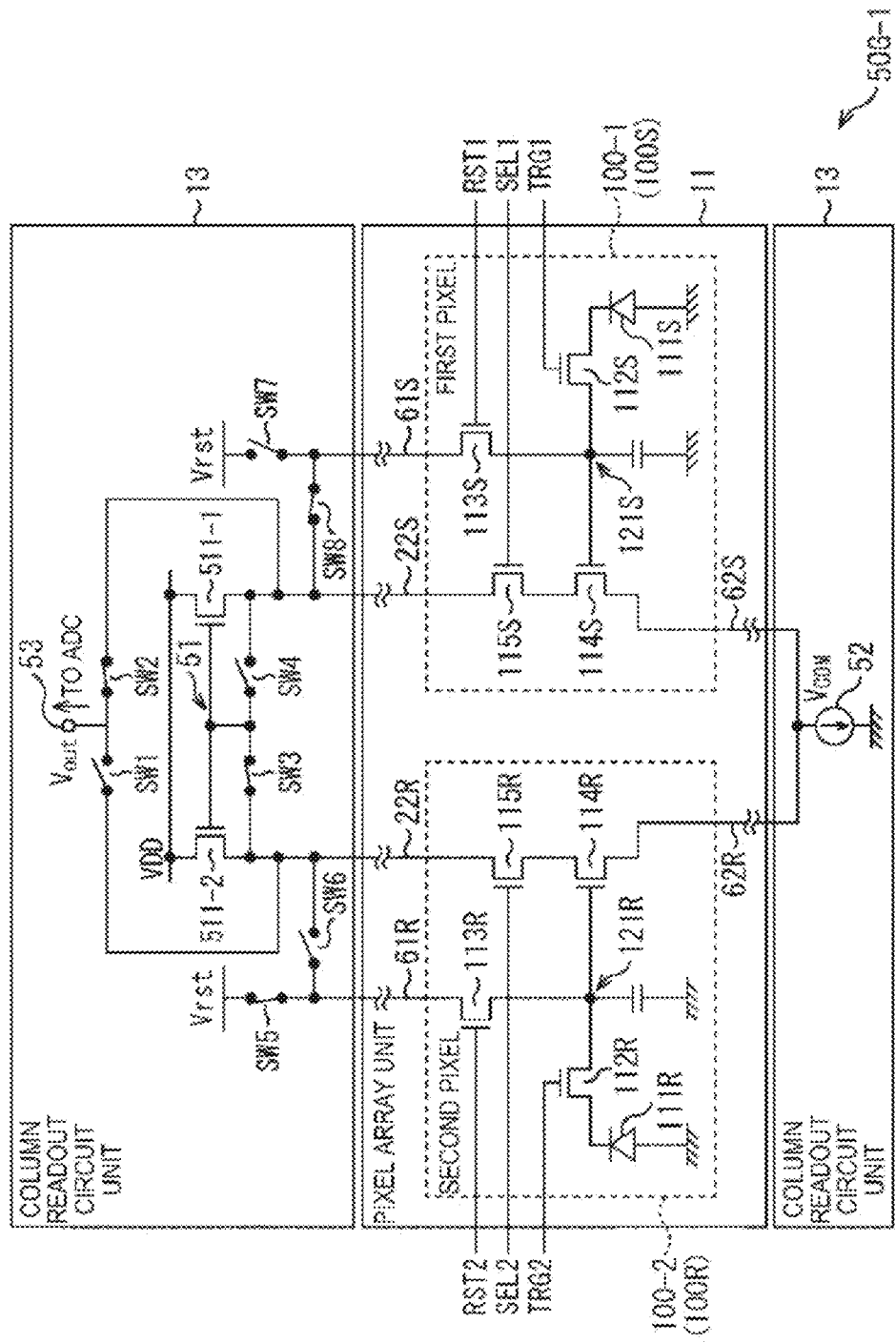
[FIG. 16]

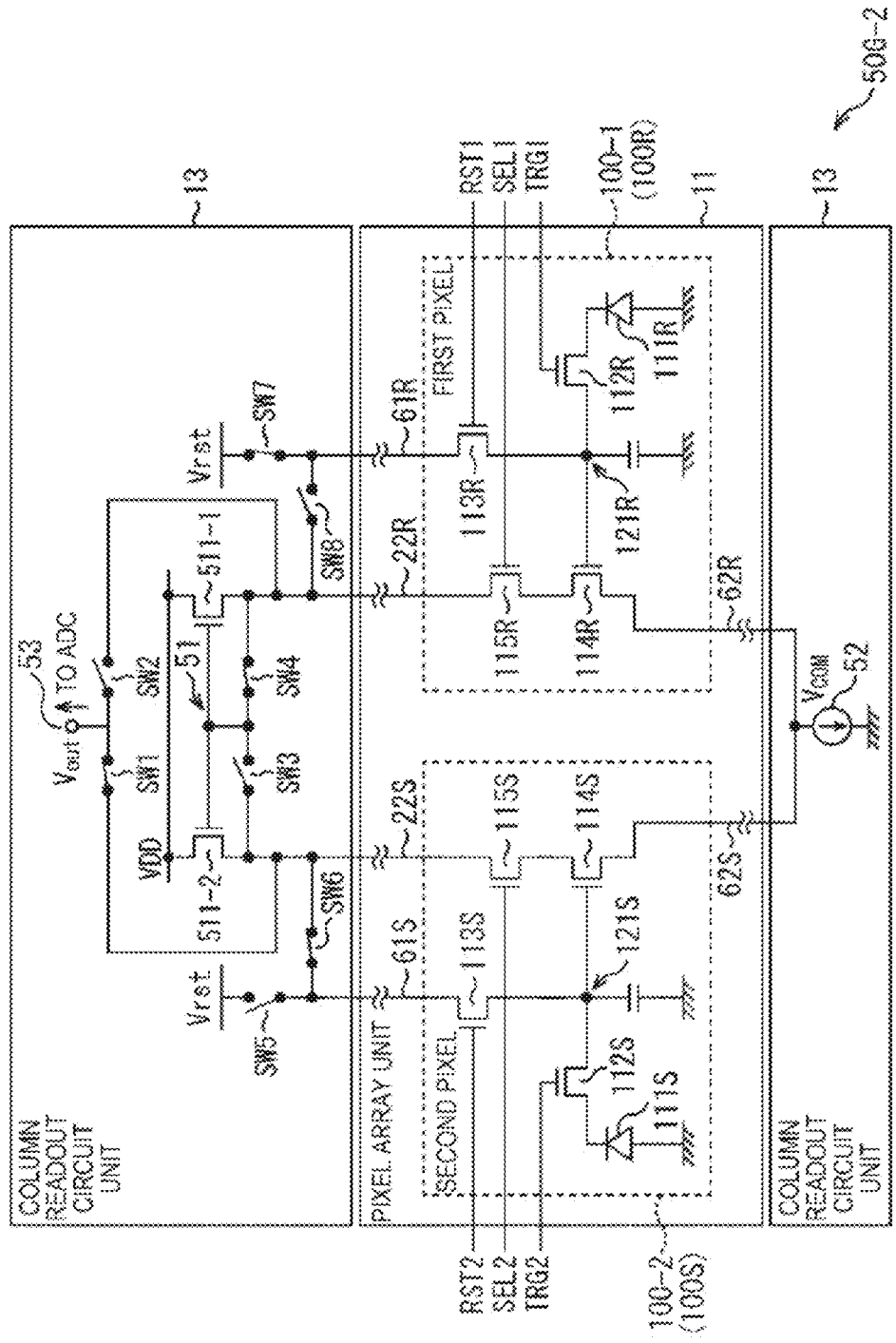
[FIG. 17]

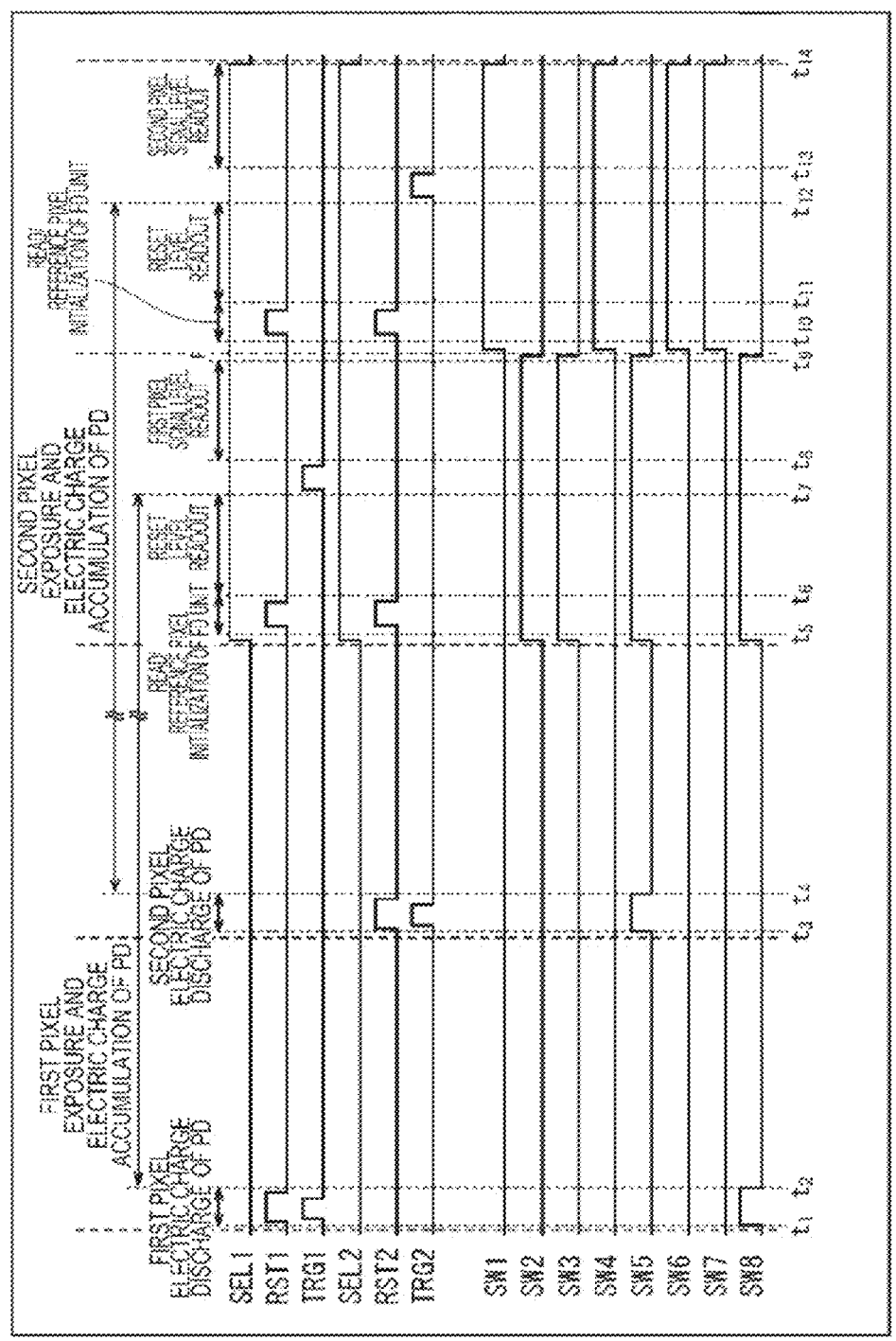
[FIG. 18]

[FIG. 19]
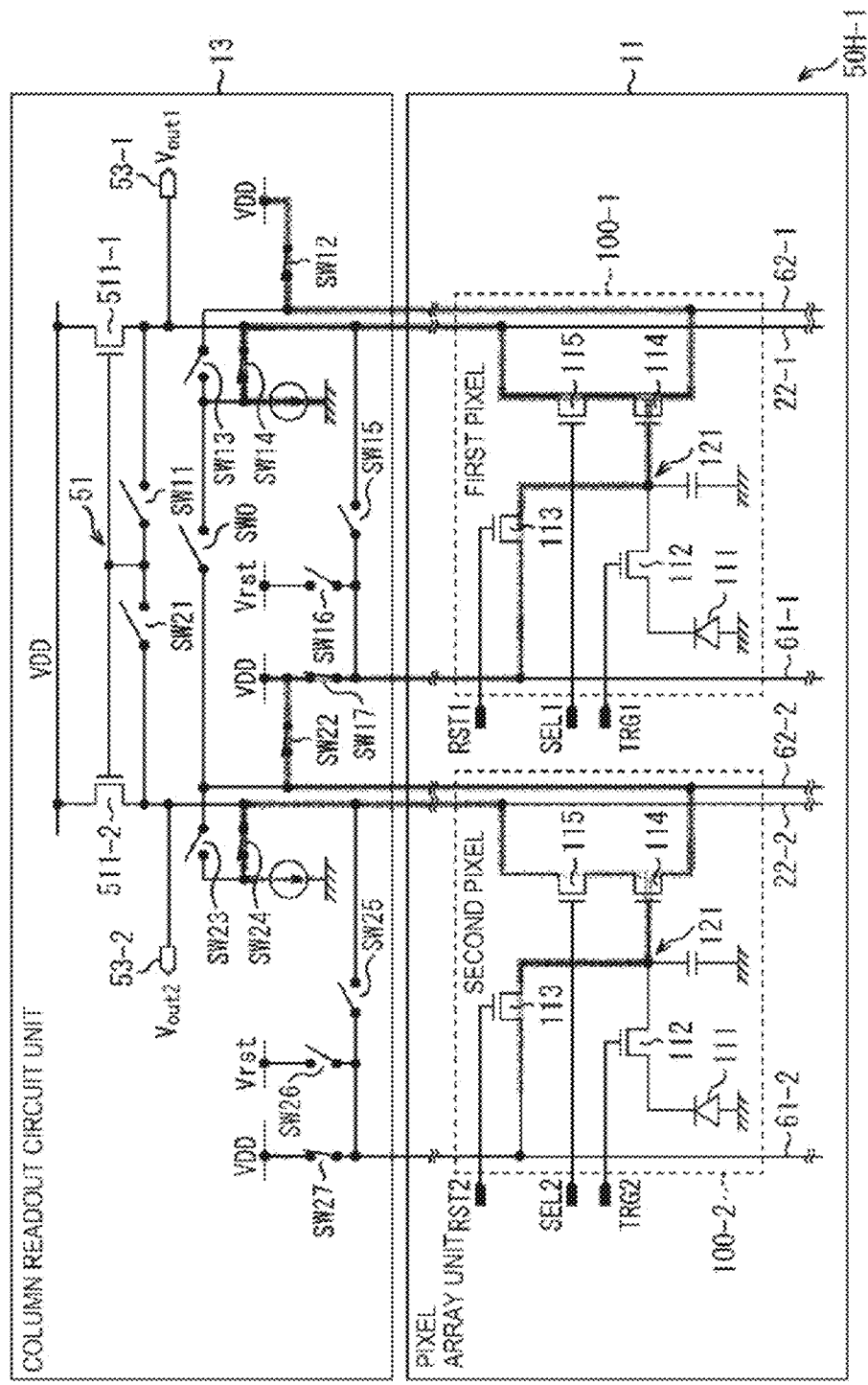

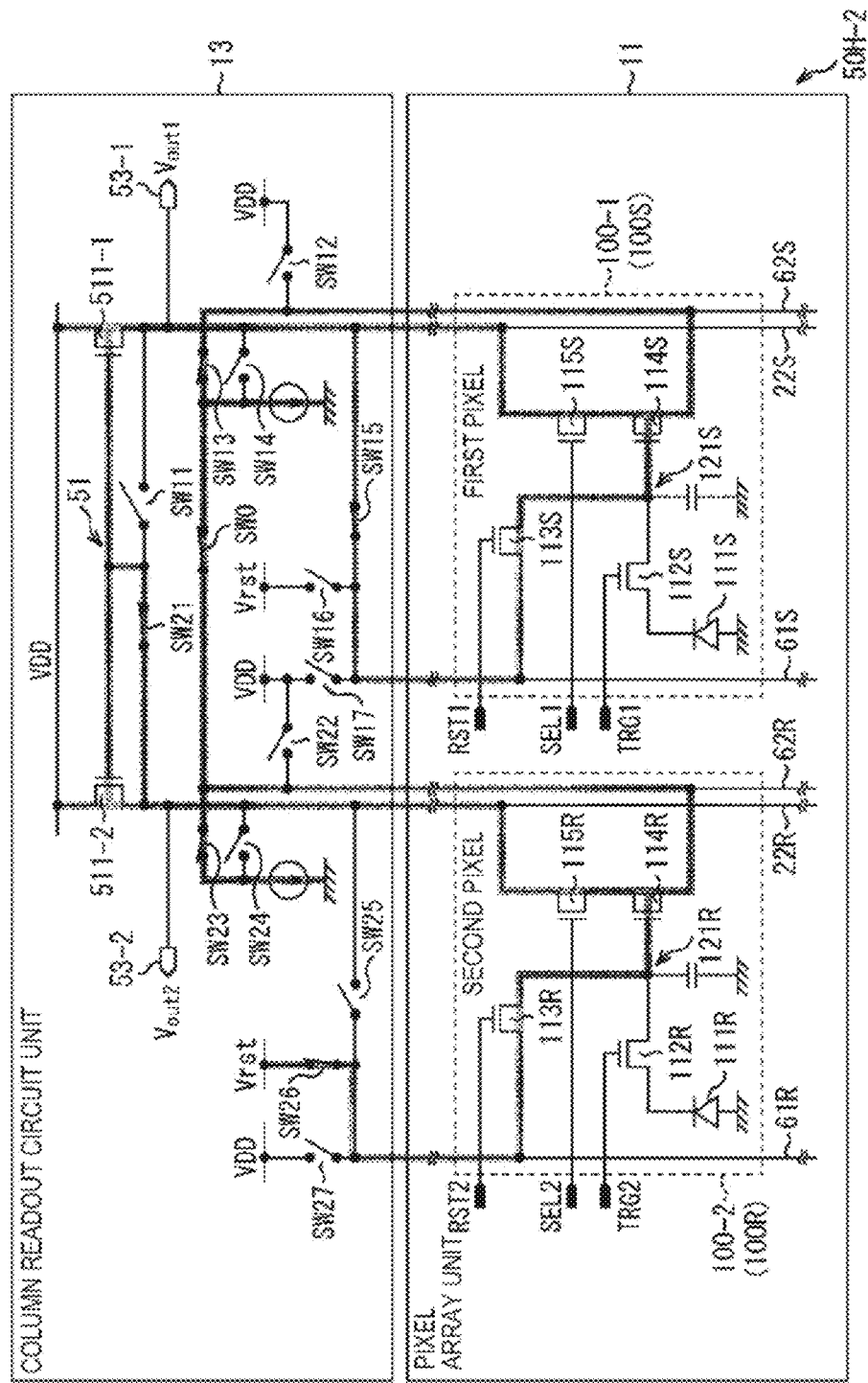
[FIG. 20]

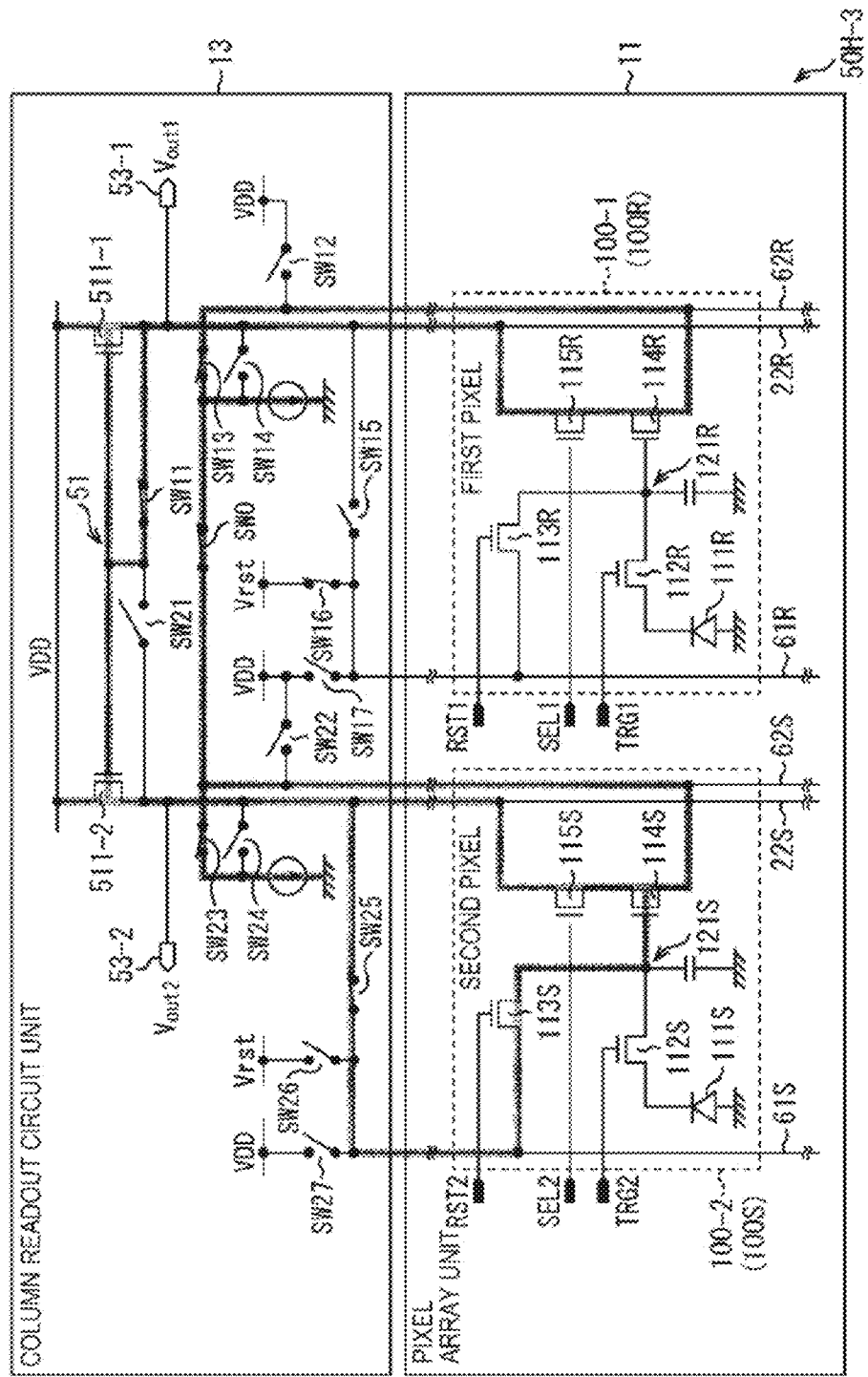
[FIG. 21]

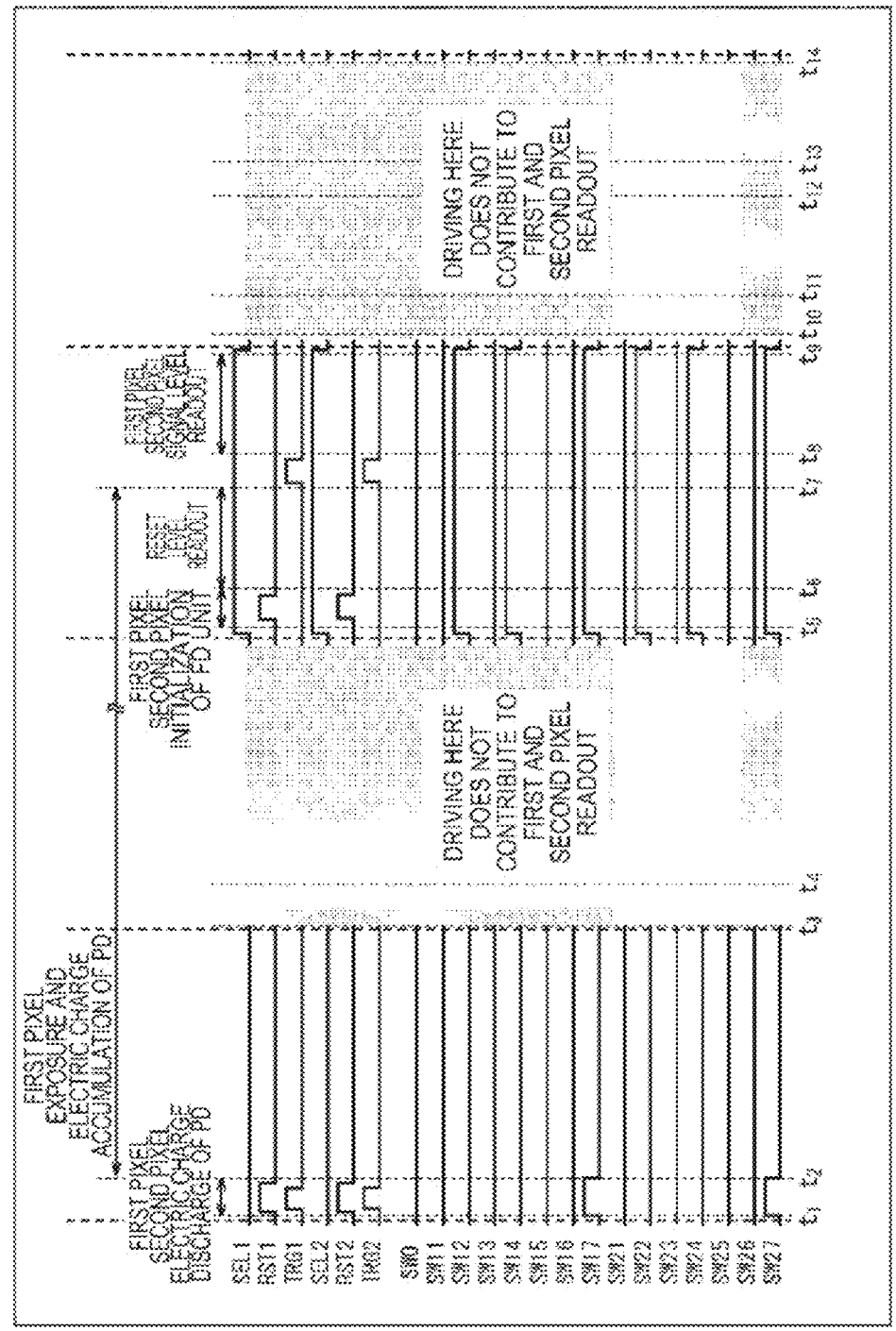
[FIG. 22]

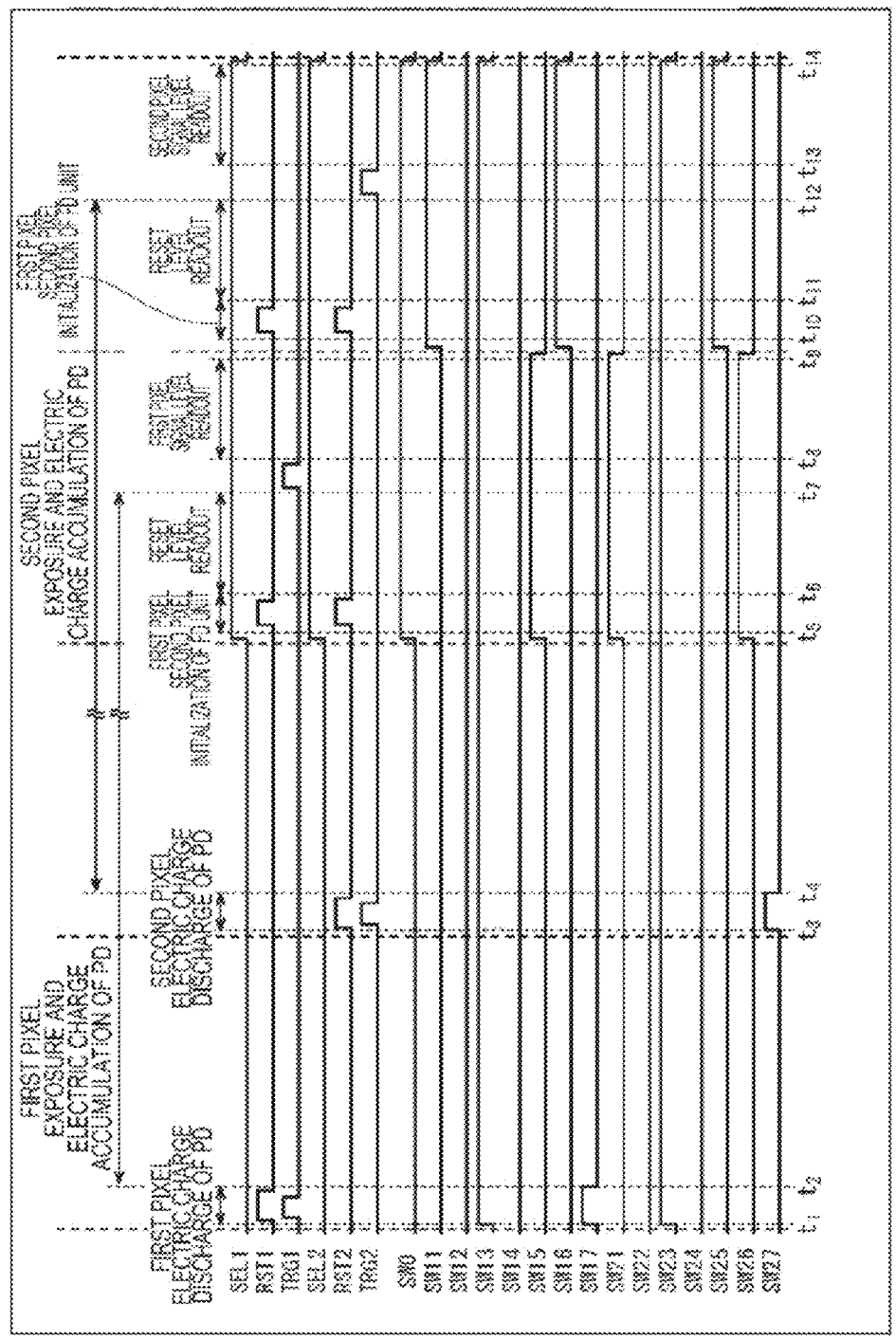
[FIG. 23]

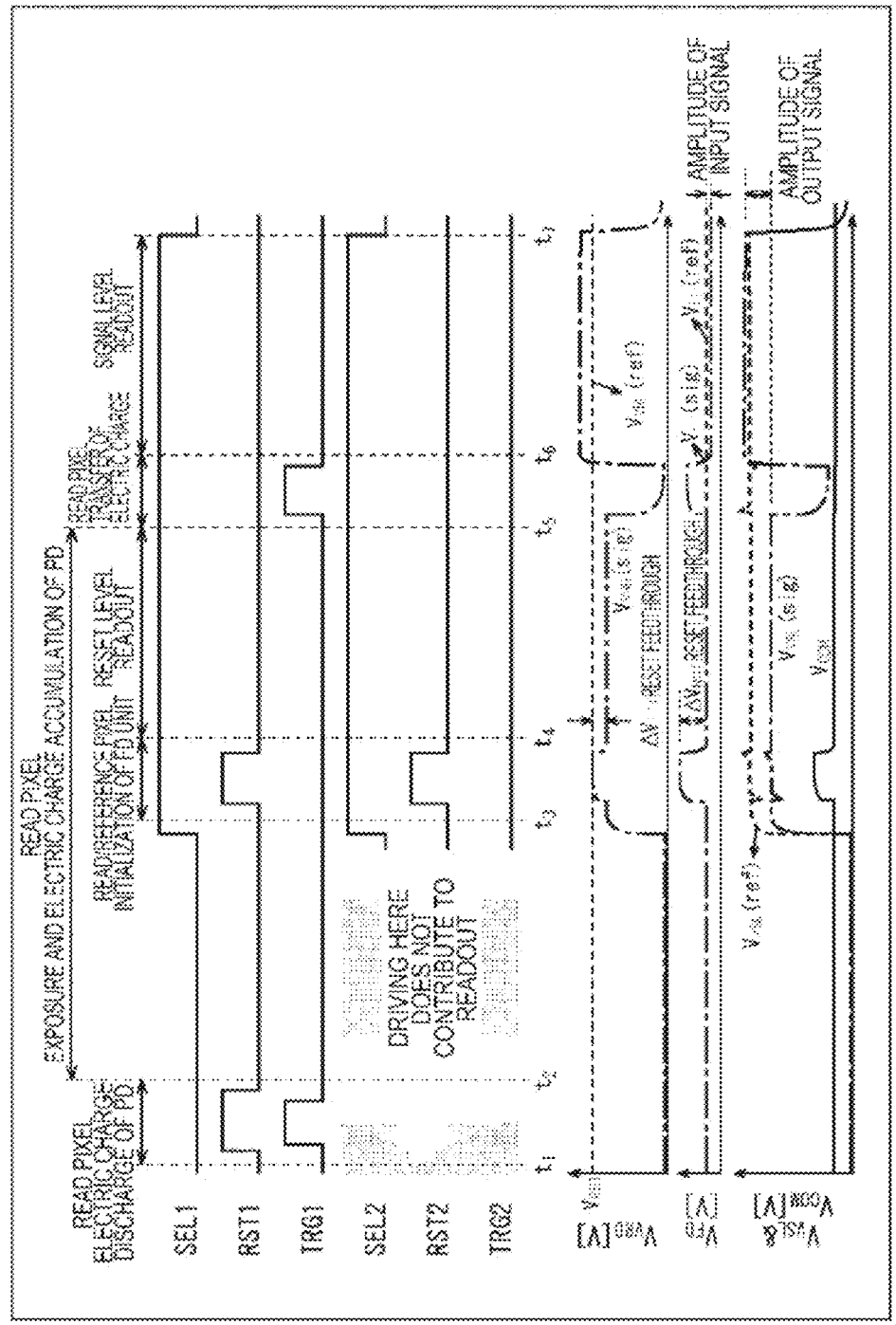
[FIG. 24]

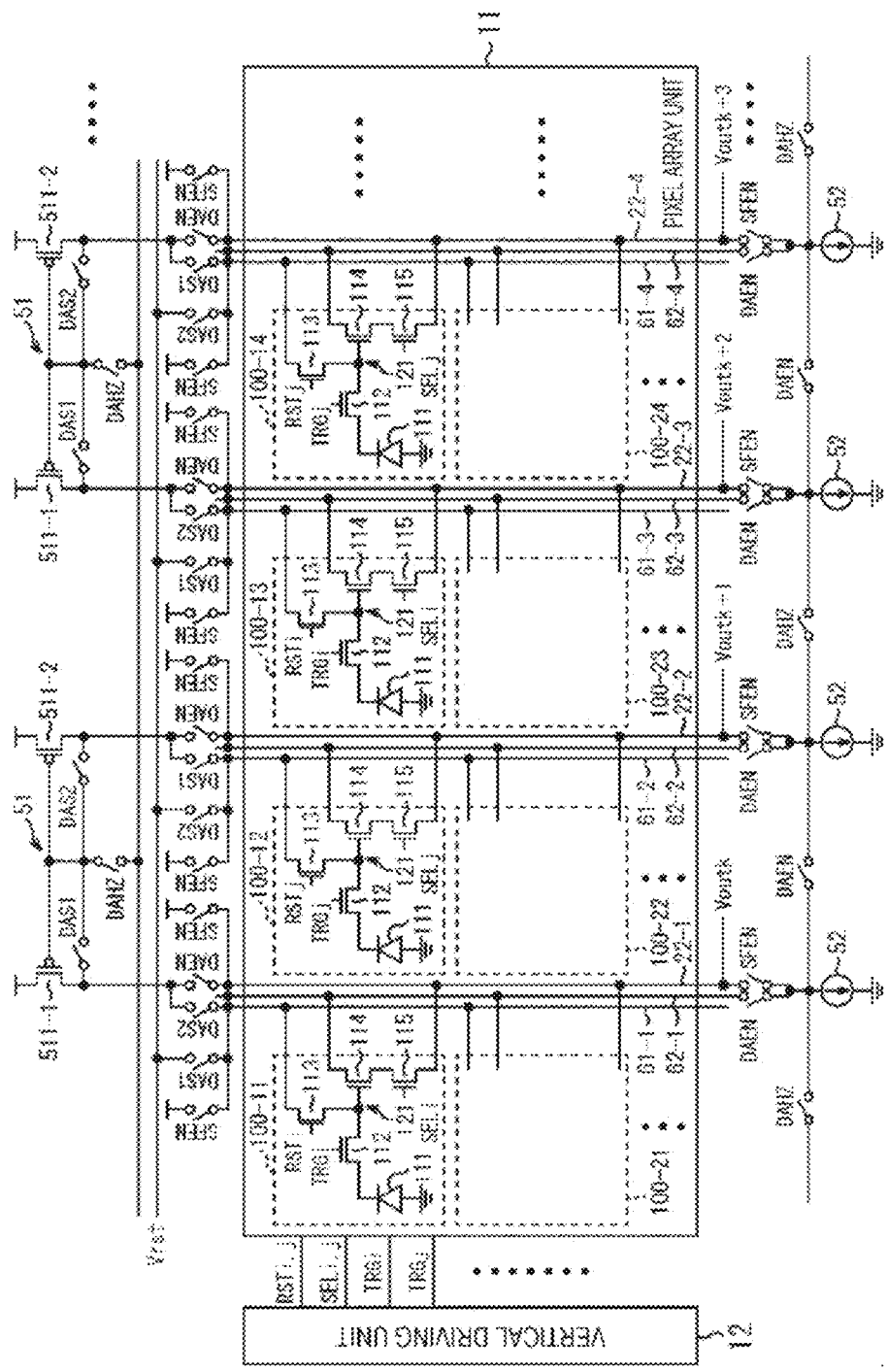

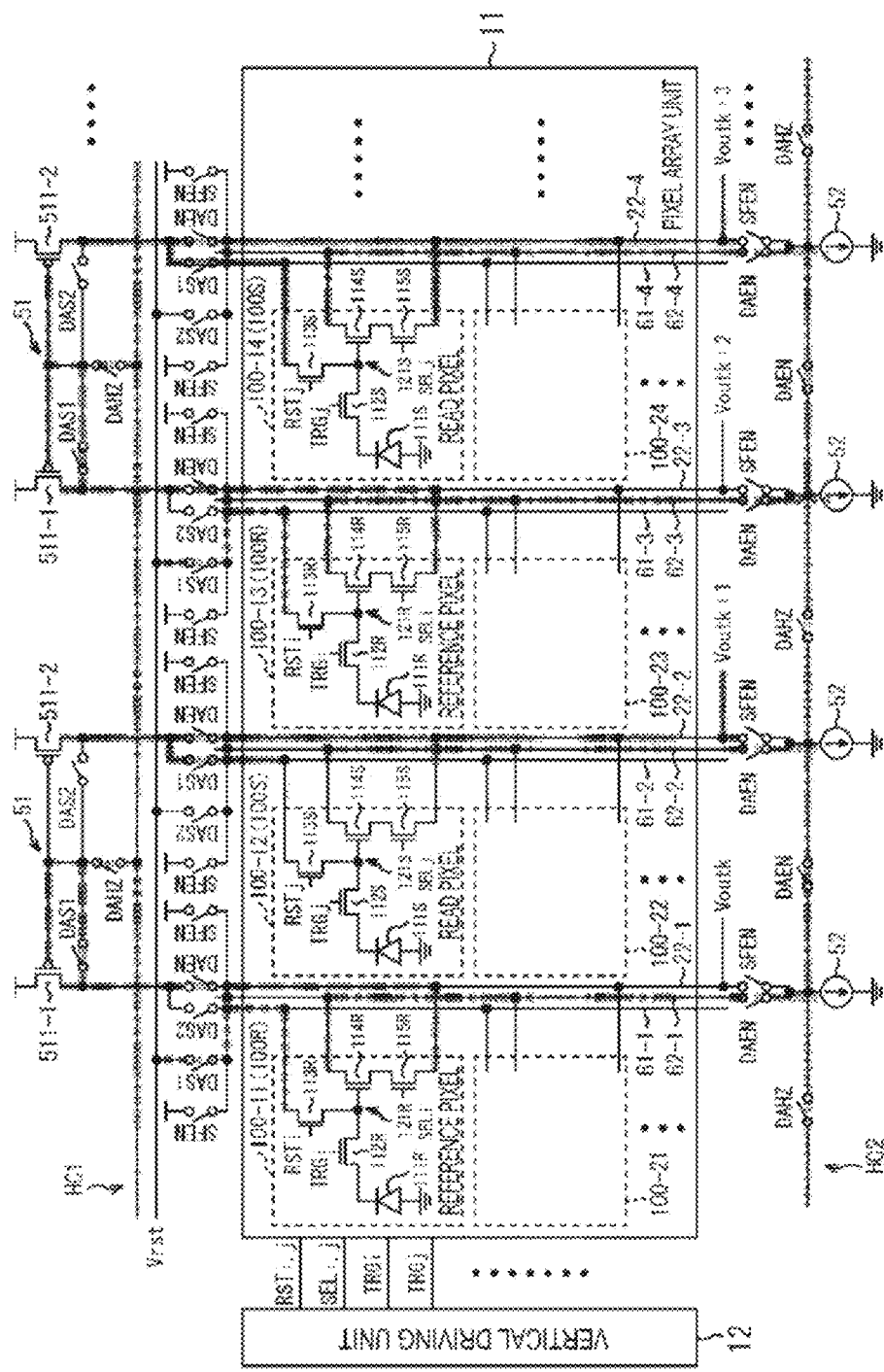
[FIG. 26]

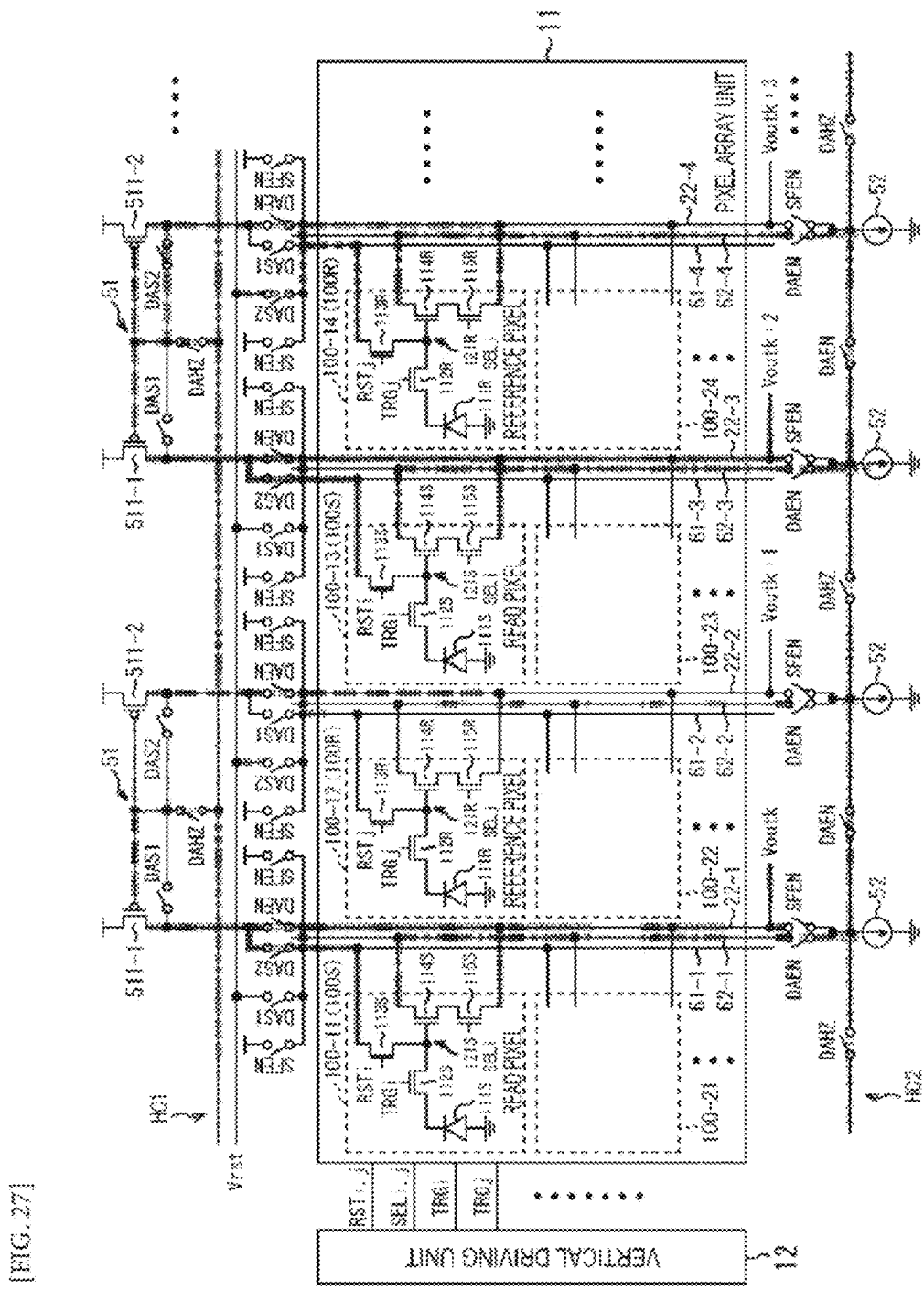

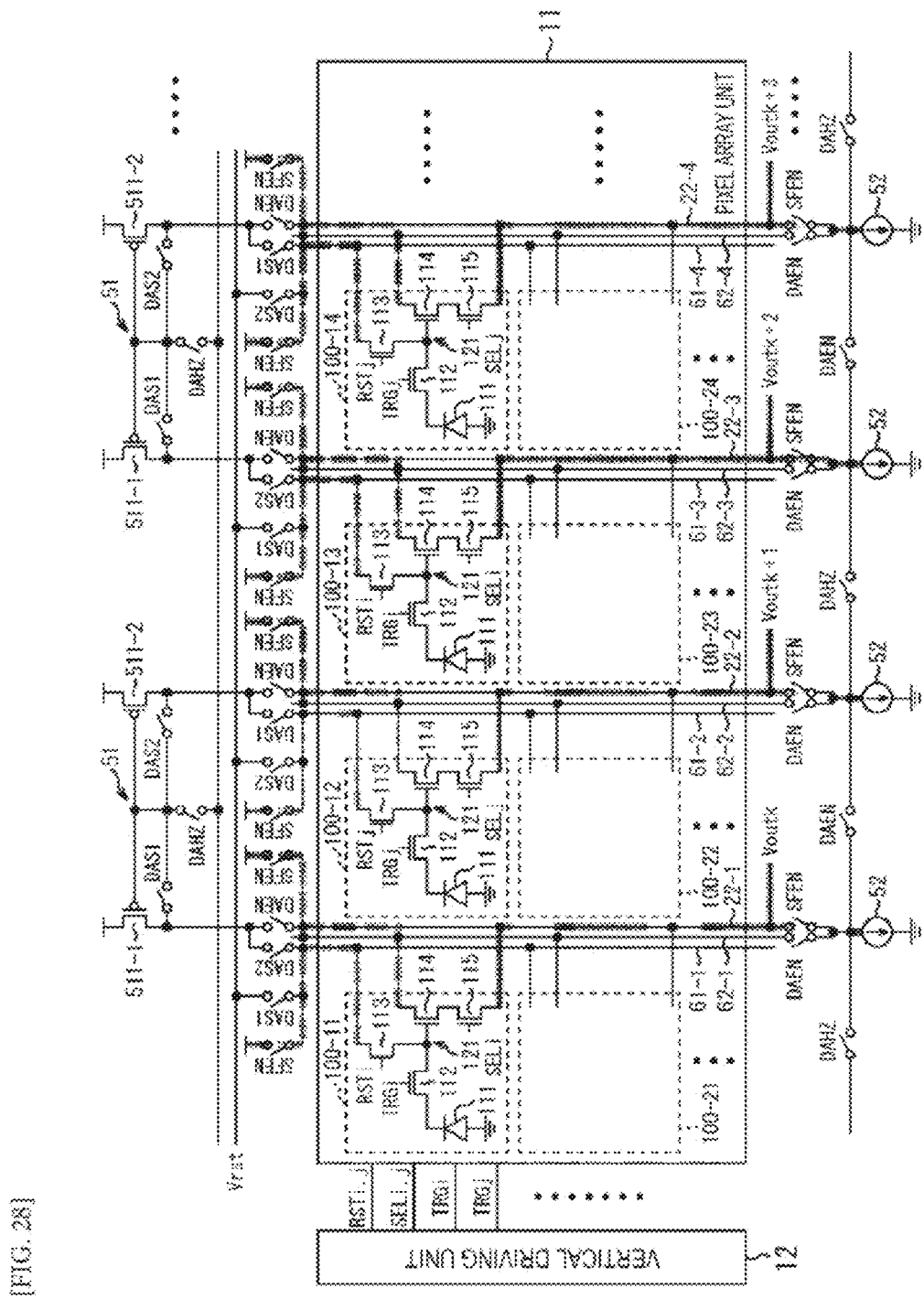
[FIG. 28]

[FIG. 29]
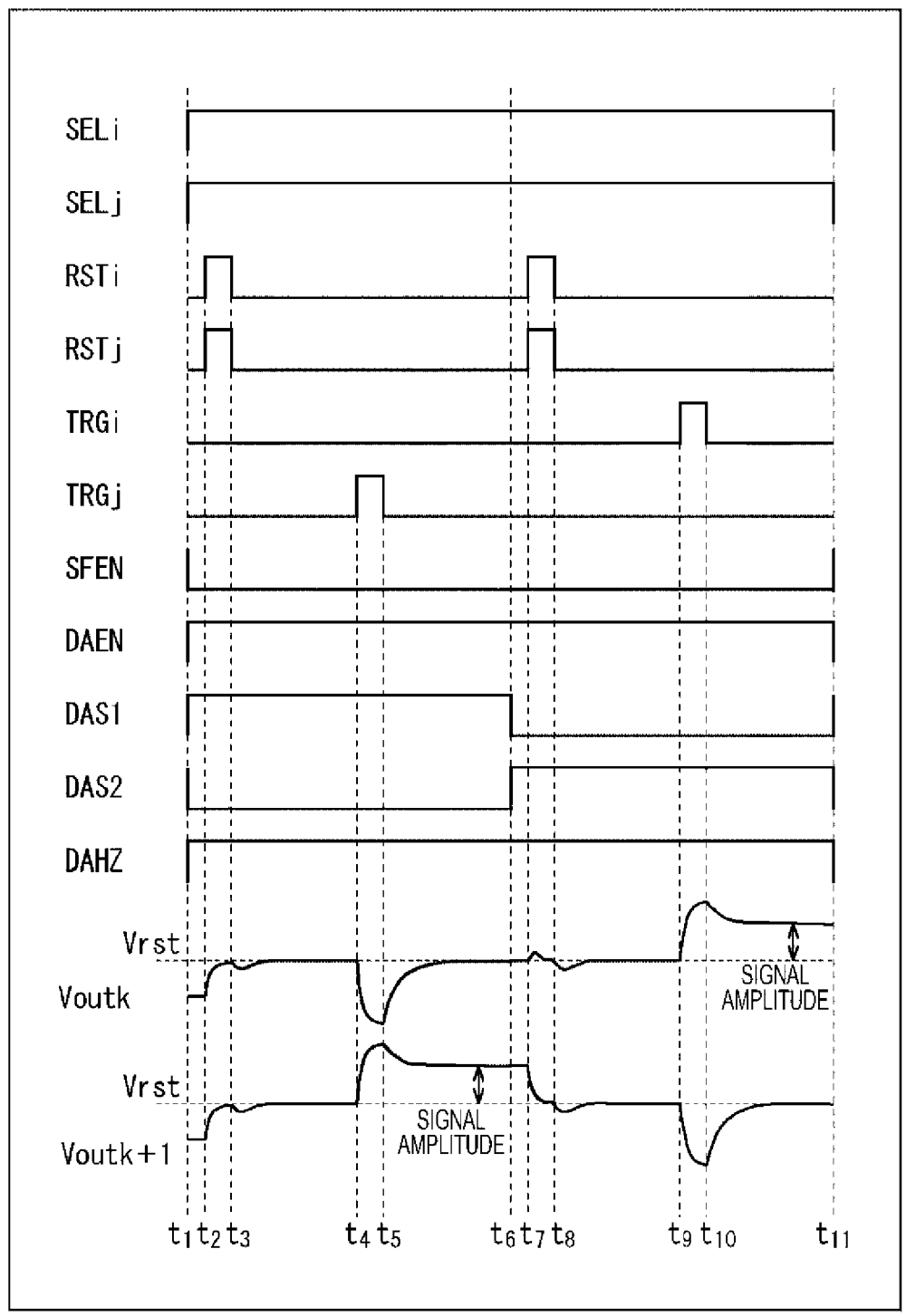

[FIG. 30]
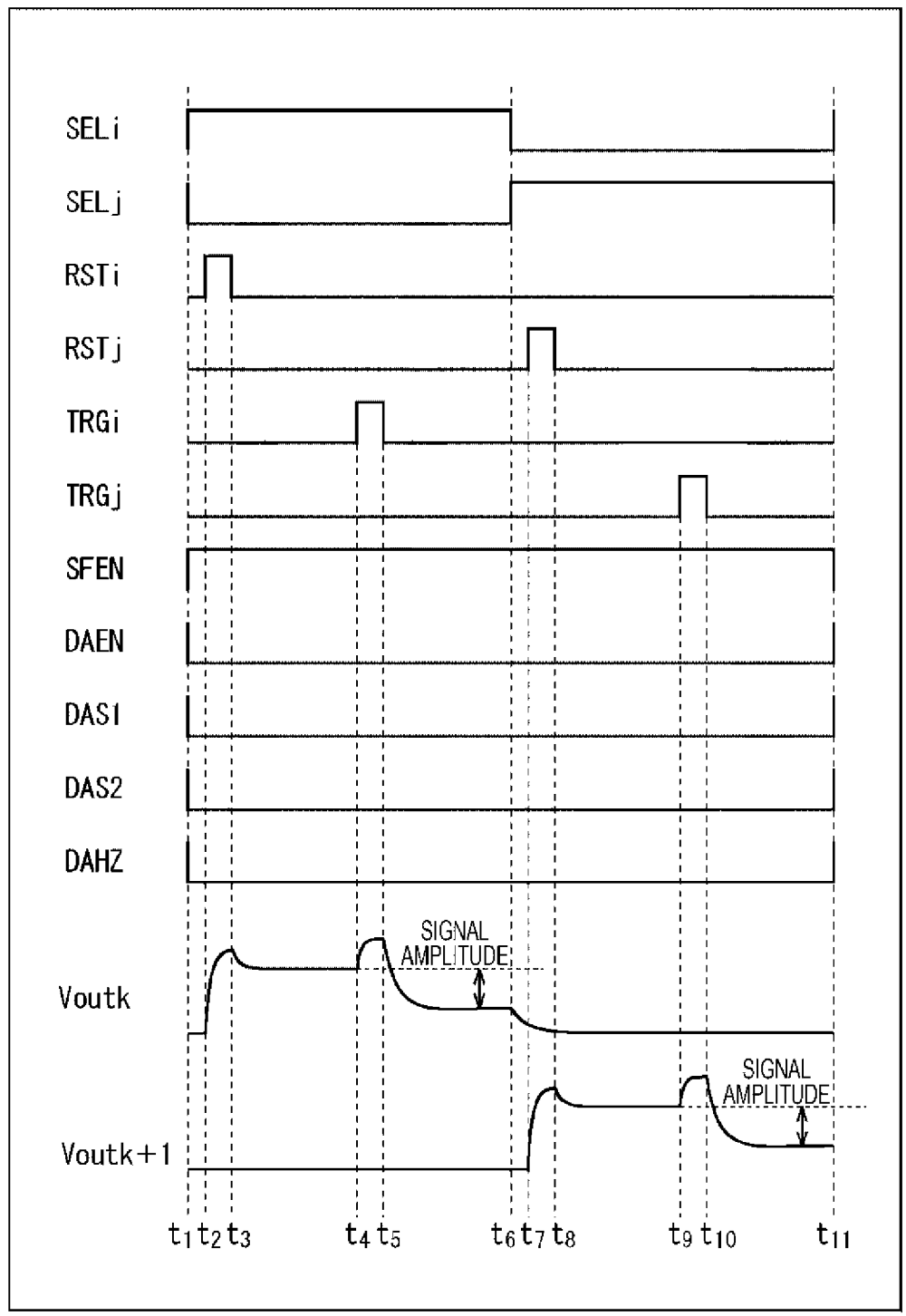

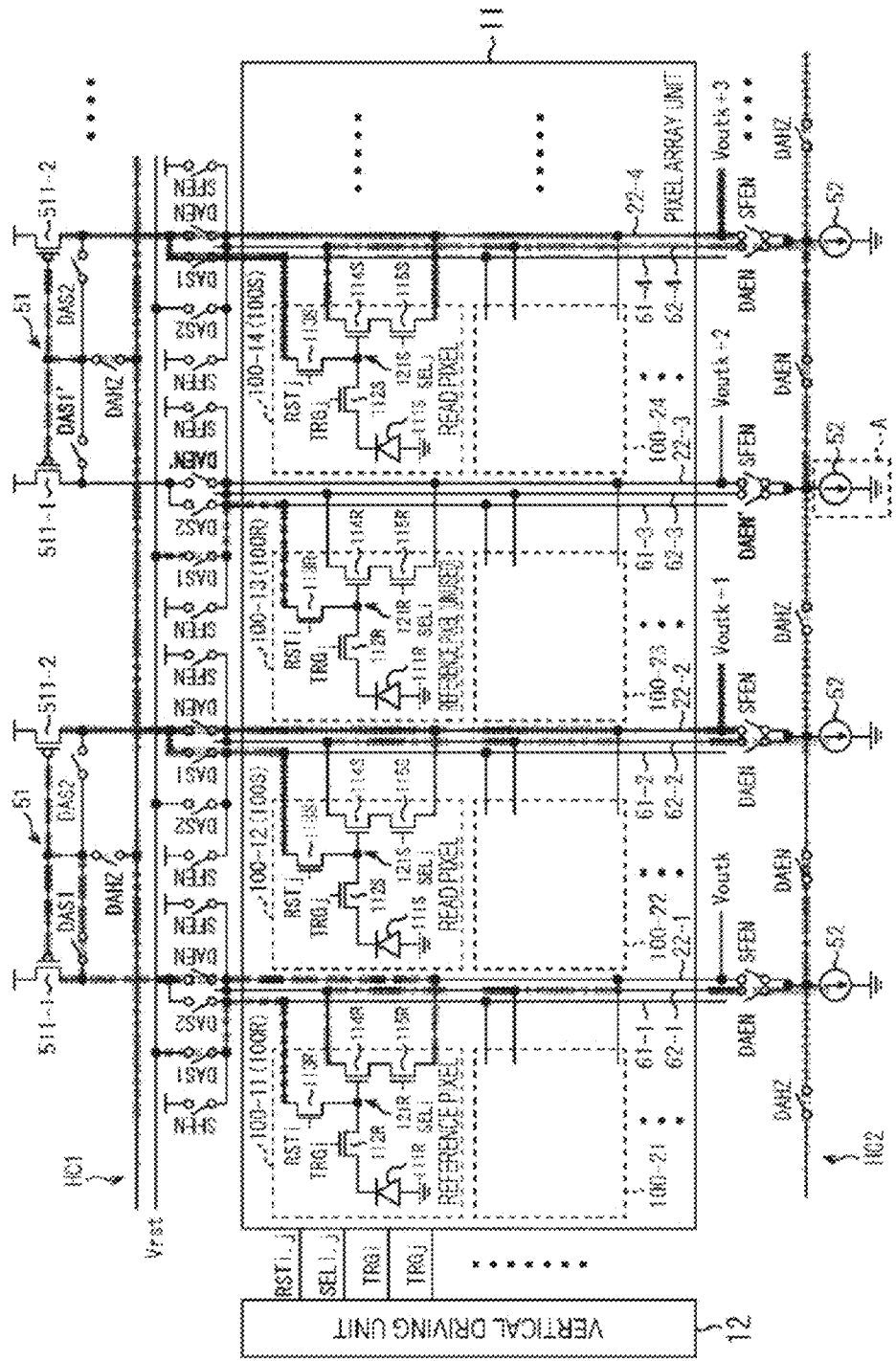
[FIG. 31]

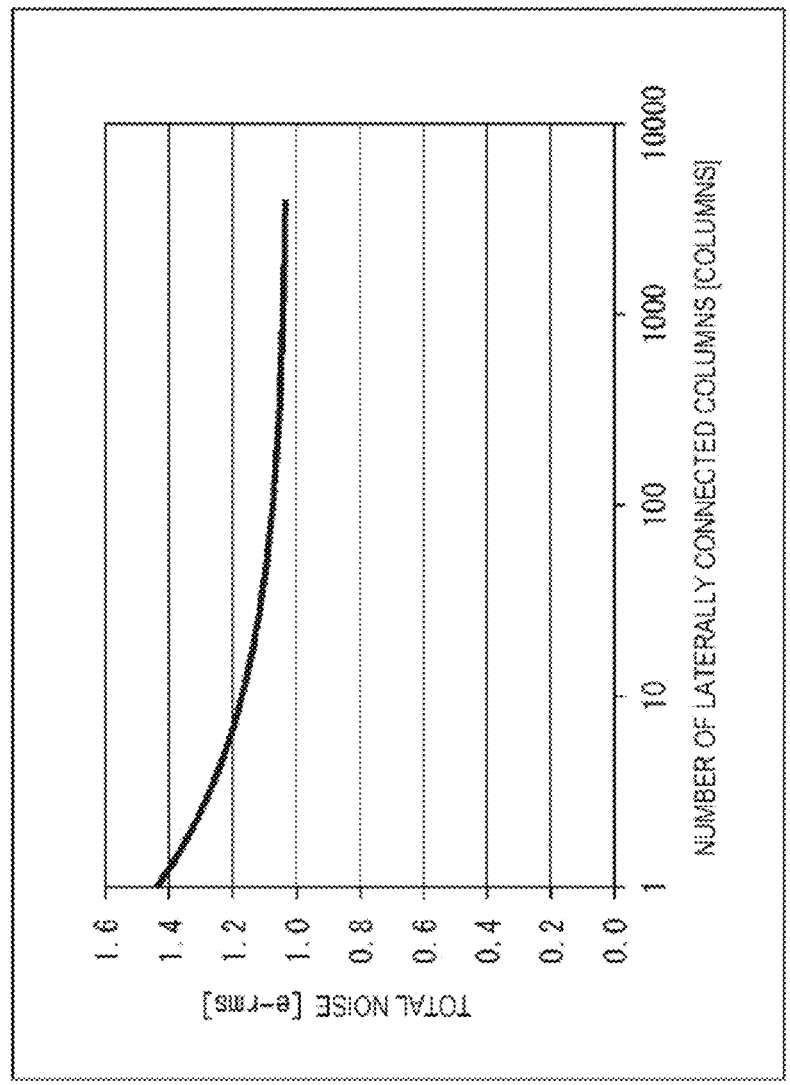
[FIG. 32]

[FIG. 33]
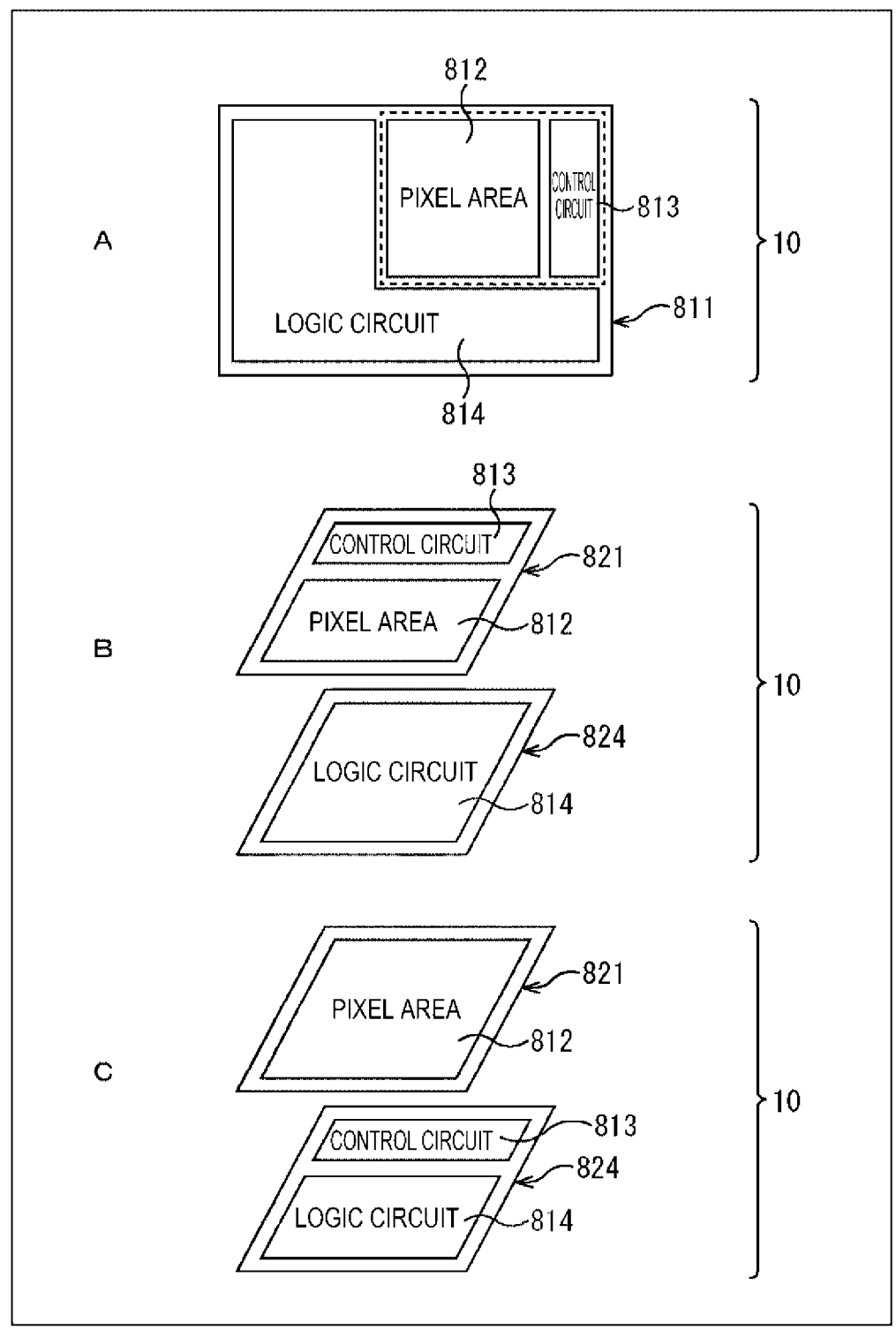

[FIG. 34]
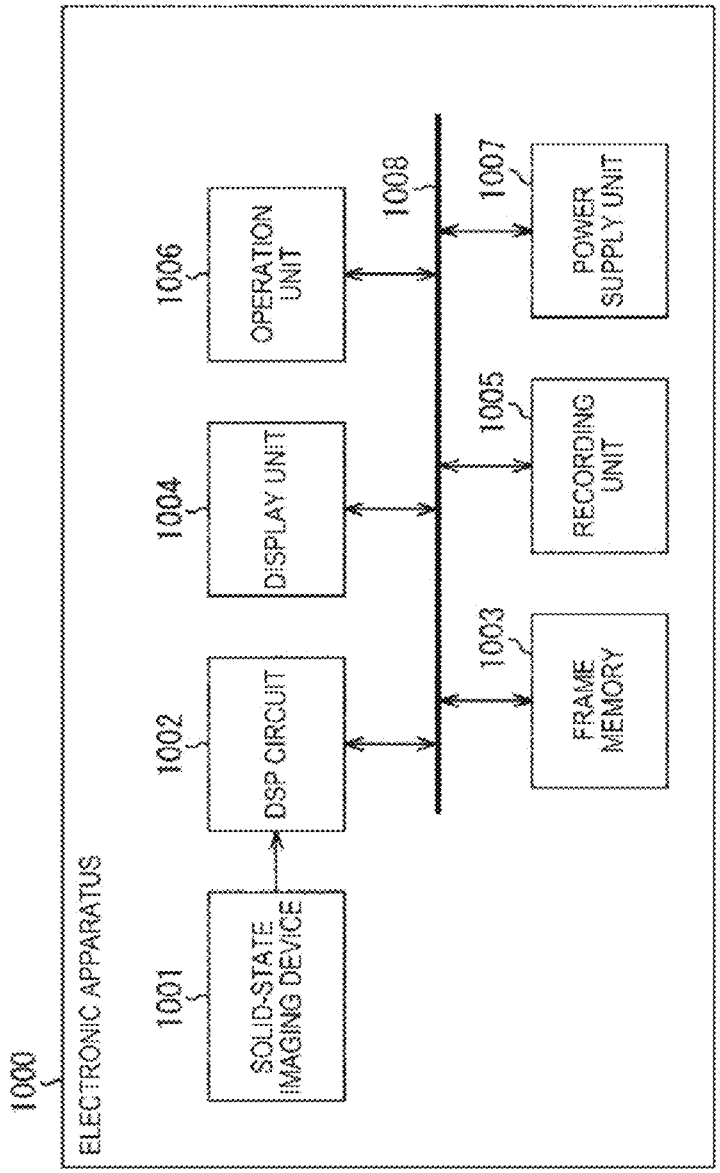

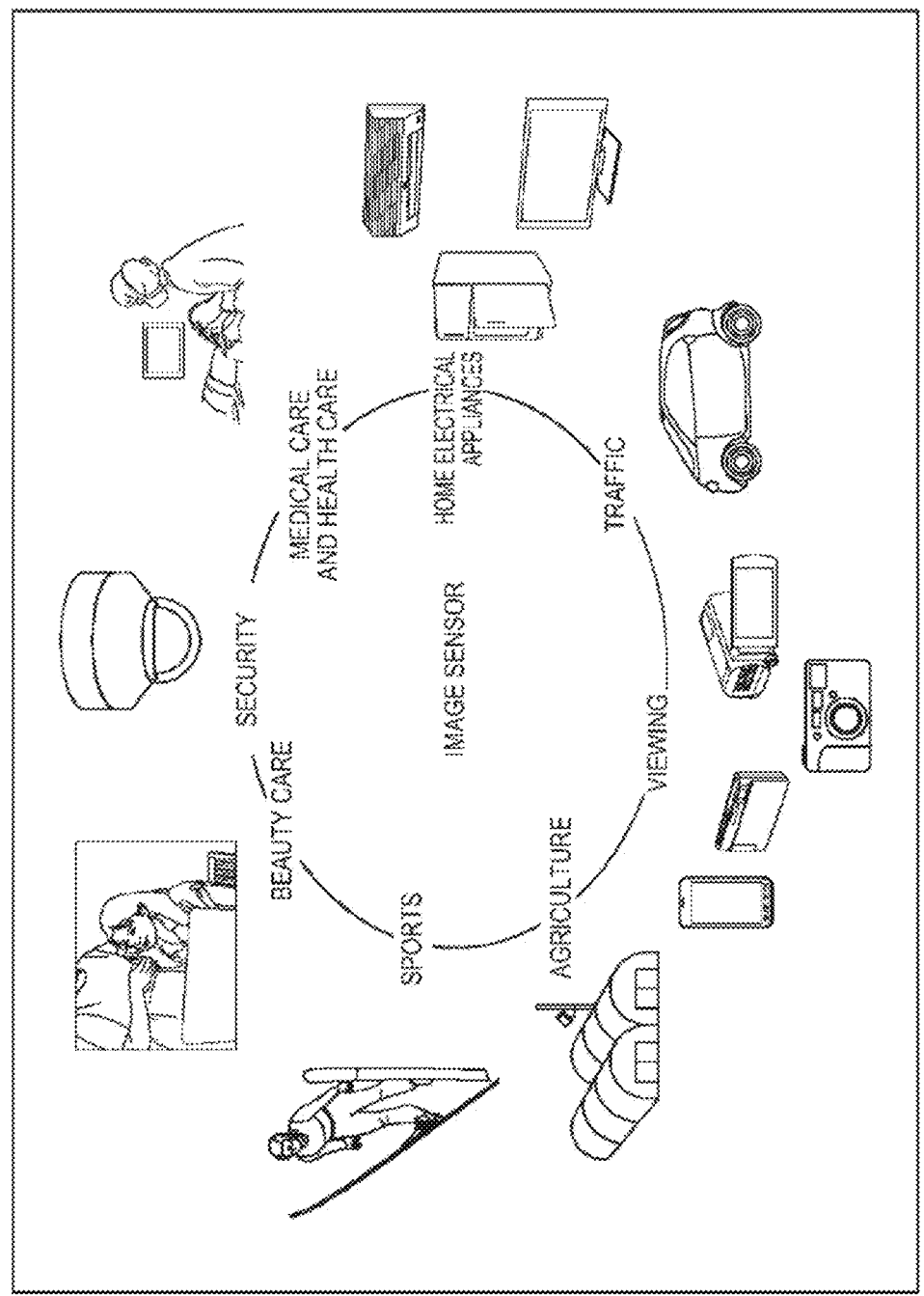
[FIG. 35]

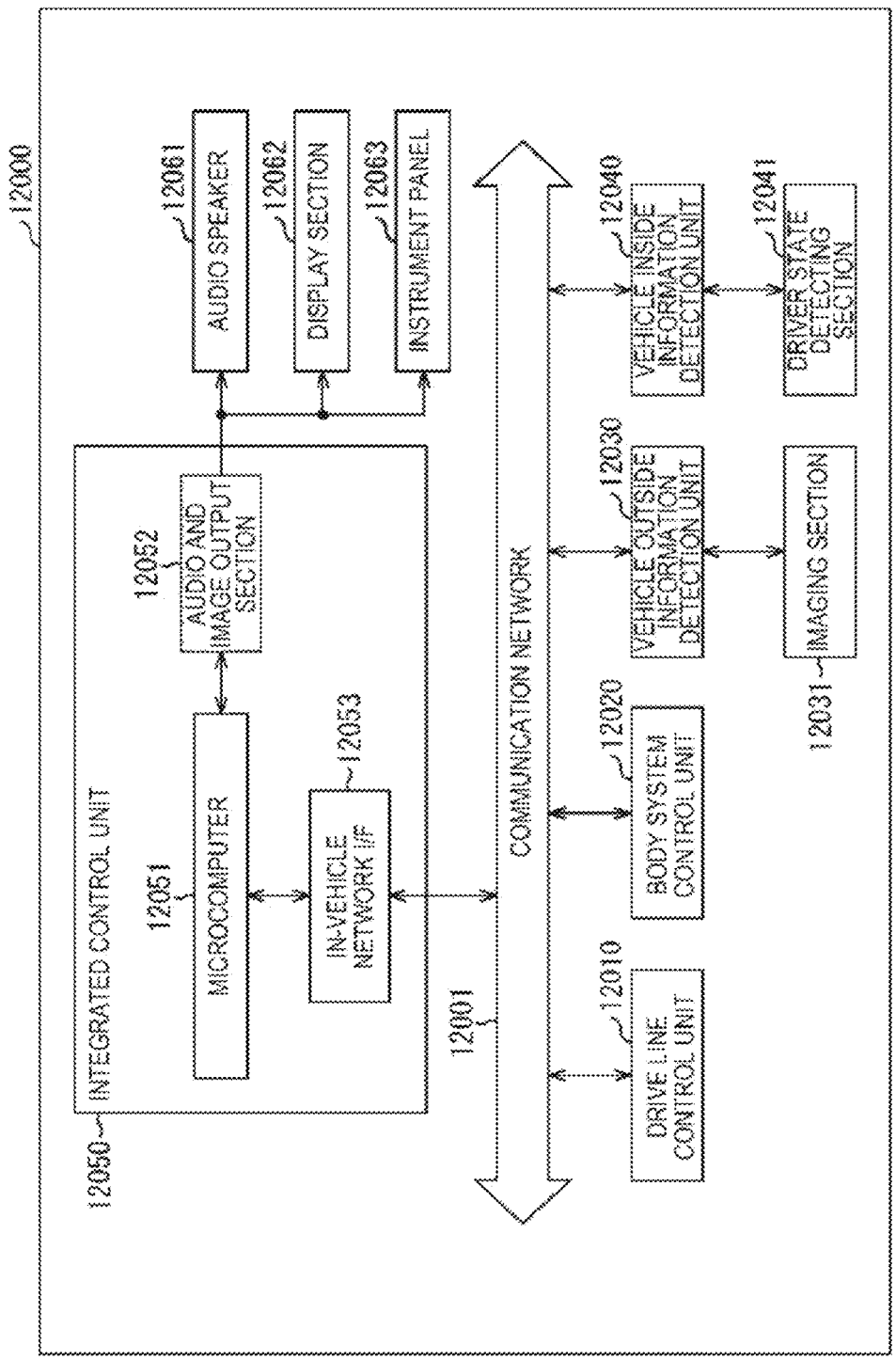
[FIG. 36]

[FIG. 37]
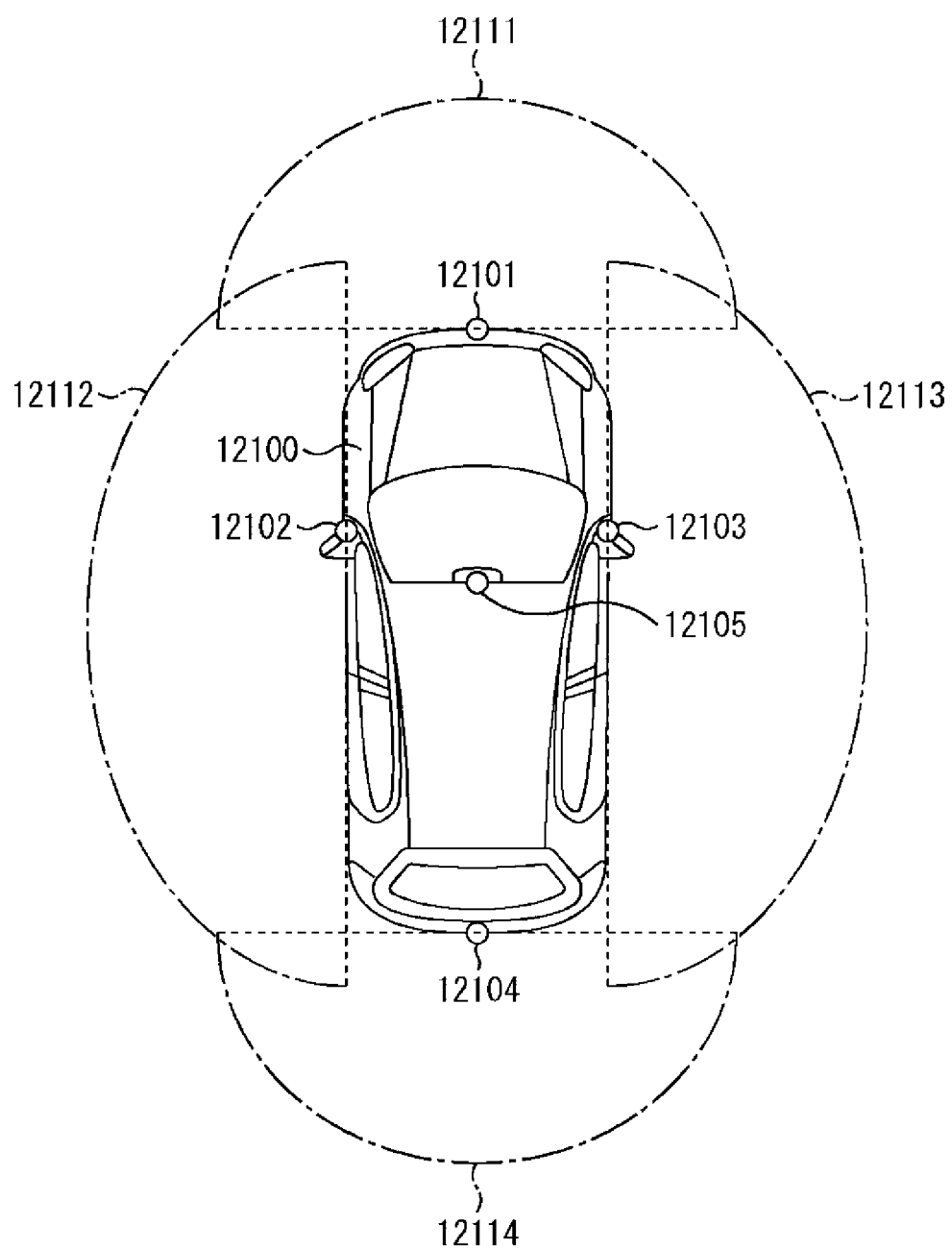

SIGNAL PROCESSING DEVICE AND SOLID-STATE IMAGING DEVICE

TECHNICAL FIELD

The present technology relates to a signal processing device and a solid-state imaging device, and particularly to a signal processing device and a solid-state imaging device which can provide a differential amplifier circuit that realizes high conversion efficiency.

CROSS REFERENCE TO RELATED APPLICATIONS

This application claims the benefit under 35 U.S.C. § 371 as a U.S. National Stage Entry of International Application No. PCT/JP2018/012714, filed in the Japanese Patent Office as a Receiving Office on Mar. 28, 2018, which claims priority to Japanese Priority Patent Application JP 2017-078184 filed Apr. 11, 2017, each of which is hereby incorporated by reference herein in its entirety.

BACKGROUND ART

In recent years, complementary metal oxide semiconductor (CMOS) image sensors have become widespread. For CMOS image sensors, source follower circuits are widely used as circuits that read signal charges that have been photoelectrically converted by a plurality of pixels arrayed in a pixel array unit (e.g., refer to PTL1).

In addition, there is a signal readout configuration using a source-grounded circuit or a differential amplifier circuit in addition to a source follower circuit (e.g., refer to PTL 2).

CITATION LIST

Patent Literature

PTL 1: JP 2005-311487A
PTL 2: JP 2008-271280A

SUMMARY OF INVENTION

Technical Problem

However, while a signal can be read with high conversion efficiency in a case in which signal readout is performed using a differential amplifier circuit, there can be a disadvantage, and thus further improvement is demanded.

In consideration of the above circumstance, it is desirable to provide a differential amplifier circuit that realizes high conversion efficiency.

Solution to Problem

According to the present disclosure, there is provided an imaging device. The imaging device comprises differential amplifier circuitry comprising a first amplification transistor and a second amplification transistor and a plurality of pixels including a first pixel and a second pixel, wherein the first pixel includes a first photoelectric converter, a first reset transistor, and the first amplification transistor, and wherein the second pixel includes a second photoelectric converter, a second reset transistor, and the second amplification transistor, wherein the first reset transistor is coupled to a first reset voltage, and wherein the second reset transistor is coupled to a second reset voltage different than the first reset voltage.

Further according to the present disclosure, there is provided an imaging device. The imaging device comprises first differential amplifier circuitry comprising a first amplification transistor and a second amplification transistor, second different amplifier circuitry comprising a third amplification transistor and a fourth amplification transistor, a plurality of pixels including a first pixel, a second pixel, a third pixel, and a fourth pixel, wherein the first pixel includes a first photoelectric converter and the first amplification transistor, the second pixel includes a second photoelectric converter and the second amplification transistor, the third pixel includes a third photoelectric converter and the third amplification transistor, and the fourth pixel includes a fourth photoelectric converter and the fourth amplification transistor, a first signal line coupled to the first pixel, a second signal line coupled to the second pixel, a third signal line coupled to the third pixel, a fourth signal line coupled to the fourth pixel, a first switch circuit configured to couple the first signal line and the second signal line, a second switch circuit configured to couple the second signal line and the third signal line, and a third switch circuit configured to couple the third signal line and the fourth signal line.

Advantageous Effects of Invention

According to first and second embodiments of the present technology, a differential amplifier circuit that realizes high conversion efficiency can be provided.

Note that effects described herein are not necessarily limitative, and any effect described in the present disclosure may be exhibited.

BRIEF DESCRIPTION OF DRAWINGS

FIG. 1 is a circuit diagram illustrating a spot at which noise occurs in a source follower-type readout configuration.

FIG. 2 is a circuit diagram illustrating a configuration in a case in which no pixels are shared.

FIG. 3 is a circuit diagram illustrating a configuration in a case in which pixels are shared.

FIG. 4 is a circuit diagram illustrating a spot at which noise occurs in a differential-type amplified readout configuration.

FIG. 5 is a diagram for describing problems of a reset feedthrough and a differential operation point.

FIG. 6 is a diagram illustrating an example of a configuration of an embodiment of a solid-state imaging device to which the present technology is applied.

FIG. 7 is a circuit diagram illustrating an example of a configuration of a pixel.

FIG. 8 is a circuit diagram illustrating an example of a configuration of a differential pixel readout circuit according to a first embodiment.

FIG. 9 is a timing chart showing an example in which a pixel constituting the differential pixel readout circuit is driven.

FIG. 10 is a circuit diagram illustrating a configuration in a case in which a read pixel and a reference pixel are arranged in the same row.

FIG. 11 is a circuit diagram illustrating a configuration in a case in which a read pixel and a reference pixel are arranged in the same column.

FIG. 12 is a circuit diagram illustrating a configuration in a case in which a read pixel and a reference pixel are in proximity to each other but are arranged in different rows and columns.

FIG. 13 is a circuit diagram illustrating a configuration in a case in which a reference-dedicated pixel is arranged in each column.

FIG. 14 is a circuit diagram illustrating a configuration in a case in which a reference-dedicated dummy pixel is arranged in each column.

FIG. 15 is a circuit diagram illustrating a configuration in which a cascode current mirror circuit is used.

FIG. 16 is a circuit diagram illustrating a configuration in which a read pixel and a reference pixel can be switched.

FIG. 17 is a circuit diagram illustrating a configuration in which a read pixel and a reference pixel can be switched.

FIG. 18 is a timing chart showing an example of driving of pixels that can be switched to a read pixel and a reference pixel.

FIG. 19 is a circuit diagram illustrating a configuration of pixels switched to an SF mode.

FIG. 20 is a circuit diagram illustrating a configuration of the pixels switched to a differential mode.

FIG. 21 is a circuit diagram illustrating a configuration of the pixels switched to a differential mode.

FIG. 22 is a timing chart showing an example of driving of a pixel switched to the SF mode.

FIG. 23 is a timing chart showing an example of driving of a pixel switched to the differential mode.

FIG. 24 is a diagram for describing an effect obtained by employing the first embodiment.

FIG. 25 is a circuit diagram illustrating an example of a configuration of a pixel readout circuit according to a second embodiment.

FIG. 26 is a circuit diagram illustrating an example of a configuration of a pixel readout circuit in a differential mode.

FIG. 27 is a circuit diagram illustrating an example of a configuration of a pixel readout circuit in a differential mode.

FIG. 28 is a circuit diagram illustrating an example of a configuration of a pixel readout circuit in an SF mode.

FIG. 29 is a timing chart showing an example of driving of pixels switched to the differential mode.

FIG. 30 is a timing chart showing an example of driving of pixels switched to the SF mode.

FIG. 31 is a circuit diagram illustrating a configuration in a case in which the number of read pixels and reference pixels are different in the differential mode.

FIG. 32 is a diagram for describing an effect obtained by employing the second embodiment.

FIG. 33 is a diagram illustrating an example of a configuration of a laminate-type solid-state imaging device to which an embodiment of the present technology can be applied.

FIG. 34 is a block diagram illustrating an example of a configuration of an electronic apparatus having a solid-state imaging device to which an embodiment of the present technology is applied.

FIG. 35 is a diagram illustrating an example of use of the solid-state imaging device to which an embodiment of the present technology is applied.

FIG. 36 is a block diagram illustrating an example of a schematic configuration of a vehicle control system.

FIG. 37 is an explanatory diagram illustrating an example of installation positions of a vehicle outside information detecting section and the imaging section.

DESCRIPTION OF EMBODIMENTS

Embodiments of the present technology will be described below with reference to the drawings. Note that description will be provided in the following order.

1. Overview of present technology
2. Configuration of solid-state imaging device
3. First embodiment: configuration in which reset voltage is set through external application and negative feedback
4. Second embodiment: configuration in which a reference-side amplifier transistor is horizontally connected
5. Modified examples
6. Configuration of electronic apparatus
7. Example of use of solid-state imaging device
8. Example of application to moving objects 1. Overview of Present Technology In a CMOS image sensor, a photodiode (PD) serving as a photoelectric conversion unit, a floating diffusion unit (FD) in which electrons photoelectrically converted by the photodiode are converted into a voltage, and an amplifier transistor that receives a voltage obtained by the floating diffusion unit (FD) as a gate input are provided in each of unit pixels (which will also be referred to as a pixel below) two-dimensionally arranged in a matrix shape in a pixel array unit, and readout by a source follower circuit using the amplifier transistor (which will also be referred to as source follower-type readout below) is generally performed (e.g., refer to the above-described PTL 1).

On the other hand, a configuration in which the readout is performed by a source-grounded circuit and a configuration in which the readout is performed by a differential amplifier circuit (which will be referred to as differential-type amplification readout below) while having a similar pixel configuration (e.g., refer to the above-described PTL 2) exist.

In a pixel, however, electrons generated in a photodiode are converted into a voltage with voltage conversion efficiency ($\mu V/e-$) per electron in accordance with a parasitic capacitance of an FD node. A voltage amplitude $\Delta Vfd$ of the FD node in accordance with the number of signal electrons is read from the pixel, which is two-dimensionally arranged in a pixel array unit, via an amplifier transistor.

At this time, a read signal has noise superimposed thereon. Main sources of the noise are, for example, illustrated in FIG. 1.

That is, noise $Vn\_pix$ ($\mu Vrms$) that occurs in an amplifier transistor 914 in a pixel 900, noise $Vn\_afe$ ($\mu Vrms$) that occurs in analog front-ends (AFEs) 931 which amplify voltages read from two-dimensionally arranged pixels via vertical signal lines (VSLs) 922, and noise $Vn\_adc$ ($\mu Vrms$) that occurs in analog/digital converters (ADCs) 932 exist.

In the description below, the noise $Vn\_pix$ will be defined as noise converted into voltage noise that occurs in the FD node, the noise $Vn\_afe$ will be defined as noise converted into voltage noise that occurs around the vertical signal lines 922, and the noise $Vn\_adc$ will be defined as noise converted into noise that occurs in input nodes of the analog/digital converters 932.

In a configuration of source follower-type readout, a gain $Asf$ of a voltage amplitude $\Delta Vvsl$ of the vertical signal lines (VSLs) 922 is 0.8 to 1.0 times that of the voltage amplitude $\Delta Vfd$ of the FD node, and thus the following formula (1) can be satisfied.

$$\Delta Vvsl = Asf \times \Delta Vfd \quad (1)$$

Here, conversion efficiency (μV/e–) of an electron-voltage conversion of the FD node is set to ηfd. That is, in a case in which conversion efficiency (μV/e–) of electron-voltage conversion of the vertical signal lines 922 is set to ηvsl, the following formula (2) can be satisfied.

$$\eta vsl = Asf \times \eta fd \quad (2)$$

In addition, if the number of signal electrons is set to Nsig_e, the elements can be expressed using the following formula (3).

$$\Delta Vvsl = \eta vsl \times Nsig\_e = \eta fd \times Asf \times Nsig\_e \quad (3)$$

Note that, here, for the sake of simplification, in the analog front-ends (AFEs) 931, if noise superimposed on an output of an A/D conversion with no voltage amplification, i.e., with one time of a gain, is converted into voltage noise that occurs in the vertical signal lines 922 to set Vn_total (μVrms), the noise is the sum of Vn_adc, Vn_afe, and Afd×Vn_pix (mean squared).

This indicates that noise of Vn_total is superimposed on the VSL signal amplitude ΔVvsl based on the number of electrons Nsig_e. Here, it is important to ascertain the amount of superimposed noise in association with a number of signal electrons when it comes to image quality, and thus if noise is converted into the number of electrons in the FD node (unit: e-rms), the following formula (4) is satisfied.

[Math.1]

$$Vn\_total\_e = \sqrt{\{(Vn\_adc/\eta vsl)^2 + (Vn\_afe/\eta vsl)^2 + (Vn\_pix/\eta fd)^2\}} \quad (4)$$

However, in the formula (4), since ηvsl=Asf×ηfd is satisfied as described in the above formula (2), if Asf increases, Vn_adc and Vn_afe can be slightly affected. In addition, if ηfd increases, Vn_adc, Vn_afe, and Vn_pix can be slightly affected.

Asf is a voltage gain of the source follower circuit, normally is 0.8 to 1.0 as described above, and is logically 1.0 or less, and thus is difficult to improve. ηfd is determined on the basis of a sum Cfd of parasitic capacitances found around the FD node, and thus the following formula (5) can be satisfied.

$$\eta fd = e/Cfd \quad (5)$$

However, in the formula (5), e represents an integer of 1.602×10-19 coulomb in quantum of electrons. There is a physical limitation in cutting a capacity to reduce noise, and if a configuration in which a plurality of pixels share a transistor to reduce pixel pitches, Cfd increases, and thus it is even more difficult to increase ηfd.

Note that FIG. 2 illustrates a configuration in a case in which signals are read independently in each of pixels 900-11, 900-12, 900-21, and 900-22, which are an example of pixels arranged in a pixel array unit, with no pixel sharing.

In addition, FIG. 3 illustrates a configuration in a case in which the four pixels 900-11, 900-12, 900-21, and 900-22 are in a pixel sharing state, and thus a floating diffusion unit (FD) 921 and an amplifier transistor 914 of the pixel 900-11 are also used by the other pixels.

In the above-described configuration of source follower-type readout, since a value of Asf is about one time thereof, if it is neither possible to increase ηfd in fine pixels nor is it possible to design ηvsl to be high, and consequently it is not possible to reduce noise.

Meanwhile, the differential-type amplification readout has a configuration illustrated in, for example, FIG. 4.

That is, in the configuration of differential-type amplification readout, a gain Adif of the voltage amplitude ΔVvsl of the vertical signal line (VSL) 922 is determined on the basis of an amount of parasitic capacitance Cgd between a VSL node that is a part of a parasitic capacitance Cfd of an FD node. Note that Cgd may include an intentionally added capacitance as well as a parasitic capacitance of a transistor as a wiring capacitance or the like in order to adjust gain Adif.

In the above-described configuration of differential-type amplification readout, in a case in which an open-loop gain of a differential amplifier circuit is set to Av, the following formula (6) is satisfied.

$$\eta vsl = e/\{Cgd + Cfd/Av\} \quad (6)$$

Likewise, when total noise that occurs in the configuration of differential-type amplification readout is converted into the number of electrons in the FD node, the following formula (7) is satisfied.

[Math.2]

$$Vn\_total\_e = \sqrt{[(Vn\_adc/\eta vsl)^2 + (Vn\_afe/\eta vsl)^2 + 2 \times (Vn\_pix/\eta fd)^2]} \quad (7)$$

Noise can obviously be reduced if ηvsl and ηfd are increased in the formula (7).

Here, when the formula (4) of the configuration of source follower-type readout illustrated in FIG. 1 is compared with the formula (7) of the configuration of differential-type amplification readout illustrated in FIG. 4, the following can be said about Vn_adc and Vn_afe.

That is, in the formula (4), since ηvsl has the relation of ηvsl=Asf×ηfd, as shown in the formula (2), and Asf is at most 1.0, formula (8) has the following relation.

$$\eta vsl \leq \eta fd = e/Cfd \quad (8)$$

Meanwhile, in the formula (7), since ηvsl has the relation of ηvsl=e/{Cgd+Cfd/Av}, as in the formula (6), Av is generally about several tens to one hundred, an influence of Cfd can be suppressed, and thus formula (9) has the following relation.

$$\eta vsl \div e/Cgd \quad (9)$$

As described above, there is no way of increasing ηvsl when it is difficult to decrease Cfd in the formula (8) in the configuration of source follower-type readout.

On the other hand, in the configuration of differential-type amplification readout, since Cgd is a part of Cfd on the basis of formula (9), Cgd has a smaller value than Cfd and is a capacitance that is parasitic on the amplifier transistor 914, as illustrated in FIG. 4, and thus Cgd does not hinder a reduction in capacitance even if the structure in which the transistor is shared by a plurality of pixels (as in FIG. 3) is adopted.

That is, ηvsl has a higher value in the configuration of differential-type amplification readout than in the configuration of source follower-type readout, which is advantageous from the point of view of noise. However, a configuration of differential-type amplification readout used in the past has two problems.

The first problem is that an initial FD potential, which is a reference potential, has to be set to a voltage at which electric charges can be transferred from a photoelectric converter 911 such as a photodiode (PD) and has to be set to a voltage at which a dynamic range of amplitude can be secured to read a sufficient amount of signal charges.

In the circuit configuration illustrated in FIG. 4, an initial FD potential is high and is advantageous to transfer electric charges, and thus a large amount of signal charges can be transferred, but on the other hand, a low initial FD potential causes large amplitude of an output voltage. Note that, in a case in which a polarity of the photodiode (PD), which is the photoelectric converter 911, is reversed, reversed potential setting is advantageous.

Therefore, it is important to set an initial FD potential at which electric charges can be transferred from the photoelectric converter 911 and large amplitude of an output voltage of pixels can be gained.

However, since a differential amplifier circuit has a high amplification gain, there are problems in that unevenness in input signals is amplified due to unevenness in element characteristics, power supplies, temperatures, and the like, and as a result, significant unevenness in output signals is caused. In particular, when a large input signal is received at a time of reset, an output level of the reset deviates from a voltage readable range and becomes indefinite.

Here, the above-mentioned PTL2 discloses that unevenness of element characteristics, power supplies, temperatures, and the like can be suppressed by feeding an output level back to an input at the time of reset to determine an initial FD potential for each pixel, but a potential level of a floating diffusion unit (FD) at the time of reset is determined on the basis of a ratio of ON resistance of a current mirror transistor, a readout transistor, and a load MOS transistor. Then, if sizes and driving currents of these transistors are determined, potential levels are determined to be substantially uniform.

In particular, a readout transistor is a transistor arranged within a pixel constituting a pixel array unit, it is difficult to freely adjust a size thereof, and it is normally difficult to control setting of an initial FD potential such that a transfer of electric charges from a photodiode is compatible with amplitude of an output voltage of a pixel.

Meanwhile, in differential-type amplification readout illustrated in FIG. 5A, when a reset operation is completed and a reset transistor 913 is in an off-state in accordance with a driving signal RST, a FD potential and a VSL potential have the relation illustrated in FIG. 5B.

That is, when the reset transistor 913 is in the off-state, the floating diffusion unit (FD) 921 is electrically disconnected from external wiring to be in a floating state, and the FD potential of the floating diffusion unit (FD) 921 is lowered to a low level mainly due to capacitive coupling with a gate electrode of the reset transistor 913. A variation $\Delta V_{FD}$ of the FD potential made at a switching moment between an on-state and the off-state of the reset transistor 913 is called reset feedthrough.

In addition, when an amount of reset feedthrough is significantly different between a readout side and a reference side in the differential-type amplification readout, the difference is amplified to be a multiple of a gain and is output to the vertical signal lines (VSLs) 922, and a reset level deviates from a voltage readable range, and thus an initial signal level becomes unstable.

As described above, in the configuration of differential-type amplification readout, it is necessary to stop a reset level from deviating from a readable range that may be caused by reset feedthrough as well as to determine an optimum initial FD potential while high conversion efficiency (an amplification rate) is realized. This is the first problem.

The second problem is that, in the configuration of differential-type amplification readout, the final sum of noise increases by an amount of noise that occurs in the amplifier transistor included in a pixel since transistors of a differential pair on the reference side are added thereto.

Here, focusing on noise Vn_pix in formula (4), for the configuration of source follower-type readout illustrated in FIG. 1 and formula (7) for the configuration of differential-type amplification readout illustrated in FIG. 4, ηfd becomes e/Cfd in both of the formulas, and thus there is no difference in ηfd.

However, since noise occurring on the reference-side amplifier transistor is also superimposed in the configuration of differential-type amplification readout illustrated in FIG. 4, the amount of noise is accordingly doubled. Since the Vn_pix component doubles in the total noise in the configuration of differential-type amplification readout, the configuration is disadvantageous in terms of noise when compared to the configuration of source follower-type readout. This is the second problem.

The technology according to the present disclosure (the present technology) proposes a measure to solve the first and second problems.

That is, to solve the first problem, a reset voltage of a reference pixel is configured to be externally applied and a reset voltage of a read pixel is configured to be negatively fed back from vertical signal lines in the configuration of differential-type amplification readout, and thus it is possible to stop deviation of a reset level from a readable range that may be caused by reset feedthrough as well as to control a FD potential of the read pixel so as to have a desired value at a time of reset while high conversion efficiency (an amplification rate) is realized.

In addition, to solve the second problem, a node on a source side, a node on a drain side, and nodes on both the source and drain sides of an amplifier transistor of a reference pixel are connected at each of columns of a pixel array unit (are in connection with each other) in the configuration of differential-type amplification readout, and thus an increase in noise can be suppressed while high conversion efficiency (an amplification rate) is realized.

Details of the present technology will be described below by exemplifying first and second embodiments. In other words, the first embodiment will be described as a first measure to solve the first problem, and the second embodiment will be described as a second measure to solve the second problem.

Note that the first measure for solving the first problem and the second measure for solving the second problem may solve the problems as individual measures, and one measure may be combined with the other measure.

That is, the first problem and the second problem can be solve by combining the first measure with the second measure, and effects of both of the measures can be exhibited as a result. Likewise, the first problem can also be solved when the second measure is combined with the first measure, and the effects of both of the measures can be exhibited as a result.

2. Configuration of Solid-State Imaging Device (Example of Configuration of Solid-State Imaging Device)

FIG. 6 is a diagram illustrating an example of a configuration of an embodiment of a solid-state imaging device to which the present technology is applied.

A CMOS image sensor 10 of FIG. 6 is an example of a solid-state imaging device using a complementary metal oxide semiconductor (CMOS). The CMOS image sensor 10 receives incident light (image light) from a subject via an optical lens system (not illustrated), converts an amount of the incident light forming an image on an imaging plane into electric signals in units of pixels, and then outputs the signals as pixel signals.

In FIG. 6, the CMOS image sensor 10 includes a pixel array unit 11, a vertical driving unit 12, a column readout circuit unit 13, a column signal processing unit 14, a horizontal driving unit 15, a system control unit 16, a signal processing unit 17, and a data storage unit 18.

The pixel array unit 11, the vertical driving unit 12, the column readout circuit unit 13, the column signal processing unit 14, the horizontal driving unit 15, the system control unit 16, the signal processing unit 17, and the data storage unit 18 are formed on one or a plurality of laminated semiconductor substrates (chips) that are electrically connected to each other.

The pixel array unit 11 includes unit pixels (pixels), which each have a photoelectric conversion unit (e.g., a photodiode) which photoelectrically converts an amount of electric charges in accordance with an amount of incident light, accumulates the converted electric charges, and then outputs the converted electric charges as signals, two-dimensionally arranged in a matrix shape.

Note that the pixel array unit 11 may include an area in which dummy pixels, which are configured not to have photodiodes for photoelectric conversion, and shielding pixels, which are equivalent to effective pixels except for the fact that the pixels shield a light receiving surface from light to block light incidence from the outside, are two-dimensionally arranged in a matrix shape in addition to the pixels that are effective (effective pixels).

In addition, an amount of optical electric charges in accordance with an amount of incident light may be described simply as "electric charges," and a unit pixel may be described simply as a "pixel" in description below.

The pixel array unit 11 further includes pixel driving lines 31 formed for each of rows of the matrix-shaped pixel array in a left-right direction of the drawing (a pixel row array direction), and vertical pixel wires 32 formed for each columns in an up-down direction of the drawing (a pixel column array direction). One end of each of the pixel driving lines 31 is connected to an output end of the vertical driving unit 12 corresponding to each row.

The column readout circuit unit 13 includes at least a circuit that supplies a constant current to pixels of each column in a selected row included in the pixel array unit 11, a current mirror circuit constituting a high gain amplifier, and a readout mode switch, constitutes an amplifier along with a transistor included in a selected pixel in the pixel array unit 11, and converts an optical electric charge signal into a voltage signal and outputs the signal to the vertical pixel wires 32.

The vertical driving unit 12 is a pixel driving unit that is constituted by a shift register, an address decoder, and the like and drives all of the pixels of the pixel array unit 11 at the same time or some pixels in units of rows. Although a specific configuration of the vertical driving unit 12 is not illustrated, the unit includes a readout scanning system, and a sweep scanning system, consolidated sweeping, or consolidated transfer.

The readout scanning system selectively sequentially scans the pixels of the pixel array unit 11 in units of rows to read signals from the pixels. With respect to sweeping in a case of row driving (a rolling shutter operation), sweeping scanning is performed on readout rows that undergo readout scanning by the readout scanning system at a time earlier than the readout scanning by as much as a time it takes a shutter to operate (a shutter speed time).

In addition, in a case of global exposure (a global shutter operation), consolidated sweeping is performed the shutter speed time earlier than a consolidated transfer. This sweeping sweeps (resets) unnecessary electric charges from a photoelectric conversion element of a pixel in a readout row. In addition, sweeping (reset) of unnecessary electric charges enables a so-called electronic shutter operation to be performed.

Here, the electronic shutter operation refers to an operation of starting a new exposure (starting an accumulation of optical electric charges) after discarding unnecessary optical electric charges retained in the photoelectric conversion element just before the operation. A signal read through a readout operation performed by the readout scanning system corresponds to an amount of light incident after an immediately previous readout operation or electronic shutter operation.

In a case of driving rows, a period from a readout timing for a previous readout operation or a sweeping timing for an electronic shutter operation to a readout timing for a readout operation of a current readout operation is an accumulation time of optical electric charges (an exposure time) of a pixel. In the case of global exposure, a time from consolidated sweeping to consolidated transfer is the accumulation time (the exposure time).

Pixel signals output from pixels of a pixel row selected and scanned by the vertical driving unit 12 are supplied to the column signal processing unit 14 via each of the vertical pixel wires 32. The column signal processing unit 14 performs predetermined signal processing on the pixel signals output from the pixels in the selected row via the vertical pixel wires 32 for each pixel column of the pixel array unit 11 and temporarily holds the processed pixel signals.

Specifically, the column signal processing unit 14 performs at least a noise removal process, for example, a correlated double sampling (CDS) process, as the signal processing. The correlated double sampling performed by the column signal processing unit 14 removes fixed-pattern noise that is unique to pixels such as reset noise, unevenness in threshold values of amplifier transistors, or the like. Note that the column signal processing unit 14 can also have, for example, an analog-digital (A/D) conversion function to output a signal level as a digital signal in addition to the function of the noise removal process.

The horizontal driving unit 15 is constituted by a shift register, an address decoder, and the like and sequentially selects unit circuits corresponding to the pixel columns of the column signal processing unit 14. The pixel signals processed by the column signal processing unit 14 are sequentially output to the signal processing unit 17 due to the selective scanning performed by the horizontal driving unit 15.

The system control unit 16 is constituted by a timing generator, which generates various timing signals, and the like and performs driving control of the vertical driving unit 12, the column signal processing unit 14, the horizontal driving unit 15, and the like on the basis of the various timing signals generated by the timing generator.

The CMOS image sensor 10 further includes the signal processing unit 17 and the data storage unit 18. The signal processing unit 17 has at least an addition processing function and performs various kinds of signal processing such as an addition process on pixel signals output from the column signal processing unit 14 and the like. The data storage unit 18 temporarily stores data necessary for the signal processing performed by the signal processing unit 17 during the signal processing.

The signal processing unit 17 and the data storage unit 18 may be an external signal processing unit provided on a separate substrate from the CMOS image sensor 10, for example, a digital signal processor (DSP) or software processing, and may be mounted on the same substrate as the CMOS image sensor 10.

(Example of Configuration of Pixel)

Next, an example of a circuit configuration of a pixel 100 that is two-dimensionally arranged in a matrix shape in the pixel array unit 11 of FIG. 6 will be described with reference to FIG. 7.

In FIG. 7, the pixel 100 includes a photoelectric conversion unit 111, a transfer transistor 112, a reset transistor 113, an amplifier transistor 114, and a select transistor 115. In addition, the pixel 100 has a floating diffusion unit (FD) 121 formed therein.

In addition, the pixel 100 is connected to an SEL driving line, an RST driving line, and a TRG driving line which are the pixel driving lines 31 which have one ends connected to the vertical driving unit 12, and to a vertical signal line 22, a vertical reset input line 61, and a vertical current supply line 62 which are the vertical pixel wires 32 which have one ends connected to the column readout circuit unit 13.

An anode of a photodiode serving as the photoelectric conversion unit 111 is grounded, and a cathode of the photodiode is connected to a source of the transfer transistor 112. A drain of the transfer transistor 112 is connected to a source of the reset transistor 113 and a gate of the amplifier transistor 114, and a point at which the two connections intersect forms the floating diffusion unit (FD) 121.

In addition, a drain of the reset transistor 113 is connected to the vertical reset input line 61, and a source of the amplifier transistor 114 is connected to the vertical current supply line 62. A drain of the amplifier transistor 114 is connected to a source of the select transistor 115, and a drain of the select transistor 115 is connected to the vertical signal line (VSL) 22.

A gate of the transfer transistor 112, a gate of the reset transistor 113, and a gate of the select transistor 115 are each connected to the vertical driving unit 12 (FIG. 6) via the pixel driving lines 31 (the TRG driving line, the RST driving line, and the SEL driving line), and pulses are supplied thereto as driving signals.

Next, basic functions of the pixel 100 illustrated in FIG. 7 will be described.

The reset transistor 113 turns on or off a discharge of electric charges accumulated in the floating diffusion unit (FD) 121 in accordance with a driving signal RST supplied from the vertical driving unit 12 (FIG. 6).

For example, when the reset transistor 113 is supplied with an high (H) level driving signal RST, the floating diffusion unit (FD) 121 is clamped by a voltage applied through the vertical reset input line 61, and electric charges accumulated in the floating diffusion unit (FD) 121 is caused to be discharged (reset). In addition, when a low (L) level driving signal RST is supplied to the reset transistor 113, the floating diffusion unit (FD) 121 is electrically disconnected from the vertical reset input line 61 to be in the floating state.

Meanwhile, the photoelectric conversion unit 111 photoelectrically converts incident light and generates and accumulates electric charges in accordance with an amount of the light. The transfer transistor 112 turns on or off a transfer of electric charges from the photoelectric conversion unit 111 to the floating diffusion unit (FD) 121 in accordance with a driving signal TRG supplied from the vertical driving unit 12 (FIG. 6).

For example, when an H level driving signal TRG is supplied, the transfer transistor 112 transfers the electric charges accumulated in the photoelectric conversion unit 111 to the floating diffusion unit (FD) 121, and when an L level driving signal TRG is supplied, the transfer of the electric charges stops. Note that the photoelectrically converted electric charges are accumulated in the photoelectric conversion unit 111 when the transfer transistor 112 stops the transfer of the electric charges to the floating diffusion unit (FD) 121.

The floating diffusion unit (FD) 121 has a function of accumulating electric charges transferred from the photoelectric conversion unit 111 via the transfer transistor 112, and an electric potential of the floating diffusion unit (FD) 12 is modulated in accordance with the amount of the accumulated electric charges in the floating state in which the reset transistor 113 is off.

The amplifier transistor 114 functions as an amplifier that receives a change in an electric potential of the floating diffusion unit (FD) 121, which is connected to the gate thereof, as an input signal, and an output voltage signal of the amplifier transistor is output to the vertical signal line 22 via the select transistor 115.

The select transistor 115 turns on or off the output of the voltage signal from the amplifier transistor 114 to the vertical signal line 22 in accordance with a driving signal SEL supplied from the vertical driving unit 12 (FIG. 6).

For example, when an H level driving signal SEL is supplied, the select transistor 115 outputs a voltage signal to the vertical signal line 22, and when an L level driving signal SEL is supplied, the select transistor stops outputting the voltage signal. Accordingly, only an output of a selected pixel 100 can be obtained on the vertical signal line 22 to which a plurality of pixels 100 are connected.

As described above, the pixel 100 is driven in accordance with the driving signals (TRG, RST, and SEL) supplied from the vertical driving unit 12 (FIG. 6).

3. First Embodiment

Next, a configuration of differential-type amplification readout for stopping deviation of a reset level from a readable range that may be caused by reset feedthrough as well as controlling a FD potential of a read pixel so as to have a desired value at the time of reset while high conversion efficiency (an amplification rate) is realized will be described as a first embodiment with reference to FIG. 8 to FIG. 24.

(Example of Configuration of Differential Pixel Readout Circuit)

FIG. 8 is a circuit diagram illustrating an example of a configuration of a differential pixel readout circuit according to the first embodiment.

In FIG. 8, a differential pixel readout circuit 50 includes a read pixel 100S which reads signal charges, a reference pixel 100R which gives a reference voltage without a signal charge, a current mirror circuit 51 which includes a PMOS transistor, and a load MOS circuit 52 which supplies a constant current to the pixels.

The read pixel 100S has, for example, four pixel transistors, which are a transfer transistor 112S, a reset transistor 113S, an amplifier transistor 114S, and a select transistor 115S, and a photoelectric conversion unit 111S such as a photodiode (PD).

An anode electrode, which is an end of the photodiode that functions as the photoelectric conversion unit 111S, is grounded, and a cathode electrode, which is the other end thereof, is connected to a source of the transfer transistor 112S. A drain of the transfer transistor 112S is connected to a source of the reset transistor 113S and a gate of the amplifier transistor 114S, and a point at which the two connections intersect forms a floating diffusion unit (FD) 121S.

A drain of the reset transistor 113S is connected to a readout-side vertical reset input line 61S. A source of the amplifier transistor 114S is connected to a readout-side vertical current supply line 62S. A drain of the amplifier transistor 114S is connected to a source of the select transistor 115S, and a drain of the select transistor 115S is connected to a readout-side vertical signal line 22S.

A gate of the transfer transistor 112S, a gate of the reset transistor 113S, and a gate of the select transistor 115S are connected to the vertical driving unit 12 (FIG. 6) via the pixel driving lines 31 (FIG. 6), and pulses are supplied thereto respectively as driving signals (TRG1, RST1, and SEL1).

Here, the readout-side vertical signal line 22S is connected to the readout-side vertical reset input line 61S, a drain of a readout-side PMOS transistor 511S of the current mirror circuit 51, and an output terminal 53 of the differential pixel readout circuit 50.

In addition, the readout-side vertical reset input line 61S is connected to the readout-side vertical signal line 22S and a floating diffusion unit 121S of the selected read pixel 100S, i.e., an input terminal of the amplifier transistor 114S, and an output signal of the differential pixel readout circuit 50 is negatively fed back thereto when the reset transistor 113S is on.

The reference pixel 100R has, for example, four pixel transistors, which are a transfer transistor 112R, a reset transistor 113R, an amplifier transistor 114R, and a select transistor 115R, and a photoelectric conversion unit 111R such as a photodiode (PD).

An anode electrode, which is an end of the photodiode that functions as the photoelectric conversion unit 111R, is grounded, and a cathode electrode, which is the other end thereof, is connected to a source of the transfer transistor 112R. A drain of the transfer transistor 112R is connected to a source of the reset transistor 113R and a gate of the amplifier transistor 114R, and a point at which the two connections intersect forms a floating diffusion unit (FD) 121R.

A drain of the reset transistor 113R is connected to a reference-side vertical reset input line 61R. A source of the amplifier transistor 114R is connected to a reference-side vertical current supply line 62R. A drain of the amplifier transistor 114R is connected to a source of the select transistor 115R, and a drain of the select transistor 115R is connected to a reference-side vertical signal line 22R.

A gate of the transfer transistor 112R, a gate of the reset transistor 113R, and a gate of the select transistor 115R are connected to the vertical driving unit 12 (FIG. 6) via the pixel driving lines 31 (FIG. 6), and pulses are supplied thereto respectively as driving signals (TRG2, RST2, and SEL2).

Here, the reference-side vertical signal line 22R is connected to a drain and a gate of a reference-side PMOS transistor 511R of the current mirror circuit 51 and a gate of the readout-side PMOS transistor 511S.

In addition, the reference-side vertical reset input line 61R is connected to a power supply Vrst, and an arbitrary input voltage signal is applied to the floating diffusion unit 121R of the reference pixel 100R selected through this wiring, i.e., an input terminal of the amplifier transistor 114R, at the time of reset.

The readout-side vertical current supply line 62S and the reference-side vertical current supply line 62R are connected to each other at a connection point ($V_{com}$), and are then connected to the load MOS circuit 52 which is a constant current source.

In the differential pixel readout circuit 50 having the above-described configuration, the amplifier transistor 114S of the read pixel 100S and the amplifier transistor 114R of the reference pixel 100R constitute a differential amplifier (a differential amplifier circuit), and thus a voltage signal in accordance with a signal charge detected by the photoelectric conversion unit 111S of the read pixel 100S is output via the output terminal 53.

(Example of Driving of Differential Pixel)

Next, an example of driving of a pixel constituting the differential pixel readout circuit 50 illustrated in FIG. 8 will be described with reference to the flowchart of FIG. 9.

Note that the upper part of FIG. 9 shows a timing chart with respect to the driving signals SEL1, RST1, and TRG1 respectively applied to the gates of the select transistor 115S, the reset transistor 113S, and the transfer transistor 112S in the read pixel 100S.

In addition, the lower part of FIG. 9 shows a timing chart with respect to the driving signals TRG2, RST2, and SEL2 respectively applied to the gates of the select transistor 115R, the reset transistor 113R, and the transfer transistor 112R in the reference pixel 100R. Note that a time direction in FIG. 9 is the direction from the left to the right of the drawing.

First, when high level pulses are applied as the driving signal RST1 and the driving signal TRG1 in a period from a time $t_1$ to a time $t_2$, the reset transistor 113S sets electric charges accumulated in the photoelectric conversion unit 111S and the floating diffusion unit 121S of the read pixel 100S to be discharged.

Accordingly, the electric charges accumulated in the photoelectric conversion unit 111S until then are swept, and new electric charges obtained from light from a subject are accumulated in the photoelectric conversion unit 111S in a period from the time $t_2$ to a time $t_5$.

Next, when the driving signals SEL1 and SEL2 are switched from an L level to an H level in the selected read pixel 100S and reference pixel 100R in a period from a time t 3 to a time $t_7$, the load MOS circuit 52 supplies a current in a direction from the sources to the drains of the amplifier transistor 114S and the amplifier transistor 114R.

Accordingly, the differential amplifier circuit that receives a FD potential of the floating diffusion unit 121S of the selected read pixel 100S as an input voltage signal operates, and the amplified voltage signal is output to the readout-side vertical signal line 22S. This state continues until the driving signals SEL1 and SEL2 are switched from the H level to the L level at the time $t_7$.

Note that, in a period from the time $t_1$ to the time $t_3$, the driving signals SEL2, RST2, and TRG2 of the reference pixel 100R do not contribute to signal readout of the read pixel 100S.

Further, when H level pulses are applied as the driving signal RST1 and the driving signal RST2 in a period from the time $t_3$ to the time $t_4$, the read pixel 100S and the reference pixel 100R discharge electric charges accumulated in the floating diffusion unit 121S and the floating diffusion unit 121R, and thus signal levels are initialized (reset).

At this time, the output terminal 53 of the differential pixel readout circuit 50 is electrically connected to the floating diffusion unit 121S of the read pixel 100S, which is one input of the differential pixel readout circuit 50, via the readout-side vertical reset input line 61S and the reset transistor 113S.

As a result, in the differential pixel readout circuit 50, a signal of the output terminal 53 is negatively fed back to the floating diffusion unit 121S, which is one input side, and thus the output terminal enters into a virtual grounded state, and therefore the floating diffusion unit 121R, which is the other input side fixed to the power supply Vrst through an external application, the floating diffusion unit 121S, and the output terminal 53 are at the same potential.

Next, when L level pulses are applied as the driving signal RST1 and the driving signal RST2 in a period from the time $t_4$ to the time $t_5$, the floating diffusion unit 121S is electrically disconnected from the readout-side vertical reset input line 61S, and the floating diffusion unit 121R is electrically disconnected from the reference-side vertical reset input line 61R in the read pixel 100S and the reference pixel 100R, and thus each of the regions enters into the floating state.

At this time, since the floating diffusion unit 121S of the read pixel 100S and the floating diffusion unit 121R of the reference pixel 100R have substantially identical structures, the regions show substantially the same potential change (reset feedthrough) at a time of reset-off, and thus an FD potential of the floating diffusion unit 121S and an FD potential of the floating diffusion unit 121R show substantially the same movement.

Thus, an output from the output terminal 53 of the differential pixel readout circuit 50 hardly changes from the voltage Vrst at a time of reset-on, this state is a reset state (an initial state) in differential amplification readout, and an output level of the state is a reset level (an initial level). This reset state continues until signal charges are transferred at the time $t_5$, and a voltage, which is the reset level, is read.

Next, when the driving signal TRG1 of the read pixel 100S is applied in a pulse shape in a period from the time $t_5$ to a time $t_6$, the electric charges accumulated in the photoelectric conversion unit 111S of the read pixel 100S are transferred to the floating diffusion unit 121S by the transfer transistor 112S.

Then, in the read pixel 100S, the transferred electric charges modulate the floating diffusion unit 121S, and when this voltage is input to the gate of the amplifier transistor 114S as a voltage signal, a voltage signal in accordance with the amount of the accumulated electric charges is output to the readout-side vertical signal line 22S. This signal readout state continues until the driving signals SEL1 and SEL2 become the L level at the time $t_7$, and the voltage, which is the signal level, is read during that time.

Note that the column signal processing unit 14 (FIG. 6) performs correlated double sampling to remove noise by obtaining the difference between the reset level and the signal level read, as described above, and thereby a pixel signal from which noise is removed can be read.

(Example of Configuration of Other Circuits of Differential Pixel Readout Circuit)

(A) Arrangement of Read Pixel and Reference Pixel in Same Row

FIG. 10 is a circuit diagram illustrating a configuration in a case in which a read pixel and a reference pixel are arranged in the same row.

FIG. 10 illustrates an example of a differential pixel readout circuit 50A in which a pixel, which is an effective pixel, that accumulates and reads a signal obtained from a subject during imaging in proximity to the read pixel 100S in the same row is used as the reference pixel 100R arranged in the pixel array unit 11.

At this time, the effective pixel can be switched to the reference pixel 100R and can accumulate and read a signal, and all effective pixels two-dimensionally arranged in the pixel array unit 11 can be read by scanning addresses of pairs of read pixels 100S and reference pixels 100R while alternating the pairs by using, for example, switches of the pixel driving lines 31 (FIG. 6) and the column readout circuit unit 13 (FIG. 6).

Note that, although the read pixel 100S and the reference pixel 100R are in the same row and arranged to be horizontally adjacent to each other in the pixel array unit 11 of FIG. 10, a pixel that is not related to differential driving may be inserted between the read pixel 100S and the reference pixel 100R.

In this case, the number of vertically penetrating wires (vertical signal lines 22, vertical reset input lines 61, and vertical current supply lines 62) per column and the number of A/D converters can be set to be small, but it is necessary to increase the number of pixel driving lines 31 which traverse the pixel array unit 11 per row since driving signals (TRG and RST) of two pixels in the same row have to be independently driven.

In addition, in the pixel array unit 11 of FIG. 10, the positions of the read pixel 100S and the reference pixel 100R that are horizontally adjacent to each other in the same row may be switched.

(B) Arrangement of Read Pixel and Reference Pixel in Same Column

FIG. 11 is a circuit diagram illustrating a configuration in a case in which a read pixel and a reference pixel are arranged in the same column.

FIG. 11 illustrates an example of a differential pixel readout circuit 50B in which a pixel, which is an effective pixel, that accumulates and reads a signal obtained from a subject during imaging in proximity and adjacent to the read pixel 100S in the same column is used as the reference pixel 100R arranged in the pixel array unit 11.

At this time, the effective pixel can be switched to the reference pixel 100R and can accumulate and read a signal, and all of the effective pixels two-dimensionally arranged in the pixel array unit 11 can be read by scanning the addresses of the pairs of the read pixels 100S and the reference pixels 100R while alternating the pairs by using, for example, the switches of the pixel driving lines 31 (FIG. 6) and the column readout circuit unit 13 (FIG. 6).

Note that, although the read pixel 100S and the reference pixel 100R are in the same column and arranged to be vertically adjacent to each other in the pixel array unit 11 of FIG. 11, a pixel that is not related to differential driving may be inserted between the read pixel 100S and the reference pixel 100R.

In this case, although the number of pixel driving lines 31 which traverse the pixel array unit 11 per row does not increase, it is necessary to increase the number of vertically penetrating wires (the vertical signal lines 22, the vertical reset input lines 61, and the vertical current supply lines 62) per column and the number of A/D converters.

In addition, in the pixel array unit 11 of FIG. 11, the positions of the read pixel 100S and the reference pixel 100R that are vertically adjacent to each other in the same column may be switched.

(C) Arrangement of Read Pixel and Reference Pixel in Different Rows and Columns

FIG. 12 is a circuit diagram illustrating a configuration in a case in which a read pixel and a reference pixel are in proximity to each other but are arranged in different rows and columns.

FIG. 12 illustrates an example of a differential pixel readout circuit 50C in which a pixel, which is an effective pixel, that accumulates and reads a signal obtained from a subject during imaging and is in proximity to the read pixel 100S but in a different row and column is used as the reference pixel 100R arranged in the pixel array unit 11.

At this time, the effective pixel can be switched to the reference pixel 100R and can accumulate and read a signal, and all of the effective pixels two-dimensionally arranged in the pixel array unit 11 can be read by scanning the addresses of the pairs of the read pixels 100S and the reference pixels 100R while alternating the pairs by using, for example, the switches of the pixel driving lines 31 (FIG. 6) and the column readout circuit unit 13 (FIG. 6).

Note that, although the read pixel 100S and the reference pixel 100R are diagonally arranged in closest proximity in the pixel array unit 11 of FIG. 12, a pixel that is not related to differential driving may be inserted between the read pixel 100S and the reference pixel 100R.

In this case, although the number of vertically penetrating wires (the vertical signal lines 22, the vertical reset input lines 61, and the vertical current supply lines 62) per column is similar to that of the configuration illustrated in FIG. 10, the driving signals (SEL, TRG, and RST) of the read pixel 100S and the reference pixel 100R have to be driven independently of a pair of a first off-diagonal pixel and a second off-diagonal pixel, i.e., a pair of off-diagonal pixels which are inactive, and thus it is necessary to increase the number of pixel driving lines 31 which traverse the pixel array unit 11 per row.

In addition, the positions of the read pixel 100S and the reference pixel 100R that are adjacent to each other in different rows and columns may be switched in the pixel array unit 11 of FIG. 12.

(D) Arrangement of Reference-Dedicated Pixel in Each Column

FIG. 13 is a circuit diagram illustrating a configuration in a case in which a reference-dedicated pixel is arranged in each column.

FIG. 13 illustrates an example of a differential pixel readout circuit 50D in which a reference-dedicated pixel, which is arranged in each column as the reference pixel 100R arranged in the pixel array unit 11, and a two-dimensionally arranged effective pixel, which reads a signal, constitute a pixel pair (a differential pair).

Here, in the pixel array unit 11, the reference pixel 100R is a reference-dedicated pixel which is equivalent to an effective pixel arranged in each column in its surroundings. In addition, in the pixel array unit 11, all two-dimensionally arranged effective pixels are only scanned as the read pixel 100S by the pixel driving lines 31, and signals thereof are read.

(E) Arrangement of Reference-Dedicated Dummy Pixel in Each Column

FIG. 14 is a circuit diagram illustrating a configuration in a case in which a reference-dedicated dummy pixel is arranged in each column.

FIG. 14 illustrates an example of a differential pixel readout circuit 50E in which a reference-dedicated dummy pixel, which is arranged in each column as the reference pixel 100R arranged in the pixel array unit 11, and a two-dimensionally arranged effective pixel, which reads a signal, form a pixel pair (a differential pair).

Here, in the pixel array unit 11, the reference pixel 100R is the reference-dedicated dummy pixel and is a pseudo pixel showing similar reset feedthrough characteristics to those of an effective pixel arranged in each column in its surroundings. In addition, in the pixel array unit 11, all of the two-dimensionally arranged effective pixels are only scanned as the read pixel 100S by the pixel driving lines 31, and thus the signals thereof are read.

Here, the reference pixel 100R functions as the reference-dedicated dummy pixel to be, for example, a pixel that blocks light for the effective pixel or a pixel that does not have the photoelectric conversion unit 111R such as a photodiode.

Note that the reference pixel 100R can be a pixel having the same layout configuration as the read pixel 100S, which functions as an effective pixel, except for the configuration in which the reference pixel blocks light for the effective pixel or does not have the photoelectric conversion unit 111R. In addition, although the reference pixel 100R can have a different layout configuration from the read pixel 100S that functions as the effective pixel, the reference pixel can also be a pseudo pixel of which reset feedthrough characteristics are adjusted to be the same as those of the read pixel 100S.

(F) Configuration in which Cascode Current Mirror Circuit is Used

FIG. 15 is a circuit diagram illustrating a configuration in which a cascode current mirror circuit is used.

FIG. 15 illustrates an example of a differential pixel readout circuit 50F in which a cascode current mirror circuit 54 configures a current mirror circuit of the column readout circuit unit 13.

In the differential pixel readout circuit 50F of FIG. 15, an upper column readout circuit unit 13 has the cascode current mirror circuit 54 instead of the current mirror circuit 51 unlike the differential pixel readout circuit 50 illustrated in FIG. 8.

In the cascode current mirror circuit 54, a pair of a readout-side PMOS transistor 541S and a reference-side PMOS transistor 541R and a pair of a readout-side PMOS transistor 542S and a reference-side PMOS transistor 542R are provided to constitute the cascode current mirror circuit.

That is, a drain of the readout-side PMOS transistor 541S is connected to a source of the readout-side PMOS transistor 542S, and a drain of the readout-side PMOS transistor 542S is connected to the output terminal 53 and the readout-side vertical signal line 22S.

Meanwhile, a drain of the reference-side PMOS transistor 541R is connected to a gate of the reference-side PMOS transistor 541R, a gate of the readout-side PMOS transistor 541S, and a source of the reference-side PMOS transistor 542R. In addition, a drain of the reference-side PMOS transistor 542R is connected to a gate of the reference-side PMOS transistor 542R, a gate of the readout-side PMOS transistor 542S, and the reference-side vertical signal line 22R.

(G) Configuration in which Read Pixel and Reference Pixel can be Switched

FIGS. 16 and 17 are circuit diagrams illustrating configurations in which a read pixel and a reference pixel can be switched.

FIG. 16 illustrates an example of a configuration of a differential pixel readout circuit 50G-1 with pixels arranged in the pixel array unit 11 before switching by switches SW of the column readout circuit unit 13. Meanwhile, FIG. 17 illustrates an example of a configuration of a differential pixel readout circuit 50G-2 with pixels arranged in the pixel array unit 11 after switching by the switches SW of the column readout circuit unit 13.

In the differential pixel readout circuit 50G-1 of FIG. 16, a first pixel 100-1 and a second pixel 100-2 arranged to be adjacent to each other in the same row are exemplified among the pixels two-dimensionally arranged in the pixel array unit 11. In addition, when switches SW1 to SW8 perform a switching operation in the upper column readout circuit unit 13, the first pixel 100-1 functions as the read pixel 100S and the second pixel 100-2 functions as the reference pixel 100R in the pixel array unit 11.

On the other hand, when the switches SW1 to SW8 perform the switching operation in the upper column readout circuit unit 13 in the differential pixel readout circuit 50G-2 of FIG. 17, the first pixel 100-1 functions as the reference pixel 100R and the second pixel 100-2 functions as the read pixel 100S in the pixel array unit 11.

That is, in the differential pixel readout circuits 50G, when the switches SW1 to SW8 of the upper column readout circuit unit 13 perform the switching operation, the first pixel 100-1 switches from the read pixel 100S (FIG. 16) to the reference pixel 100R (FIG. 17) and the second pixel 100-2 switches from the reference pixel 100R (FIG. 16) to the read pixel 100S (FIG. 17) in the pixel array unit 11.

In other words, it can be said that, with respect to the differential pixel readout circuits 50G, although pixel pairs that form differential pairs (differential pairs) have the same relation when the switches SW1 to SW8 provided in the upper column readout circuit unit 13 perform the switching operation, the configuration of the read pixel 100S and the configuration of the reference pixel 100R can be switched to each other.

(Example of Driving of Pixels that can be Switched)

Here, an example of driving of the pixels that can be switched illustrated in FIGS. 16 and 17 will be described with reference to the timing chart of FIG. 18.

Note that the upper part of FIG. 18 illustrates a timing chart with respect to the driving signals SEL1, RST1, and TRG1 and the driving signal SEL2, RST2, and TRG2 respectively applied to the gates of the select transistors 115, the reset transistors 113, the transfer transistors 112 of the first pixels 100-1 and the second pixels 100-2.

Meanwhile, the lower part of FIG. 18 illustrates a timing chart of the switches SW1 to SW8 indicating on- and off-timings of the switches SW1 to SW8 provided in the upper column readout circuit unit 13. Note that a direction of time in FIG. 18 is a direction from the left to the right of the drawing.

First, when the switch SW8 is in the on-state and H level pulses are applied as the driving signal RST1 and the driving signal TRG1 in a period from a time $t_1$ to a time $t_2$, electric charges accumulated in the photoelectric conversion unit 111 and the floating diffusion unit 121 of the first pixel 100-1 are discharged.

Accordingly, the electric charges accumulated in the photoelectric conversion unit 111 until then are swept in the first pixel 100-1, and new electric charges obtained from light from a subject are accumulated in the photoelectric conversion unit 111 in a period from the time $t_1$ to a time $t_7$.

Next, when the switch SW5 is in the on-state and H level pulses are applied as the driving signal RST2 and the driving signal TRG2 in a period from a time $t_3$ to a time $t_4$, signal charges accumulated in the photoelectric conversion unit 111 and the floating diffusion unit 121 of the second pixel 100-2 are discharged.

Accordingly, the electric charges accumulated in the photoelectric conversion unit 111 until then are swept in the second pixel 100-2, and new electric charges obtained from light from a subject are accumulated in the photoelectric conversion unit 111 in a period from the time $t_4$ to a time $t_{12}$.

Next, when the driving signals SEL1 and SEL2 switch from the L level to the H level in the selected first pixel 100-1 and second pixel 100-2 in a period from a time $t_5$ to a time $t_{14}$, the load MOS circuit 52 supplies a current in a direction from the sources to the drains of the amplifier transistors 114 of the first pixel 100-1 and the second pixel 100-2.

Furthermore, when the switches SW2, SW3, SW5, and SW8 are in the on-state in a period from the time $t_5$ to the time $t_9$, the selected first pixel 100-1 and second pixel 100-2 and the current mirror circuit 51 of the column readout circuit unit 13 are equivalent to a differential pixel readout circuit (e.g., the differential pixel readout circuit 50 of FIG. 8) in which the first pixel 100-1 is set as the read pixel 100S and the second pixel 100-2 is set as the reference pixel 100R.

Accordingly, a difference between FD potentials of the floating diffusion units 121 of the selected first pixel 100-1 and second pixel 100-2 is amplified to be an input voltage signal and output to the vertical signal lines 22.

Next, when H level pulses are applied as the driving signal RST1 and the driving signal RST2 in a period from the time $t_5$ to a time $t_6$, electric charges accumulated in the floating diffusion units 121 of the first pixel 100-1 and the second pixel 100-2 are discharged and signal levels are initialized (reset).

This reset state continues to the time $t_7$, and a voltage is read as a reset level of the first pixel 100-1 during that time.

When an H level pulse is applied as the driving signal TRG1 in a period from the time $t_7$ to a time $t_8$, electric charges accumulated in the photoelectric conversion unit 111 of the first pixel 100-1 are transferred to the floating diffusion unit 121 by the transfer transistor 112.

Then, when the floating diffusion unit 121 of the first pixel 100-1 is modulated due to the transferred electric charges and a voltage thereof is then input to the gate of the amplifier transistor 114 as a voltage signal, a voltage signal in accordance with the amount of accumulated electric charges is output to the vertical signal line 22.

This signal readout state continues until the switches SW2, SW3, SW5, and SW8 are in the off-state at the time $t_9$, and a voltage of the signal level of the first pixel 100-1 is read during that time.

Next, when the switches SW1, SW4, SW6, and W7 are in the on-state in the period from a time $t_{10}$ to the time $t_{14}$, the selected first pixel 100-1 and the second pixel 100-2 and the current mirror circuit 51 of the column readout circuit unit 13 are equivalent to a differential pixel readout circuit (e.g., the differential pixel readout circuit 50 of FIG. 8) in which the second pixel 100-2 is set as the read pixel 100S and the first pixel 100-1 is set as the reference pixel 100R.

Accordingly, a difference between FD potentials of the floating diffusion units 121 of the selected first pixel 100-1 and second pixel 100-2 is amplified to be an input voltage signal and output to the vertical signal lines 22.

Next, when H level pulses are applied as the driving signal RST1 and the driving signal RST2 in a period from a time $t_{10}$ to a time $t_{11}$, electric charges accumulated in the floating diffusion units 121 of the first pixel 100-1 and the second pixel 100-2 are discharged and signal levels are initialized (reset).

This reset state continues until the time $t_{12}$, and a voltage is read as a reset level of the second pixel 100-2 during that time.

When an H level pulse is applied as the driving signal TRG2 in a period from the time $t_{12}$ to a time $t_{13}$, electric charges accumulated in the photoelectric conversion unit 111 of the second pixel 100-2 are transferred to the floating diffusion unit 121 by the transfer transistor 112.

Then, when the floating diffusion unit 121 of the first pixel 100-2 is modulated due to the transferred electric charges and a voltage thereof is then input to the gate of the amplifier transistor 114 as a voltage signal, a voltage signal in accordance with the amount of accumulated electric charges is output to the vertical signal line 22.

This signal readout state continues until the switches SW1, SW2, SW6, and SW7 are in the off-state at the time $t_{14}$, and a voltage is read as the signal level of the second pixel 100-2 during that time.

Note that the column signal processing unit 14 (FIG. 6) performs correlated double sampling to remove noise by obtaining a difference between the reset level and the signal level read, as described above, in each of the first pixel 100-1 and the second pixel 100-2, and thereby a pixel signal from which noise is removed can be read.

(H) Configuration in a Case in which SF Mode and Differential Mode can be Switched It is desirable for reading to be performed through, for example, source follower-type readout with a wide dynamic range to obtain high conversion efficiency at a bright time in differential-type amplification readout. That is, more appropriate readout can be performed by appropriately switching between source follower-type readout (which will be referred to as an SF mode below) and differential-type amplification readout (which will be referred to as a differential mode below).

FIGS. 19 to 21 are circuit diagrams illustrating configurations in which the SF mode and the differential mode can be switched.

FIG. 19 illustrates an example of a configuration of a pixel readout circuit 50H-1 with pixels arranged in the pixel array unit 11 switched to the SF mode by the switches SW of the column readout circuit unit 13. On the other hand, FIGS. 20 and 21 illustrate examples of configurations of pixel readout circuits 50H-2 and 50H-3 with pixels arranged in the pixel array unit 11 switched to the differential mode by the switches SW of the column readout circuit unit 13.

In the pixel readout circuit 50H-1 of FIG. 19, the first pixel 100-1 and the second pixel 100-2 arranged to be adjacent to each other in the same row are exemplified among the pixels two-dimensionally arranged in the pixel array unit 11.

In the pixel readout circuit 50H-1 of FIG. 19, switches SW0, SW11 to SW17, and SW21 to SW27 of the column readout circuit unit 13 perform a switching operation to transition to the SF mode, and thereby the first pixel 100-1 and the second pixel 100-2 independently perform source follower-type readout.

Note that, in the pixel readout circuit 50H-1 of FIG. 19, portions emphasized with thick lines in the circuit wiring are portions effective during the operation in the SF mode.

Meanwhile, in the pixel readout circuit 50H-2 of FIG. 20, the switches SW0, SW11 to SW17, and SW21 to SW27 of the column readout circuit unit 13 perform a switching operation to transition to the differential mode, and thereby the first pixel 100-1 is set as the read pixel 100S and the second pixel 100-2 is set as the reference pixel 100R in the pixel array unit 11, and thus differential-type amplification readout of the first pixel 100-1 is performed.

Note that, in the pixel readout circuit 50H-2 of FIG. 20, portions emphasized with thick lines in the circuit wiring are portions effective during the operation in the differential mode.

In addition, in the pixel readout circuit 50H-3 of FIG. 21, the switches SW0, SW11 to SW17, and SW21 to SW27 of the column readout circuit unit 13 perform the switching operation to transition to the differential mode, and thereby the first pixel 100-1 is set as the reference pixel 100R and the second pixel 100-2 is set as the read pixel 100S in the pixel array unit 11, and thus differential-type amplification readout of the second pixel 100-2 is performed.

Note that, in the pixel readout circuit 50H-3 of FIG. 21, portions emphasized with thick lines in the circuit wiring are portions effective during the operation in the differential mode.

As described above, in the pixel readout circuits 50H, the switches SW0, SW11 to SW17, and SW21 to SW27 of the column readout circuit unit 13 perform the switching operation, and thus the first pixel 100-1 is switched to a pixel corresponding to the SF mode (FIG. 19) and to the read pixel 100S (FIG. 20) or the reference pixel 100R (FIG. 21) corresponding to the differential mode in the pixel array unit 11, and the second pixel 100-2 is switched to a pixel corresponding to the SF mode (FIG. 19) and to the reference pixel 100R (FIG. 20) or the read pixel 100S (FIG. 21) corresponding to the differential mode.

In other words, in the pixel readout circuits 50H, through the switching operation of the switches SW0, SW11 to SW17, and SW21 to SW27 of the column readout circuit unit 13, source follower-type readout can be performed and a configuration of a pixel pair forming a differential pair (a differential pair) can be replaced when differential-type amplification readout is performed.

(Example of Driving in SF Mode)

Here, an example of driving of pixels switched to the SF mode illustrated in FIG. 19 will be described with reference to the timing chart of FIG. 22.

Note that the upper part of FIG. 22 illustrates a timing chart with respect to the driving signals SEL1, RST1, and TRG1 and the driving signals SEL2, RST2, and TRG2 respectively applied to the gates of the select transistors 115, the reset transistors 113, and the transfer transistors 112 in the first pixel 100-1 and the second pixel 100-2.

Meanwhile, the lower part of FIG. 22 illustrates a timing chart with respect to the switches SW0, SW11 to SW17, and SW21 to SW27 indicating on- and off-timings of the switches SW0, SW11 to SW17, and SW21 to SW27 in the column readout circuit unit 13. Note that a direction of time in FIG. 22 is a direction from the left to the right of the drawing.

However, the timing chart of FIG. 22 will basically be described to correspond to the above-described timing chart of FIG. 18 for the sake of convenience in description, but the example of driving of FIG. 22 has a difference from that of FIG. 18 particularly in that driving in a period from a time $t_3$ to a time $t_5$ and a period from a time $t_{10}$ to a time t 14 do not contribute to readout of the first pixel 100-1 and the second pixel 100-2.

First, when the switches SW17 and SW27 are in the on-state and H level pulses are applied as the driving signals RST1, RST2, TRG1, and TRG2 in a period from a time $t_1$ to a time $t_2$, electric charges accumulated in the photoelectric conversion units 111 and the floating diffusion units 121 of the first pixel 100-1 and the second pixel 100-2 are discharged.

Accordingly, the electric charges accumulated in the photoelectric conversion units 111 in the first pixel 100-1 and the second pixel 100-2 until then are swept, and new electric charges obtained from light from a subject are accumulated in the photoelectric conversion unit 111 in a period from the time $t_1$ to a time $t_7$.

Next, when the driving signals SEL1 and SEL2 switch from an L level to an H level in the selected first pixel 100-1 and second pixel 100-2 in a period from a time $t_5$ to a time $t_9$, the load MOS circuit 52 supplies a current in the direction from the sources to the drains of the amplifier transistors 114 of the first pixel 100-1 and the second pixel 100-2.

Further, when the switches SW12, SW14, SW17, SW22, SW24, and SW27 are in the on-state and the other switches SW are in the off-state in the period from the time $t_5$ to the time $t_9$, the readout circuits of the selected first pixel 100-1 and second pixel 100-2 are equivalent to a source follower-type readout circuit.

Accordingly, FD potentials of the floating diffusion units 121 in the selected first pixel 100-1 and second pixel 100-2 are amplified to be an input voltage signal and output to the vertical signal line 22.

Next, when H level pulses are applied as the driving signals RST1 and RST2 in a period from the time $t_5$ to a time $t_6$, electric charges accumulated in the floating diffusion units 121 of the first pixel 100-1 and the second pixel 100-2 are discharged and signal levels are initialized (reset).

This reset state continues until a time $t_7$, and voltages are read as reset levels of the first pixel 100-1 and the second pixel 100-2 during that time.

When H level pulses are applied as the driving signals TRG1 and TRG2 in a period from the time $t_7$ to a time $t_8$, electric charges accumulated in the photoelectric conversion units 111 of the first pixel 100-1 and the second pixel 100-2 are transferred to the floating diffusion units 121 by the transfer transistors 112.

Then, when the floating diffusion units 121 are modulated due to the transferred electric charges in the first pixel 100-1 and the second pixel 100-2 and a voltage thereof is then input to the gates of the amplifier transistors 114 as voltage signals, voltage signals in accordance with the amount of the accumulated electric charges are output to the vertical signal line 22.

This signal readout state continues until the switches SW12, SW14, SW17, SW22, SW24, and SW27 are in the off-state at the time $t_9$, and voltages are read as signal levels of the first pixel 100-1 and the second pixel 100-2 during that time.

Note that the column signal processing unit 14 (FIG. 6) performs correlated double sampling to remove noise by obtaining a difference between the reset level and the signal level read, as described above, in each of the first pixel 100-1 and the second pixel 100-2, and thereby a pixel signal from which noise is removed can be read.

(Example of Driving in Differential Mode)

Next, an example of driving of pixels switched to the differential mode illustrated in FIGS. 20 and 21 will be described with reference to the timing chart of FIG. 23.

Note that the upper part of FIG. 23 illustrates a timing chart with respect to the driving signals SEL1, RST1, TRG1, SEL2, RST2, and TRG2 applied to the gates of the select transistors 115, the reset transistors 113, and the transfer transistors 112 of the first pixel 100-1 and the second pixel 100-2.

Meanwhile, the lower part of FIG. 23 illustrates a timing chart with respect to switches SW0, SW11 to SW17, and SW21 to SW27 indicating on- and off-timings of the switches SW0, SW11 to SW17, and SW21 to SW27 in the column readout circuit unit 13. Note that a direction of time in FIG. 23 is a direction from the left to the right of the drawing.

However, the timing chart of FIG. 23 will basically be described to correspond to the above-described timing chart of FIG. 18 for the sake of convenience in description, but the example of driving of FIG. 23 has a difference from that of FIG. 18 particularly in terms of an increase in the number of switches SW and switching control since it is necessary to switch between the SF mode and the differential mode as well as to switch between the read pixel 100S and the reference pixel 100R.

That is, in the timing chart of FIG. 23, timings at which H level pulses are applied as the driving signals SEL1, RST1, TRG1, SEL2, RST2, and TRG2 are similar to those in the timing chart of FIG. 18.

Meanwhile, in the timing chart of FIG. 23, the switches SW0, SW13, SW15, SW21, SW23, and SW26 among the switches SW0, SW11 to SW17, and SW21 to SW27 are in the on-state and the other switches SW are in the off-state in a period from a time $t_5$ to a time $t_9$. Accordingly, in the pixel array unit 11, the first pixel 100-1 is set as the read pixel 100S and the second pixel 100-2 is set as the reference pixel 100R, and thus differential-type amplification readout of the first pixel 100-1 is performed.

In addition, in the timing chart of FIG. 23, the switches SW0, SW11, SW13, SW16, SW23, and SW25 among the switches SW0, SW11 to SW17, and SW21 to SW27 are in the on-state in a period from a time $t_{10}$ to a time $t_{14}$, and the other switches SW are in the off-state. Accordingly, in the pixel array unit 11, the first pixel 100-1 is set as the reference pixel 100R and the second pixel 100-2 is set as the read pixel 100S, and thus differential-type amplification readout of the second pixel 100-2 is performed.

As described above, in the pixel readout circuits 50H, when the switches SW0, SW11 to SW17, and SW21 to SW27 perform switching operations in the column readout circuit unit 13, readout can be easily switched between the differential mode and readout in the SF mode. Thus, for example, the circuits can be switched to source follower-type readout with a wide dynamic range at a bright time.

(Effect Obtained from Configuration of First Embodiment)

Next, an effect obtained when a configuration in which a reset voltage is set through an external application and negative feedback according to the first embodiment is employed will be described with reference to FIG. 24.

Note that the upper part of FIG. 24 illustrates a timing chart with respect to the driving signals SEL1, RST1, and TRG1 respectively applied to the gates of the select transistor 115S, the reset transistor 113S, and the transfer transistor 112S of the read pixel 100S.

In addition, the middle part of FIG. 24 illustrates a timing chart with respect to the driving signals TRG2, RST2, and SEL2 respective applied to the gates of the select transistor 115R, the reset transistor 113R, and the transfer transistor 112R of the reference pixel 100R.

Since the timing charts in the upper and middle parts of FIG. 24 are similar to that illustrated in the above-described FIG. 9, a description thereof will be appropriately omitted, however, the timing chart in the lower part of FIG. 24 illustrates a timing chart of waveforms of voltages $V_{VRD}$, $V_{FD}$, $V_{VSL}$, and $V_{COM}$.

$V_{VRD}$ represents a waveform of a voltage applied to the vertical reset input line (VRD) 61, $V_{FD}$ represents a waveform of an FD potential of the floating diffusion unit (FD) 121, $V_{VSF}$ represents a waveform of a voltage applied to the vertical signal line (VSL) 22 (a VSL potential) connected to the output terminal 53, and $V_{COM}$ represents a waveform of a voltage applied to the vertical current supply line 62 connected to the load MOS circuit 52.

Here, focusing on a period from a time $t_3$ to a time $t_4$, when H level pulses are applied as the driving signals RST1 and RST2, electric charges accumulated in the floating diffusion unit 121S and the floating diffusion unit 121R of the read pixel 100S and the reference pixel 100R are discharged and signal levels are initialized (reset).

At this time, in the differential pixel readout circuit 50, the output terminal 53 is electrically connected to the floating diffusion unit 121S through the readout-side vertical reset input line 61S and the reset transistor 113S. As a result, a signal of the output terminal 53 is negatively fed back to the floating diffusion unit 121S on one input side and the output terminal enters into the virtual grounded state in the differential pixel readout circuit 50, and thus the floating diffusion unit 121R on the other input side fixed to the power supply Vrst through external application and the floating diffusion unit 121S and the output terminal 53 are at the same potential.

Then, when L level pulses are applied as the driving signals RST1 and RST2 in a period from the time $t_4$ to a time $t_5$, the floating diffusion unit 121S is electrically disconnected from the readout-side vertical reset input line 61S, the floating diffusion unit 121R is electrically disconnected from the reference-side vertical reset input line 61R, and thus the regions in the read pixel 100S and the reference pixel 100R enter into the floating state.

At this time, since the floating diffusion unit 121S of the read pixel 100S and the floating diffusion unit 121R of the reference pixel 100R have substantially identical structures, the regions show substantially the same potential change at the time of reset-off (reset feedthrough), and thus an FD potential of the floating diffusion unit 121S and an FD potential of the floating diffusion unit 121R show substantially the same movement.

Thus, an output from the output terminal 53 of the differential pixel readout circuit 50 hardly changes from the voltage Vrst at the time of reset-on, this state is the reset state (an initial state) in differential amplification readout, and an output level of the state is a reset level (an initial level). This reset state continues until signal charges are transferred at the time $t_5$, and a voltage, which is the reset level, is read.

By performing the above-described differential amplification readout, it is possible to stop deviation of the reset level from a readable range that may be caused by reset feedthrough while high conversion efficiency (an amplification rate) is realized, however, by employing the configuration in which the reset voltage is set through an external application and negative feedback, the FD potential of the read pixel 100S at the time of reset can be controlled so as to have a desired value in the first embodiment.

For example, it is known that an operating point is unfavorable for transfer in an amplifier circuit with high conversion efficiency (amplification rate), however, electric charges can be transferred from the photoelectric conversion unit 111S and an initial FD voltage at which high amplitude of an output voltage of a pixel is obtained can be set by controlling the FD potential of the read pixel 100S so as to have a desired value.

This is the end of the description of the first embodiment.

4. Second Embodiment

Next, a configuration for suppressing an increase of noise while high conversion efficiency (amplification rate) is realized through differential-type amplification readout will be described as a second embodiment with reference to FIGS. 25 to 32.

(Example of Configuration of Pixel Readout Circuit)

FIG. 25 is a circuit diagram illustrating an example of a configuration of a pixel readout circuit according to the second embodiment.

In FIG. 25, the pixel readout circuit is constituted by pixels 100 arranged in a pixel array unit 11, a current mirror circuit 51 constituted by PMOS transistors 511, and load MOS circuits 52 that supply constant currents to the pixels.

In the pixel array unit 11, the pixel 100 is denoted as the pixel 100-$ij$ when the pixel 100 is in an $i^{th}$ row and an $j^{th}$ column, and a pixel 100-11 has four pixel transistors including a photoelectric conversion unit 111 such as a photodiode (PD) as well as, for example, a transfer transistor 112, a reset transistor 113, an amplifier transistor 114, and a select transistor 115.

In the pixel 100-11, a drain of the reset transistor 113 is connected to a reset input line 61-1. A source of the amplifier transistor 114 is connected to a vertical current supply line 62-1. A drain of the amplifier transistor 114 is connected to a source of the select transistor 115S, and a drain of the select transistor 115 is connected to a vertical signal line 22-1.

Gates of the transfer transistor 112, the reset transistor 113, and the select transistor 115 are connected to the vertical driving unit 12 via pixel driving lines 31 (FIG. 6), and pulses are respectively supplied thereto as driving signals (TRGi, RSTi, and SELi).

In addition, although a pixel 100-12 has four pixel transistors in addition to a photoelectric conversion unit 111 like the pixel 100-11, the pixel 100-12 is different from the aforementioned pixel 100-11 in that driving signals (TRGj, RSTj, and SELj) are supplied to gates of a transfer transistor 112, a reset transistor 113, and a select transistor 115 thereof.

That is, although the pixels 100 have similar configurations in the pixel array unit 11, different driving signals are supplied to gates of the transfer transistors 112, the reset transistors 113, and the select transistors 115 of pixels in odd columns from those in even columns.

More specifically, the driving signals (TRGi, RSTi, and SELi) are supplied to the pixel 100-11 and a pixel 100-13 in the odd columns, and the driving signals (TRGj, RSTj, and SELj) are supplied to the pixel 100-12 and a pixel 100-14 in the even columns.

Here, switches FEN, DAEN, DAS1, and DAS2 are provided in the pixel readout circuit of FIG. 25, and when these switches perform switch-on or -off operations, the SF mode and the differential mode are switched to each other.

In addition, switches DAHZ are provided in upper and lower parts of the pixel readout circuit of FIG. 25, and when the switches DAHZ in the upper part are in the on-state, bias voltages of current mirror circuits 51, which are each constituted by a pair of PMOS transistors 511, are laterally connected. Meanwhile, when the switches DAHZ in the lower part are in the on-state, constant current source nodes, which are load MOS circuits 52 that are each constituted by an NMOS transistor, are laterally connected.

Note that a configuration of the pixel readout circuit switched to the differential mode will be described below with reference to the circuit diagrams of FIGS. 26 and 27, and an example of driving thereof will be described below with reference to the timing chart of FIG. 29. In addition, a configuration of the pixel readout circuit switched to the SF mode will be described with reference to the circuit diagram of FIG. 28, and an example of driving thereof will be described below with reference to the timing chart of FIG. 30.

(Configuration of Differential Mode)

FIGS. 26 and 27 are circuit diagrams illustrating a configuration in which read pixels and reference pixels can be switched in the differential mode.

In FIGS. 26 and 27, an example of a configuration of pixels arranged in the pixel array unit 11, which serves as a pixel readout circuit, switched to the differential mode by setting switches SFEN to be in the off-state and the switches DAEN to be in the on-state, is illustrated.

In addition, when the switches DAS1 are set to be in the on-state and the switches DAS2 are set to be the off-state in the pixel readout circuit of FIG. 26, the pixel 100-11 and the pixel 100-13 in the odd columns among the pixels arranged in the pixel array unit 11 are set to, for example, reference pixels 100R, and the pixel 100-12 and the pixel 100-14 in the even columns are set to read pixels 100S. Thereby, differential-type amplification readout is performed.

On the other hand, when the switches DAS1 are set to be in the off-state and the switches DAS2 are set to be in the on-state in the pixel readout circuit of FIG. 27, the pixel 100-11 and the pixel 100-13 in the odd columns among the pixels arranged in the pixel array unit 11 are set to, for example, the read pixels 100S, and the pixel 100-12 and the pixel 100-14 in the even columns are set to the reference pixels 100R. Thereby, differential-type amplification readout is performed.

Here, in the pixel readout circuits of FIGS. 26 and 27, the switches DAHZ in the upper parts are in the on-state and bias voltages of the current mirror circuits 51, which are each constituted by the pair of PMOS transistors 511, are laterally connected (HC1 in the drawings). In addition, when the switches DAHZ in the lower parts are in the on-state, constant current source nodes, which are the load MOS circuits 52 which are each constituted by an NMOS transistor, are laterally connected (HC2 in the drawings).

Due to the above-described lateral connection, the source side and the drain side of the amplifier transistor 114R of each of the reference pixels 100R are connected to each other and noise that occurs at each of the laterally connected nodes is reduced in accordance with the number of lateral connections.

Here, although the noise that occurs at the lateral connection nodes can be reduced by making at least one lateral connection among the lateral connection HC1 and the lateral connection HC2, when both the lateral connection HC1 and the lateral connection HC2 are made, the effect of the noise reduction can be improved.

In addition, although the noise that occurs at the lateral connection nodes can be reduced not only when all of the switches DAHZ in the upper part are set to be in the on-state to realize the lateral connection HC1 but also when some of the switches DAHZ are in the on-state, a larger number of lateral connections for the lateral connection HC1 can further improve the effect of the noise reduction. Likewise, the noise that occurs at the lateral connection nodes can be reduced by setting all or some of the switches DAHZ in the lower part to be in the on-state to realize the lateral connection HC2.

That is, although the unit of lateral connections helps the effect of the noise reduction increase as the number of columns increases, it is not limited to a case in which pixel pairs (differential pairs) of all of the pixels arranged in the pixel array unit 11 are connected, and the effect of the noise reduction can be obtained if lateral connections are made in units of two or more columns.

For example, lateral connections can be made separately for colors such as R (red), G (green), and B (blue) or can made in a plurality of regions in accordance with angles of view, and these areas can be switched in accordance with a mode. The switches DAHZ in the upper and lower parts perform switching operations in accordance with DAHZ signals supplied to the switches, and thereby a lateral connection can be arbitrarily separated.

As described above, it is possible to cause the source sides, the drain sides, and both the source and drain sides of all or some of the amplifier transistors 114R of the reference pixels 100R to be connected to each other in the pixel readout circuit.

Note that, in the pixel readout circuit of FIG. 26, the vertical signal lines 22 of the reference pixels 100R of the pixel 100-11 and the pixel 100-13 are connected to drains and gates of PMOS transistors 511-1 and gates of PMOS transistors 511-2 of the current mirror circuits 51.

In the reference pixels 100R of FIG. 26, the vertical reset input lines 61 is connected to a power supply Vrst, and an arbitrary input voltage signal is applied to the floating diffusion units 121 selected via this wiring, i.e., input terminals of the amplifier transistors 114, at the time of reset.

In addition, in the pixel readout circuit of FIG. 26, the vertical signal lines 22 of the read pixels 100S of the pixel 100-12 and the pixel 100-14 are connected to the vertical reset input lines 61, drains of the PMOS transistors 511-2 of the current mirror circuits 51, and output terminals Vout.

In the read pixels 100S of FIG. 26, the vertical reset input lines 61 is connected to the vertical signal lines 22 and the floating diffusion units 121 of the selected read pixels 100, i.e., input terminals of the amplifier transistors 114, and when the reset transistors 113 are on, an output signal of the pixel readout circuit is negatively fed back to the circuit.

Meanwhile, in the pixel readout circuit of FIG. 27, the vertical signal lines 22 of the read pixels 100S of the pixel 100-11 and the pixel 100-13 are connected to the vertical reset input lines 61, the drains of the PMOS transistor 511-2 of the current mirror circuits 51, and the output terminals Vout.

In the read pixels 100S of FIG. 27, the vertical reset input lines 61 are connected to the vertical signal lines 22 and the floating diffusion units 121 of the selected read pixels 100, i.e., the input terminals of the amplifier transistors 114, and when the reset transistors 113 are on, an output signal of the pixel readout circuit is negatively fed back to the circuit.

In addition, in the pixel readout circuit of FIG. 27, the vertical signal lines 22 of the reference pixels 100R of the pixel 100-12 and the pixel 100-14 are connected to the drains and gates of the PMOS transistors 511-2 1 and the gates of the PMOS transistors 511-1 of the current mirror circuits 5.

In the reference pixels 100R of FIG. 27, the vertical reset input lines 61 are connected to the power supply Vrst, and an arbitrary input voltage signal is applied to the floating diffusion units 121 of the selected reference pixels 100R via this wiring, i.e., the input terminals of the amplifier transistors 114, at the time of reset.

That is, the pixel readout circuits of FIGS. 26 and 27 have a similar configuration to that of the differential pixel readout circuit according to the above-described first embodiment (e.g., the differential pixel readout circuit 50 of FIG. 8), and through the differential-type amplification readout, it is possible to stop deviation of a reset level from a readable range that may be caused by reset feedthrough as well as to control FD potentials of the read pixels 100S so as to have desired values at the time of reset while high conversion efficiency is realized.

(Configuration of SF Mode)

FIG. 28 is a circuit diagram illustrating an example of a configuration of the pixel readout circuit in the SF mode.

FIG. 28 illustrates an example of a configuration of pixels arranged in the pixel array unit 11, which serves as a pixel readout circuit, switched to the SF mode by setting switches SFEN to be in the on-state and the switches DAEN, DAS1, and DAS2 to be in the off-state.

In the pixel readout circuit of FIG. 28, all of the pixels arranged in the pixel array unit 11, i.e., for example, all of the pixel 100-11 to the pixel 100-14, independently perform source follower-type readout by setting the switches SFEN to be in the on state and the switches DAEN, DAS1, and DAS2 to be in the off-state.

Note that, in the pixel readout circuit of FIG. 28, such lateral connections as in the differential mode are not made since the switches DAHZ in the upper and lower parts are in the off-state.

(Example of Driving in Differential Mode)

Here, an example of driving of the pixels switched to the differential mode illustrated in FIGS. 26 and 27 will be described with reference to the timing chart of FIG. 29.

Note that an upper part of FIG. 29 shows a timing chart with respect to the driving signals SELi, RSTi, and TRGi and the driving signals SELj, RSTj, and TRGj respectively applied to the gates of the select transistors 115, the reset transistors 113, and the transfer transistors 112 of the pixel 100-11 and the pixel 100-12.

In addition, the middle part of FIG. 29 shows a timing chart with respect to the switches SFEN, DAEN, DAS1, DAS2, and DAHZ indicating on- and off-timings of the switches SFEN, DAEN, DAS1, DAS2, and DAHZ. Furthermore, a lower part of FIG. 29 shows a timing chart with respect to voltage waveforms of output terminals Voutk and Voutk+1. A direction of time in FIG. 29 is a direction from the left to the right of the drawing.

Note that, although the operation made in the period from the time $t_1$ to the time $t_5$ in the timing chart of FIG. 18 or FIG. 23 is omitted in the timing chart of FIG. 29, a similar operation to that made in the period from the time $t_1$ to the time $t_5$ is actually performed.

When the driving signals SELi and SELj are switched to be at an H level in the pixel 100-11 and the pixel 100-12 in a period from a time $t_1$ to a time $t_{11}$, the load MOS circuits 52 supply currents in the directions from the sources to the drains of the amplifier transistors 114 of the pixel 100-11 and the pixel 100-12.

Furthermore, when the switches DAEN and DAS1 are the on-state in a period from the time $t_1$ to a time $t_6$, the selected pixel 100-11 and pixel 100-12 and the current mirror circuit 51 are equivalent to a differential pixel readout circuit in which the pixel 100-12 is set as the read pixel 100S and the pixel 100-11 is set as the reference pixel 100R.

Accordingly, a difference between FD potentials of the floating diffusion units 121 of the selected pixel 100-11 and pixel 100-12 is amplified to be an input voltage signal and output to the vertical signal lines 22.

Next, when H level pulses are applied as the driving signal RSTi and the driving signal RSTj in a period from a time $t_2$ to a time $t_3$, electric charges accumulated in the floating diffusion units 121 of the pixel 100-11 and the pixel 100-12 are discharged and signal levels are initialized (reset).

This reset state continues until a time $t_4$, and a voltage is read as a reset level of the pixel 100-12 during that time.

When an H level pulse is applied as the driving signal TRGj in a period from the time $t_4$ to a time $t_5$, electric charges accumulated in the photoelectric conversion unit 111 of the pixel 100-12 are transferred by the transfer transistor 112 to the floating diffusion unit 121.

Then, when the floating diffusion unit 121 is modulated due to the transferred electric charges in the pixel 100-12 and a voltage thereof is then input to the gate of the amplifier transistors 114 as a voltage signal, a voltage signal in accordance with the amount of the accumulated electric charges is output to the vertical signal line 22.

This signal readout state continues until the switch DAS1 is in the off-state at the time $t_6$, and a voltage is read as a signal level of the pixel 100-12 (the voltage waveform of Voutk+1 in the drawing) during that time.

Next, when the switch DAS2 enters into the on-state, instead of the off-state like the switch DAS1, and thus the switches DAEN and DAS2 are in the on-state in a period from the time $t_6$ to the time $t_{11}$, the selected pixel 100-11 and pixel 100-12 and the current mirror circuit 51 are equivalent to a differential pixel readout circuit in which the pixel 100-12 is set as the reference pixel 100R and the pixel 100-11 is set as the read pixel 100S.

Accordingly, a difference between FD potentials of the floating diffusion units 121 of the selected pixel 100-11 and pixel 100-12 is amplified to be an input voltage signal and output to the vertical signal lines 22.

Next, when H level pulses are applied as the driving signal RSTi and the driving signal RSTj in a period from a time $t_7$ to the time $t_8$, electric charges accumulated in the floating diffusion units 121 of the pixel 100-11 and the pixel 100-12 are discharged and the signal level is initialized (reset).

This reset state continues until a time $t_9$, and a voltage is read as a reset level of the pixel 100-11 during that time.

When an H level pulse is applied as the driving signal TRGj in a period from the time $t_9$ to the time $t_{10}$, electric charges accumulated in the photoelectric conversion unit 111 of the pixel 100-11 are transferred by the transfer transistor 112 to the floating diffusion unit 121.

Then, when the floating diffusion unit 121 is modulated due to the transferred electric charges in the pixel 100-11 and a voltage thereof is then input to the gate of the amplifier transistors 114 as a voltage signal, a voltage signal in accordance with the amount of the accumulated electric charges is output to the vertical signal line 22.

This signal readout state continues until the switch DAS2 is in the off-state at the time $t_{11}$, and a voltage is read as a signal level of the pixel 100-11 (the voltage waveform of Voutk in the drawing) during that time.

Here, the switch DAHZ is continuously in the on-state through the period from the time $t_1$ to the time $t_{11}$, bias voltages of the current mirror circuits 51, which are each constituted by the pair of the PMOS transistors 511, are laterally connected, and further constant current source nodes, which are the load MOS circuits 52 that are each constituted by an NMOS transistor, are laterally connected. Thus, noise that occurs at each of the laterally connected nodes is reduced in accordance with the number of lateral connections.

Note that the column signal processing unit 14 (FIG. 6) performs correlated double sampling to remove noise by obtaining a difference between the reset level and the signal level read, as described above, in each of the pixel 100-11 and the pixel 100-12, and thereby a pixel signal from which noise is removed can be read.

By setting the switches SFEN to be in the off-state and the switches DAEN to be in the on-state as described above, the circuit switches to the differential mode, and thereby differential-type amplification readout is performed. In addition, by switching the switches DAS1 and DAS2 to be exclusively in the on- or off-state, readout with alternating switching of the read pixel 100S and the reference pixel 100R can be performed.

In addition, by setting the switches DAHZ to be in the on-state, the bias voltages of the current mirror circuits 51, which are each constituted by the pair of PMOS transistors 511, are laterally connected, and by laterally connecting the constant current source nodes having a common voltage of the pixel pair of the read pixel 100S and the reference pixel 100R (a differential pair), the noise that occurs at each of the laterally connected nodes can be reduced in accordance with the number of lateral connections.

(Example of Driving in SF Mode)

Next, an example of driving of pixels switched to the SF mode illustrated in FIG. 28 will be described with reference to the timing chart of FIG. 30.

Note that the timing chart of FIG. 30 with respect to the driving signals SELi, RSTi, and TRGi, the driving signals SELj, RSTj, and TRGj, the switches SFEN, DAEN, DAS1, DAS2, and DAHZ, and the voltage waveforms of the output terminals Voutk and Voutk+1 corresponds to the timing chart of FIG. 29 with respect to the elements.

When the driving signal SELi switches to an H level in a period from a time $t_1$ to a time $t_6$, the load MOS circuit 52 supplies a current in the direction from the source to the drain of the amplifier transistor 114 of the pixel 100-11.

Note that, when the switches DAEN, DAS1, and DAS2 are set to be in the off-state while the switch SFEN is set to be in the on-state in the period from the time $t_1$ to the time $t_6$, the readout circuit of the selected pixel 100-11 is equivalent to a source follower-type readout circuit. Accordingly, an FD potential of the floating diffusion unit 121 in the selected pixel 100-11 is amplified to be an input voltage signal and output to the vertical signal line 22.

When an H level pulse is applied as the driving signal RSTi in a period from a time $t_2$ to a time $t_3$, electric charges accumulated in the floating diffusion unit 121 of the pixel 100-11 are discharged and a signal level is initialized (reset).

This reset state continues until a time $t_4$, and a voltage is read as a reset level of the pixel 100-11 during that time.

When an H level pulse is applied as the driving signal TRGi in a period from the time $t_4$ to a time $t_5$, electric charges accumulated in the photoelectric conversion unit 111 of the pixel 100-11 are transferred by the transfer transistor 112 to the floating diffusion unit 121.

Then, when the floating diffusion unit 121 is modulated due to the transferred electric charges in the pixel 100-11 and a voltage thereof is then input to the gate of the amplifier transistors 114 as a voltage signal, a voltage signal in accordance with the amount of the accumulated electric charges is output to the vertical signal line 22.

This signal readout state continues until the time $t_6$, and a voltage is read as the signal level of the pixel 100-11 (the voltage waveform of Voutk in the drawing) during that time.

Next, when the driving signal SELi is switched to an L level and further the driving signal SELj is switched to an H level in a period from the time $t_6$ to a time $t_{11}$, the load MOS circuit 52 supplies a current in the direction from the source to the drain of the amplifier transistor 114 of the pixel 100-12.

Note that, since the switches SFEN continue in the on-state and the switches DAEN, DAS1, and DAS2 continue in the off-state in the period from the time $t_6$ to the time $t_{11}$ as in the period from the time $t_1$ to the time $t_6$, the readout circuit of the selected pixel 100-12 is equivalent to a source follower-type readout circuit.

Next, when an H level pulse is applied as the driving signal RSTj in a period from a time $t_7$ to a time $t_8$, electric charges accumulated in the floating diffusion unit 121 of the pixel 100-12 are discharged and the signal level is initialized (reset).

This reset state continues until a time $t_9$, and a voltage is read as a reset level of the pixel 100-12 during that time.

When an H level pulse is applied as the driving signal TRGj in a period from the time $t_9$ to the time $t_{10}$, electric charges accumulated in the photoelectric conversion unit 111 of the pixel 100-12 are transferred by the transfer transistor 112 to the floating diffusion unit 121.

Then, when the floating diffusion unit 121 is modulated due to the transferred electric charges in the pixel 100-12 and a voltage thereof is then input to the gate of the amplifier transistors 114 as a voltage signal, the voltage signal in accordance with the amount of the accumulated electric charges is output to the vertical signal line 22.

This signal readout state continues until the time $t_{11}$, and a voltage is read as the signal level of the pixel 100-12 (the voltage waveform of Voutk+1 in the drawing) during that time.

Since the switches DAHZ are in the off-state in the period from the time $t_1$ to the time $t_{11}$ in FIG. 30 in the case of driving in the SF mode, bias voltages of the current mirror circuits 51 and constant current source nodes, which are the load MOS circuits 52, are not laterally connected.

In addition, the column signal processing unit 14 (FIG. 6) performs correlated double sampling to remove noise by obtaining a difference between the reset level and the signal level read, as described above, in each of the pixel 100-11 and the pixel 100-12, and thereby a pixel signal from which noise is removed can be read.

(Other Configuration of Differential Mode)

FIG. 31 is a circuit diagram illustrating a configuration in a case in which the number of read pixels and reference pixels are different in the differential mode.

In the above-described configuration of the differential mode illustrated in FIG. 26 and FIG. 27, the ratio of the number of the read pixels 100S and the reference pixels 100R is 1:1. Here, in the case in which lateral connection is made with respect to the reference pixels 100R, the number of reference pixels 100R necessarily needs not to be the same as the number of read pixels 100S.

Although the pixels in the odd columns that are the pixel 100-11 and the pixel 100-13 in FIG. 31 are set as, for example, reference pixels 100R, the number of reference pixels 100R may be different from the number of read pixels 100S by not using the reference pixel 100-13.

The following control is performed, for example, in order to have the above configuration. That is, if the switches DAEN and DAS1 with respect to the reference pixel 100-13 among the switches DAEN and DAS1 are denoted as switches DAEN' and DAS1' in the configuration of FIG. 31, when the switches DAEN and DAS1 with respect to the pixels 100 other than the reference pixel 100-13 are in an on-state and the switches DAEN' and DAS1' with respect to the reference pixel 100-13 are in an off-state, the reference pixel 100-13 is set to be unused and disconnected from lateral connections.

Note that, when it comes to the switches DAEN' and DAS1' with respect to the reference pixel 100-13 in FIG. 31, there are two switches DAEN' and one switch DAS1'. In addition, the load MOS circuit 52 with respect to the reference pixel 100-13 (the load MOS circuit 52 surrounded by the dotted line frame A in the drawing) is in an off-state when reference pixel 100-13 is set to be unused.

By setting some of the reference pixels 100R to be unused as described above, the number of reference pixels can be reduced by not connecting some of the reference pixels 100R to be in lateral connections. At this time, the load MOS circuits 52 can be set to be in an off-state in the same number as the number of reference pixels 100R that are set to be unused, and thus power consumption can be reduced.

In addition, at this time, a noise reduction effect of the reference pixels 100R is 1/IN times the number of reference pixels 100R N, and thus the noise reduction effect decreases; however, if a sufficient number of reference pixels are connected, noise of the reference pixels 100R is not dominant, and thus a power consumption effect can be obtained.

(Effect Obtained from Configuration of Second Embodiment)

Next, an effect obtained by employing the configuration of lateral connection as the second embodiment will be described with reference to FIG. 32.

In the second embodiment, when the switches DAHZ are in the on-state and thus the bias voltage of the current mirror circuits 51 and the constant current source nodes that are the load MOS circuits 52 are laterally connected, noise that occurs at each of the laterally connected nodes can be reduced in accordance with the number of lateral connections, and the reason therefor is as follows.

It is possible to obtain a structure in which a voltage amplitude of vertical signal line (VSL) 22 per electron can be amplified through differential-type amplification readout and noise components that occurs in the vertical signal line 22 and the successive stages can be reduced through input conversion (input conversion per signal electron) and an effect of suppressing noise increases caused by the amplifier transistors 114 of the differential pair.

Random noise that occurs in the amplifier transistors 114 of the reference pixels 100R is not correlated in each of the reference pixels 100R, and thus by causing the laterally connected nodes in connection with each other, the noise can be cancelled together and reduced.

This can be rephrased that the above circuit configuration is equivalent to using as a large transistor as the number of shared and connected amplifier transistors 114 of the reference pixels 100R side and thus noise caused in the reference pixels 100R can be reduced.

Here, if the number of connected reference pixels 100R is set to $N_{pix\_ref}$, noise caused by the reference pixels 100R is reduced to $1/\sqrt{N_{pix\_ref}}$ times.

For example, in a case in which 1920×1080 pixels are arrayed in the pixel array unit 11 and there are reference pixels 100R coupled with columns respectively to read signal pixels in units of parallel columns, $1/\sqrt{1920} \div 0.02$ is obtained, and the doubled coefficient applied to Vn_pix2 of the above-described formula (7) is 1.02.

At this time, since the relation of $1/\sqrt{(1.02 \times Vn\_pix2)} \div 1.01 \times Vn\_pix$ is satisfied as noise, influence thereof can be suppressed to 1% or lower and is the square mean of Vn_adc and Vn_afe, and thus influence of the reference pixels 100R may be an ignorable level.

FIG. 32 shows a relation between the number of connected reference pixels 100R and total noise Vn_total when the sum of Vn_adc and Vn_afe is 100 (μVrms), and Vn_pix is 100 (μVrms), ηfd is 100 (μV/e−), and ηvsl is 400 (μV/e−) in a case in which the vertical axis represents total noise (e-rms) and the horizontal axis represents the number of laterally connected columns (columns). It is obvious from the relation shown in FIG. 32 that the noise reduction effect increases as the number of connected reference pixels 100R increases.

This is the end of the description of the second embodiment.

5. Modified Examples (Laminate-Type Configuration)

FIG. 33 is a diagram illustrating an example of a configuration of a laminate-type solid-state imaging device to which an embodiment of the present technology can be applied.

FIG. 33A illustrates an example of a schematic configuration of a non-laminate-type solid-state imaging device. The CMOS image sensor 10 (FIG. 6) has one die (semiconductor substrate) 811 as illustrated in FIG. 33A. This die 811 has a pixel area 812 in which pixels are two-dimensionally arranged, a control circuit 813 that drives pixels and performs various kinds of control, and a logic circuit 814 for signal processing mounted thereon.

FIG. 33B and FIG. 33C illustrate examples of schematic configurations of laminate-type solid-state imaging devices. The CMOS image sensor 10 (FIG. 6) has two laminated dies of a sensor die 821 and a logic die 824 as illustrated in FIG. 33B and FIG. 33C that are electrically connected to each other to configure one semiconductor chip.

In FIG. 33B, the sensor die 821 has the pixel area 812 and the control circuit 813 mounted thereon, and the logic die 824 has the logic circuit 814 including a signal processing circuit for signal processing mounted thereon.

In FIG. 33C, the sensor die 821 has the pixel area 812 mounted thereon, and the logic die 824 has the control circuit 813 and the logic circuit 814 mounted thereon.

(Configuration of Signal Processing Device)

Although the solid-state imaging device such as the CMOS image sensor 10 has been described above as an example, the present technology is not limited to solid-state imaging devices and can be applied to signal processing devices which perform various kinds of signal processing. Note that, in the read pixel 100S and the reference pixel 100R, the floating diffusion unit 121S and the floating diffusion unit 121R which serve as floating diffusion units (FD) can also be said to be sample-and-hold circuits. In other words, the readout-side amplifier transistor 114S is provided in accordance with input signals from a plurality of input channels and amplifies an input signal input via the sample-and-hold circuit, and the reference-side amplifier transistor 114R forms a pair with each readout-side amplifier transistor 114S.

6. Configuration of Electronic Apparatus

FIG. 34 is a block diagram illustrating an example of a configuration of an electronic apparatus having a solid-state imaging device to which an embodiment of the present technology is applied.

The electronic apparatus 1000 is an electronic apparatus, for example, an imaging device including a digital still camera, a video camera, or the like, or a mobile terminal device including a smartphone, a tablet terminal, or the like.

The electronic apparatus 1000 is constituted by a solid-state imaging device 1001, a DSP circuit 1002, a frame memory 1003, a display unit 1004, a recording unit 100S, an operation unit 1006, and a power supply unit 1007. In addition, in the electronic apparatus 1000, the DSP circuit 1002, the frame memory 1003, the display unit 1004, the recording unit 100S, the operation unit 1006, and the power supply unit 1007 are connected to each other via a bus line 1008.

The solid-state imaging device 1001 corresponds to the above-described CMOS image sensor 10 (FIG. 6), in which differential-type amplification readout or source follower-type readout are performed with respect to the plurality of pixels 100 that are two-dimensionally arranged in the pixel array unit 11 (FIG. 6).

Here, it is possible to configure differential-type amplification readout such that a reset voltage of reference pixels 100R is externally applied and a reset voltage of read pixels 100S is negatively fed back from the vertical signal lines 22. In addition, the nodes on the source sides, the nodes on the drain sides, or the nodes on the source and the drain sides of the amplifier transistors of the reference pixels can be connected to each other (in connection with each other) in the columns of the pixel array unit during differential-type amplification readout.

The DSP circuit 1002 is a camera signal processing circuit that processes signals supplied from the solid-state imaging device 1001. The DSP circuit 1002 outputs image data obtained by processing the signals from the solid-state imaging device 1001. The frame memory 1003 temporarily stores the image data processed by the DSP circuit 1002 in units of frames.

The display unit 1004 is constituted by a panel-type display device, for example, a liquid crystal panel, an organic EL (electro luminescence) panel, or the like, and displays moving images or still images captured by the solid-state imaging device 1001. The recording unit 100S records the image data of the moving images or still images captured by the solid-state imaging device 1001 in a recording medium such as a semiconductor memory or a hard disk.

The operation unit 1006 outputs operation commands for various functions of the electronic apparatus 1000 complying with operations performed by a user. The power supply unit 1007 appropriately supplies power which is operation power of the DSP circuit 1002, the frame memory 1003, the display unit 1004, the recording unit 100S, and the operation unit 1006 to these supply targets.

The electronic apparatus 1000 is configured as described above. The present technology is applied to the solid-state imaging device 1001 as described above. Specifically, the CMOS image sensor 10 (FIG. 6) can be applied to the solid-state imaging device 1001.

By applying the present technology to the solid-state imaging device 1001, a reset voltage of the reference pixels 100R can be externally applied and a reset voltage of the read pixels 100S can be negatively fed back from the vertical signal lines 22S during differential-type amplification readout. Thus, due to the differential-type amplification readout, it is possible not only to stop a reset level from deviating from a readable range that may be caused by reset feedthrough but also to control a FD potential of the read pixel 100S so as to have a desired value at the time of reset while high conversion efficiency (an amplification rate) is realized.

In addition, by applying the present technology to the solid-state imaging device 1001, the node on the source side, the node on the drain side, or the nodes on the source and the drain sides of the amplifier transistor of the reference pixel can be connected to each other (in connection with each other) in the columns of the pixel array unit during differential-type amplification readout. Thus, a noise increase can be suppressed while high conversion efficiency (an amplification rate) is realized due to the differential-type amplification readout.

7. Use Example of Solid-State Imaging Device

FIG. 35 is a diagram illustrating a use example of the solid-state imaging device to which an embodiment of the present technology is applied.

The CMOS image sensor 10 (FIG. 6) can be used in various cases in which, for example, light such as visual light, infrared light, violet light, or X-rays is sensed as will be described below. In other words, the CMOS image sensor 10 can also be applied to devices used in the fields of viewing in which images to be provided for viewing are captured as well as, for example, the fields of traffic, home electrical appliances, medical care and health care, security, beauty care, sports, and agriculture as illustrated in FIG. 35.

In the field of viewing, specifically, the CMOS image sensor 10 can be used in a device for capturing images to be provided for viewing (e.g., the electronic apparatus 1000 of FIG. 34), for example, a digital camera, a smartphone, or a mobile telephone with camera function.

In the field of traffic, for example, the CMOS image sensor 10 can be used in a device provided for traffic such as an in-vehicle sensor that photographs a front, a rear, a surrounding, and an inside of a vehicle for safe driving including automatic stops, recognizing states of drivers, and the like, a surveillance camera for monitoring a driving vehicle or a road, and a distance-measuring sensor that measures distances between vehicles.

In the field of home electrical appliances, for example, the CMOS image sensor 10 can be used in a device provided in a home electrical appliance, for example, a television receiver set, a refrigerator, or an air conditioner for photographing a gesture of a user and performing an operation of the apparatus complying with the gesture. In addition, in the field of medical care and health care, the CMOS image sensor 10 can be used in a device provided for medical care and health care, for example, an endoscope, a device that photographs blood vessels using reception of infrared light, etc.

In the field of security, the CMOS image sensor 10 can be used in a device provided for security, for example, a surveillance camera for crime prevention, a camera for human authentication, or the like. In the field of beauty care, the CMOS image sensor 10 can be used in a device provided for beauty care, for example, a skin examination device that photographs skins, a microscope that photographs scalps.

In the field of sport, the CMOS image sensor 10 can be used in a device provided for sport, for example, an action camera or a wearable camera dedicated to sports purposes, or the like. In addition, in the field of agriculture, the CMOS image sensor 10 can be used in a device provided for agriculture, for example, a camera for monitoring states of farms and crops.

8. Application Example to Mobile Object

The technology (present technology) according to an embodiment of the present disclosure is applicable to a variety of products. For example, the technology according to an embodiment of the present disclosure is implemented as devices mounted on any type of mobile objects such as automobiles, electric vehicles, hybrid electric vehicles, motorcycles, bicycles, personal mobilities, airplanes, drones, ships, and robots.

FIG. 36 is a block diagram illustrating a schematic configuration example of a vehicle control system which is an example of a mobile object control system to which a technology according to an embodiment of the present technology is applicable.

A vehicle control system 12000 includes a plurality of electronic control units connected via a communication network 12001. In the example illustrated in FIG. 36, the vehicle control system 12000 includes a drive line control unit 12010, a body system control unit 12020, a vehicle outside information detection unit 12030, a vehicle inside information detection unit 12040, and an integrated control unit 12050. In addition, as functional configurations of the integrated control unit 12050, a microcomputer 12051, an audio and image output section 12052, an in-vehicle network interface (I/F) 12053.

The drive line control unit 12010 controls the operation of devices related to the drive line of the vehicle in accordance with a variety of programs. For example, the drive line control unit 12010 functions as a control device for a driving force generating device such as an internal combustion engine or a driving motor that generates the driving force of the vehicle, a driving force transferring mechanism that transfers the driving force to wheels, a steering mechanism that adjusts the steering angle of the vehicle, a braking device that generates the braking force of the vehicle, and the like.

The body system control unit 12020 controls the operations of a variety of devices attached to the vehicle body in accordance with a variety of programs. For example, the body system control unit 12020 functions as a control device for a keyless entry system, a smart key system, a power window device, or a variety of lights such as a headlight, a backup light, a brake light, a blinker, or a fog lamp. In this case, the body system control unit 12020 can receive radio waves transmitted from a portable device that serves instead of the key or signals of a variety of switches. The body system control unit 12020 receives these radio waves or signals, and controls the vehicle door lock device, the power window device, the lights, or the like.

The vehicle outside information detection unit 12030 detects information regarding the outside of a vehicle on which the vehicle control system 12000 is mounted. For example, an imaging section 12031 is connected to the vehicle outside information detection unit 12030. The vehicle outside information detection unit 12030 causes the imaging section 12031 to capture an image outside of the vehicle and receives the captured image. The vehicle outside information detection unit 12030 may perform an object detection process or a distance detection process for a person, a vehicle, an obstacle, a sign, letters on a road, or the like on the basis of the received image.

The imaging section 12031 is a light sensor that receives light and outputs an electric signal in accordance with the amount of received light. The imaging section 12031 can output the electric signal as an image or distance measurement information. In addition, the light received by the imaging section 12031 may be the visible light or may be non-visible light such as infrared light.

The vehicle inside information detecting unit 12040 detects information on the inside of the vehicle. The vehicle inside information detecting unit 12040 is connected, for example, to a driver state detecting section 12041 that detects the state of the driver. The driver state detecting section 12041 may include, for example, a camera that images the driver. The vehicle inside information detecting unit 12040 may compute the degree of the driver's tiredness or the degree of the driver's concentration or determine whether the driver have a doze, on the basis of detection information input from the driver state detecting section 12041.

For example, the microcomputer 12051 can calculate a control target value of the driving force generating device, the steering mechanism, or the braking device on the basis of information acquired by the vehicle outside information detecting unit 12030 or the vehicle inside information detecting unit 12040 on the inside and outside of the vehicle, and output a control instruction to the drive line control unit 12010. For example, the microcomputer 12051 may perform cooperative control for the purpose of executing the functions of an advanced driver assistance system (ADAS) including vehicle collision avoidance or impact reduction, follow-up driving based on the inter-vehicle distance, constant vehicle speed driving, vehicle collision warning, vehicle lane departure warning, or the like.

Further, the microcomputer 12051 can control the driving force generating device, the steering mechanism, the braking device, or the like on the basis of information acquired by the vehicle outside information detecting unit 12030 or the vehicle inside information detecting unit 12040 on the areas around the vehicle, thereby performing cooperative control for the purpose of automatic driving or the like that allows the vehicle to autonomously travel irrespective of any operation of a driver.

In addition, the microcomputer 12051 can output a control instruction to the body system control unit 12020 on the basis of the information regarding the outside of the vehicle acquired by the vehicle outside information detection unit 12030. For example, the microcomputer 12051 can control a head lamp in accordance with the position of a preceding vehicle or an oncoming vehicle detected by the vehicle outside information detection unit 12030 and can perform cooperative control for the purpose of anti-glaring such as switching a high beam to a low beam.

The audio and image output section 12052 transmits an output signal of at least one of a sound and an image to an output device capable of visually or aurally notifying a passenger of the vehicle or the outside of the vehicle of information. In the example of FIG. 36, an audio speaker 12061, a display section 12062, and an instrument panel 12063 are exemplified as the output device. For example, the display section 12062 may include at least one of an onboard display and a head-up display.

FIG. 37 is a diagram illustrating an example of an installation position of the imaging section 12031.

In FIG. 37, the vehicle 12100 includes imaging sections 12101, 12102, 12103, 12104, and 12105 as the imaging section 12031.

Imaging sections 12101, 12102, 12103, 12104, and 12105 are positioned, for example, at the front nose, a side mirror, the rear bumper, the back door, and the upper part of the windshield in the vehicle compartment of a vehicle 12100. The imaging section 12101 attached to the front nose and the imaging section 12105 attached to the upper part of the windshield in the vehicle compartment chiefly acquire images of the area ahead of the vehicle 12100. The imaging sections 12102 and 12103 attached to the side mirrors chiefly acquire images of the areas on the sides of the vehicle 12100. The imaging section 12104 attached to the rear bumper or the back door chiefly acquires images of the area behind the vehicle 12100. The imaging section 12105 provided inside the vehicle positioned above the windshield glass is mostly used to detect preceding vehicles, pedestrians, obstacles, traffic signals, traffic signs, traffic lanes, and the like.

Additionally, FIG. 37 illustrates an example of the imaging ranges of the imaging sections 12101 to 12104. An imaging range 12111 represents the imaging range of the imaging section 12101 attached to the front nose. Imaging ranges 12112 and 12113 respectively represent the imaging ranges of the imaging sections 12102 and 12103 attached to the side mirrors. An imaging range 12114 represents the imaging range of the imaging section 12104 attached to the rear bumper or the back door. For example, overlaying image data captured by the imaging sections 12101 to 12104 offers an overhead image that looks down on the vehicle 12100.

At least one of the imaging sections 12101 to 12104 may have a function of acquiring distance information. For example, at least one of the imaging sections 12101 to 12104 may be a stereo camera including a plurality of image sensors or may be an image sensor that includes pixels for phase difference detection.

For example, the microcomputer 12051 can extract a 3-dimensional object traveling at a predetermined speed (for example, 0 or more km/h) in substantially the same direction as the vehicle 12100 as a preceding vehicle by particularly using a closest 3-dimensional object on a travel road of the vehicle 12100 by obtaining a distance to each 3-dimensional object within the imaging ranges 12111 to 12114 and a temporal change in the distance (a relative speed to the vehicle 12100) on the basis of distance information obtained from the imaging sections 12101 to 12104. Further, the microcomputer 12051 can set an inter-vehicle distance to be ensured in advance before a preceding vehicle and perform automatic brake control (also including follow-up stop control) or automatic acceleration control (also including follow-up oscillation control). In this way, it is possible to perform cooperative control for the purpose of automatic driving or the like that allows the vehicle to autonomously travel irrespective of any operation of a driver.

For example, the microcomputer 12051 can classify and extract 3-dimensional object data regarding 3-dimensional objects as other 3-dimensional objects such as motorcycles, normal vehicles, large vehicles, pedestrians, and electric poles on the basis of the distance information obtained from the imaging sections 12101 to 12104 and can use the other 3-dimensional objects to automatically avoid obstacles. For example, the microcomputer 12051 identifies obstacles around the vehicle 12100 as obstacles which can be viewed by a driver of the vehicle 12100 and obstacles which are difficult to view. Then, the microcomputer 12051 can determine a collision risk indicating a danger of collision with each obstacle and output a warning to the driver via the audio speaker 12061 or the display section 12062 in a situation in which there is a collision possibility since the collision risk is set to be equal to or greater than a set value or can perform driving assistance for collision avoidance by performing forced deceleration or avoidance steering via the drive line control unit 12010.

At least one of the imaging sections 12101 to 12104 may be an infrared camera that detects infrared light. For example, the microcomputer 12051 can recognize a pedestrian by determining whether there is the pedestrian in captured images of the imaging sections 12101 to 12104. The pedestrian can be recognized, for example, in a procedure in which feature points are extracted in the captured images of the imaging sections 12101 to 12104 serving as infrared cameras and a procedure in which a series of feature points indicating a contour of an object are subjected to a pattern matching process to determine whether there is the pedestrian. The microcomputer 12051 determines that there is the pedestrian in the captured images of the imaging sections 12101 to 12104. When the pedestrian is recognized, the audio and image output section 12052 controls the display section 12062 such that a rectangular contour line for emphasis is superimposed to be displayed on the recognized pedestrian. In addition, the audio and image output section 12052 controls the display section 12062 such that an icon or the like indicating the pedestrian is displayed at a desired position.

The example of the vehicle control system to which the technology according to an embodiment of the present disclosure can be applied has been described above. The technology according to an embodiment of the present disclosure can be applied to the imaging section 12101 in the above-described configuration. Specifically, the CMOS image sensor 10 of FIG. 1 can be applied to the imaging section 12031. By applying the technology according to an embodiment of the present disclosure to the imaging section 12031, differential-type amplification readout makes it possible not only to stop a reset level from deviating from a readable range that may be caused by reset feedthrough but also to control a FD potential of a read pixel so as to have a desired value at the time of reset while high conversion efficiency (an amplification rate) is realized, or a noise increase can be suppressed. Thus, for example, captured image with higher quality can be acquired, and obstacles including pedestrians can be recognized more accurately.

Note that an embodiment of the present technology is not limited to the above-described embodiment, and can be variously modified within the scope not departing from the gist of the present technology.

Additionally, the present technology may also be configured as below.

(1)

An imaging device, comprising, differential amplifier circuitry comprising a first amplification transistor and a second amplification transistor; and a plurality of pixels including a first pixel and a second pixel, wherein the first pixel includes a first photoelectric converter, a first reset transistor, and the first amplification transistor, and wherein the second pixel includes a second photoelectric converter, a second reset transistor, and the second amplification transistor, wherein the first reset transistor is coupled to a first reset voltage, and wherein the second reset transistor is coupled to a second reset voltage different than the first reset voltage.

(2)

The imaging device according to (1), wherein the differential amplifier circuitry further comprises current mirror circuitry including a first current mirror transistor coupled to the first amplification transistor and a second current mirror transistor coupled to the second amplification transistor.

(3)

The imaging device according to (1), wherein the first amplification transistor and the second amplification transistor are coupled to a current source.

(4)

The imaging device according to (1), wherein the differential amplifier circuitry further comprises a plurality of switches.

(5)
The imaging device according to (4), wherein the plurality of switches include:
a first switch coupled between the first reset voltage and the first amplification transistor; and
a second switch coupled between the second reset voltage and the first amplification transistor.

(6)
The imaging device according to (5), further comprising a controller configured to control operation of the first switch and the second switch to selectively couple the first amplification transistor to the first reset voltage or the second reset voltage.

(7)
The imaging device according to (5), wherein the plurality of switches further include:
a third switch coupled between the first reset voltage and the second amplification transistor; and
a fourth switch coupled between the second reset voltage and the second amplification transistor.

(8)
The imaging device according to (7), further comprising a controller configured to control operation of the third switch and the fourth switch to selectively couple the second amplification transistor to the first reset voltage or the second reset voltage.

(9)
An imaging device, comprising:
first differential amplifier circuitry comprising a first amplification transistor and a second amplification transistor;
second different amplifier circuitry comprising a third amplification transistor and a fourth amplification transistor;
a plurality of pixels including a first pixel, a second pixel, a third pixel, and a fourth pixel, wherein the first pixel includes a first photoelectric converter and the first amplification transistor, the second pixel includes a second photoelectric converter and the second amplification transistor, the third pixel includes a third photoelectric converter and the third amplification transistor, and the fourth pixel includes a fourth photoelectric converter and the fourth amplification transistor;
a first signal line coupled to the first pixel;
a second signal line coupled to the second pixel;
a third signal line coupled to the third pixel;
a fourth signal line coupled to the fourth pixel;
a first switch circuit configured to couple the first signal line and the second signal line;
a second switch circuit configured to couple the second signal line and the third signal line; and
a third switch circuit configured to couple the third signal line and the fourth signal line.

(10)
The imaging device according to (9), wherein the first differential amplifier circuitry further comprises a first plurality of switches.

(11)
The imaging device according to (10), wherein the first plurality of switches include: a first switch coupled between a first reset voltage and the first amplification transistor; and
a second switch coupled between a second reset voltage and the first amplification transistor,
wherein the first reset voltage and the second reset voltage are different.

(12)
The imaging device according to (11), further comprising a controller configured to control operation of the first switch and the second switch to selectively couple the first amplification transistor to the first reset voltage or the second reset voltage.

(13)
The imaging device according to (11), wherein the first plurality of switches further include:
a third switch coupled between the first reset voltage and the second amplification transistor; and
a fourth switch coupled between the second reset voltage and the second amplification transistor.

(14)
The imaging device according to (13), further comprising a controller configured to control operation of the third switch and the fourth switch to selectively couple the second amplification transistor to the first reset voltage or the second reset voltage.

(15)
The imaging device according to (13), wherein the second differential amplifier circuitry further comprises a second plurality of switches.

(16)
The imaging device according to (15), wherein the second plurality of switches include:
a fifth switch coupled between the first reset voltage and the third amplification transistor; and
a sixth switch coupled between the second reset voltage and the third amplification transistor.

(17)
The imaging device according to (16), further comprising a controller configured to control operation of the fourth switch and the fifth switch to selectively couple the third amplification transistor to the first reset voltage or the second reset voltage.

(18)
The imaging device according to (16), wherein the second plurality of switches further include:
a seventh switch coupled between the first reset voltage and the fourth amplification transistor; and
an eighth switch coupled between the second reset voltage and the fourth amplification transistor.

(19)
The imaging device according to (18), further comprising a controller configured to control operation of the seventh switch and the eighth switch to selectively couple the fourth amplification transistor to the first reset voltage or the second reset voltage.

(20)
The imaging device according to (9), further comprising a controller configured to: in a reference pixel mode, set the first switch circuit and the third switch circuit to an on state; and
in a source follower pixel mode, set the second switch circuit to an on-state.

(21)
A signal processing device including:
a differential amplifier circuit including
a readout-side amplifier transistor that is provided in accordance with each of input signals from a plurality of input channels and amplifies the input signal input via a sample-and-hold circuit, and
a reference-side amplifier transistor that forms a pair with each readout-side amplifier transistor,
in which an output of the differential amplifier circuit is set as negative feedback in a sample-and-hold circuit on the readout-side amplifier transistor side, and
an arbitrary voltage is set in a sample-and-hold circuit on the reference-side amplifier transistor side.

(22)

A solid-state imaging device configured with the signal processing device according to (21), in which the input channel and the sample-and-hold circuit are included in pixels that are two-dimensionally arranged in a matrix shape in a pixel array unit, and each of the pixels includes a photoelectric conversion unit, a transfer transistor that transfers electric charges photoelectrically converted by the photoelectric conversion unit, an electric charge/voltage conversion unit that converts electric charges transferred by the transfer transistor into a voltage signal, and a reset transistor that resets the electric charge/voltage conversion unit.

(23)

The solid-state imaging device according to (22), in which the pixel further includes a select transistor that selects the pixel, and the select transistor selects an arbitrary pair of a read pixel that includes the readout-side amplifier transistor and a reference pixel that includes the reference-side amplifier transistor.

(24)

The solid-state imaging device according to (22) or (23), in which reference pixels each of which includes the reference-side amplifier transistor are read in units of columns.

(25)

The solid-state imaging device according to any one of (22) to (24), in which a reference pixel that includes the reference-side amplifier transistor has the same configurations of the transfer transistor and the electric charge/voltage conversion unit as an effective pixel that performs accumulation and readout of a signal.

(26)

The solid-state imaging device according to any one of (22) to (25), in which the pixel is able to be subjected to source follower-type readout, and the solid-state imaging device further includes a switching unit that performs switching between source follower-type readout and differential-type amplification readout.

(27)

The solid-state imaging device according to any one of (22) to (25), further including:

a switching unit that performs switching between a read pixel that includes the readout-side amplifier transistor and a reference pixel that includes the reference-side amplifier transistor.

(28)

The solid-state imaging device according to (27), in which, after a signal read via the transfer transistor in the readout-side amplifier transistor is read by a differential pair formed with the reference-side amplifier transistor, connection of the readout-side amplifier transistor and the reference-side amplifier transistor is complementarily switched, and a signal read via the transfer transistor in the reference-side amplifier transistor before switching is read by a differential pair formed with the readout-side amplifier transistor before switching.

(29)

The solid-state imaging device according to (27) or (28), in which the switching unit sets an effective pixel that is in proximity to an effective pixel that performs accumulation and readout of a signal to a reference pixel that includes the reference-side amplifier transistor.

(30)

The solid-state imaging device according to any one of (22) to (29), in which source sides, drain sides, or the source and drain sides of all or some of a plurality of reference-side amplifier transistors are in connection with each other.

(31)

A signal processing device including:

a differential amplifier circuit including a readout-side amplifier transistor that is provided in accordance with each of input signals from a plurality of input channels and amplifies the input signal, and a reference-side amplifier transistor that forms a pair with each readout-side amplifier transistor, in which source sides, drain sides, or the source and drain sides of all or some of a plurality of reference-side amplifier transistors are in connection with each other.

(32)

A solid-state imaging device configured with the signal processing device according to (31), in which the input channel is included in pixels that are two-dimensionally arranged in a matrix shape in a pixel array unit, and each of the pixels includes a photoelectric conversion unit, a transfer transistor that transfers electric charges photoelectrically converted by the photoelectric conversion unit, an electric charge/voltage conversion unit that converts electric charges transferred by the transfer transistor into a voltage signal, and a reset transistor that resets the electric charge/voltage conversion unit.

(33)

The solid-state imaging device according to (32), in which the pixel further includes a select transistor that selects the pixel, and the select transistor selects an arbitrary pair of a read pixel that includes the readout-side amplifier transistor and a reference pixel that includes the reference-side amplifier transistor.

(34)

The solid-state imaging device according to (32) or (33), in which reference pixels each of which includes the reference-side amplifier transistor are read in units of columns, and the number of reference pixels of which the reference-side amplifier transistors are in connection with each other is the same as or smaller than the number of read pixels each of which includes the readout-side amplifier transistor.

(35)

The solid-state imaging device according to any one of (32) to (34), in which a reference pixel that includes the reference-side amplifier transistor has the same configurations of the transfer transistor and the electric charge/voltage conversion unit as an effective pixel that performs accumulation and readout of a signal.

(36)

The solid-state imaging device according to any one of (32) to (35), in which the pixel is able to be subjected to source follower-type readout, and the solid-state imaging device further includes a switching unit that performs switching between source follower-type readout and differential-type amplification readout.

(37)

The solid-state imaging device according to any one of (32) to (35), further including:

a switching unit that performs switching between a read pixel that includes the readout-side amplifier transistor and a reference pixel that includes the reference-side amplifier transistor.

(38)

The solid-state imaging device according to (37), in which, after a signal read via the transfer transistor in the readout-side amplifier transistor is read by a differential pair formed with the reference-side amplifier transistor, connection of the readout-side amplifier transistor and the reference-side amplifier transistor is complementarily switched, and a signal read via the transfer transistor in the reference-side amplifier transistor before switching is read by a differential pair formed with the readout-side amplifier transistor before switching.

(39)

The solid-state imaging device according to (37) or (38), in which the switching unit sets an effective pixel that is in proximity to an effective pixel that performs accumulation and readout of a signal to a reference pixel that includes the reference-side amplifier transistor.

(40)

The solid-state imaging device according to any one of (32) to (39), in which the input signal is input to the readout-side amplifier transistor and the reference-side amplifier transistor via a sample-and-hold circuit, an output of the differential amplifier circuit is set as negative feedback in a sample-and-hold circuit on the readout-side amplifier transistor side, and an arbitrary voltage is set in a sample-and-hold circuit on the reference-side amplifier transistor side.

REFERENCE SIGNS LIST

10 CMOS image sensor
11 pixel array unit
12 vertical driving unit
13 column readout circuit unit
14 column signal processing unit
15 horizontal driving unit
16 system control unit
17 signal processing unit
18 data storage unit
22, 22R, 22S vertical signal line
31 pixel driving line
32 vertical pixel wire
50 differential pixel readout circuit
61, 61R, 61S vertical reset input line
62, 62R, 62S vertical current supply line
100 pixel
100R reference pixel
100S read pixel
111, 111R, 111S photoelectric conversion unit
112, 112R, 112S transfer transistor
113, 113R, 113S reset transistor
114, 114R, 114S amplifier transistor
115, 115R, 115S select transistor
1000 electronic apparatus
1001 solid-state imaging device
12031 imaging section

The invention claimed is:

1. An imaging device, comprising:
   first differential amplifier circuitry comprising a first amplification transistor and a second amplification transistor;
   second different amplifier circuitry comprising a third amplification transistor and a fourth amplification transistor;
   a plurality of pixels including a first pixel, a second pixel, a third pixel, and a fourth pixel, wherein the first pixel includes a first photoelectric converter and the first amplification transistor, the second pixel includes a second photoelectric converter and the second amplification transistor, the third pixel includes a third photoelectric converter and the third amplification transistor, and the fourth pixel includes a fourth photoelectric converter and the fourth amplification transistor;
   a first signal line coupled to the first pixel;
   a second signal line coupled to the second pixel;
   a third signal line coupled to the third pixel;
   a fourth signal line coupled to the fourth pixel;
   first switch circuitry configured to couple the first signal line and the second signal line to a first current source;
   second switch circuitry configured to couple the second signal line and the third signal line; and
   third switch circuitry configured to couple the third signal line and the fourth signal line to a second current source.

2. The imaging device according to claim 1, wherein the first differential amplifier circuitry further comprises a first plurality of switches.

3. The imaging device according to claim 2, wherein the first plurality of switches include:
   a first switch coupled between an external fixed voltage and the first amplification transistor; and
   a second switch coupled between a power supply and the first amplification transistor, wherein a voltage of the power supply is different than external fixed voltage.

4. The imaging device according to claim 3, further comprising a controller configured to control operation of the first switch and the second switch to selectively couple the first amplification transistor to the external fixed voltage or the power supply.

5. The imaging device according to claim 3, wherein the first plurality of switches further include:
   a third switch coupled between the external fixed voltage and the second amplification transistor; and
   a fourth switch coupled between the power supply and the second amplification transistor.

6. The imaging device according to claim 5, further comprising a controller configured to control operation of the third switch and the fourth switch to selectively couple the second amplification transistor to the external fixed voltage or the power supply.

7. The imaging device according to claim 5, wherein the second differential amplifier circuitry further comprises a second plurality of switches.

8. The imaging device according to claim 7, wherein the second plurality of switches include:
   a fifth switch coupled between the external fixed voltage and the third amplification transistor; and
   a sixth switch coupled between the power supply and the third amplification transistor.

9. The imaging device according to claim 8, further comprising a controller configured to control operation of the fourth switch and the fifth switch to selectively couple the third amplification transistor to the external fixed voltage or the power supply.

10. The imaging device according to claim 8, wherein the second plurality of switches further include:
- a seventh switch coupled between the external fixed voltage and the fourth amplification transistor; and
- an eighth switch coupled between the power supply and the fourth amplification transistor.

11. The imaging device according to claim 10, further comprising a controller configured to control operation of the seventh switch and the eighth switch to selectively couple the fourth amplification transistor to the external fixed voltage or the power supply.

12. The imaging device according to claim 1, further comprising a controller configured to:
- in a reference pixel mode, set the first switch circuitry and the third switch circuitry to an on state; and
- in a source follower pixel mode, set the second switch circuitry to an on state.

* * * * *